United States Patent
Lawbaugh et al.

(10) Patent No.: US 9,317,392 B2
(45) Date of Patent: Apr. 19, 2016

(54) METHODS AND AUTOMATED SYSTEMS FOR TESTING, OPTIMIZATION, AND ANALYSIS THAT PRESERVE CONTINUITY IN IDENTITIES AND STATUS OF USERS WHO ACCESS REMOTE INFORMATION FROM DIFFERENT CONTEXTS

(71) Applicant: WEBTRENDS INC., Portland, OR (US)

(72) Inventors: Paul Lawbaugh, Hillsboro, OR (US); David Everly, Portland, OR (US)

(73) Assignee: WEBTRENDS, INC., Portland, OR (US)

( * ) Notice: Subject to any disclaimer, the term of this patent is extended or adjusted under 35 U.S.C. 154(b) by 190 days.

(21) Appl. No.: 14/051,341

(22) Filed: Oct. 10, 2013

(65) Prior Publication Data

US 2014/0189714 A1  Jul. 3, 2014

Related U.S. Application Data

(60) Provisional application No. 61/712,107, filed on Oct. 10, 2012.

(51) Int. Cl.
*G06F 11/34* (2006.01)
*G06F 11/36* (2006.01)
(Continued)

(52) U.S. Cl.
CPC .......... *G06F 11/3438* (2013.01); *G06F 9/4443* (2013.01); *G06F 11/3644* (2013.01); *H04L 41/0253* (2013.01); *H04L 43/50* (2013.01); *H04L 67/00* (2013.01); *H04L 67/22* (2013.01)

(58) Field of Classification Search
CPC .................................................. G06F 11/3644
See application file for complete search history.

(56) References Cited

U.S. PATENT DOCUMENTS

2009/0138447 A1* 5/2009 Kalavade ........................... 707/3
2009/0271514 A1* 10/2009 Thomas et al. ................ 709/224
(Continued)

FOREIGN PATENT DOCUMENTS

WO  0157706 A2  8/2001

OTHER PUBLICATIONS

Raju, G.T.; Satyanaryana, P.S., "Knowledge Discovery for Web Usage Data: Complete Preprocessing Methodology" (Jan. 2008), International Journal of Computer Science and Network Security, Vo. 8, No. 1, pp. 179-186 [retrieved from http://citeseerx.ist.psu.edu/viewdoc/download?doi=10.1.1.130.5152&rep=rep1&type=pdf].*

(Continued)

*Primary Examiner* — Brian W Wathen
(74) *Attorney, Agent, or Firm* — Olympic Patent Works PLLC

(57) ABSTRACT

The current document is directed to automated electronic testing, optimization, and/or analysis systems that collect sufficient data from instrumentation, maintain sufficient user status, and provide sufficient communications between instrumentation and testing, optimization, and/or analysis systems in order to follow, reconstruct, and record temporal threads of user activity that span multiple user contexts. In one implementation, JSON-encoded information is collected through instrumentation and supplemented by testing, optimization, and/or analysis systems in order to provide many different types of information about remote-information-accessing users and the device and program contexts from which they access remote information. In addition, instrumentation can provide context-transition alerts to the testing, optimization, and/or analysis systems to facilitate the ability of testing, optimization, and/or analysis systems maintain user-thread continuity over context transitions and the testing, optimization, and/or analysis system and provide JSON-encoded information back to instrumentation.

4 Claims, 52 Drawing Sheets

(51) Int. Cl.
 *G06F 9/44* (2006.01)
 *H04L 29/08* (2006.01)
 *H04L 12/24* (2006.01)
 *H04L 12/26* (2006.01)

(56) References Cited

U.S. PATENT DOCUMENTS

2010/0042931 A1 2/2010 Dixon et al.
2010/0318976 A1* 12/2010 Everly et al. ............... 717/141
2011/0066892 A1 3/2011 Gardner et al.
2011/0244440 A1 10/2011 Saxon et al.
2011/0246511 A1* 10/2011 Smith et al. ................ 707/769
2015/0195156 A1* 7/2015 Agrawal et al. ......... H04L 43/04

OTHER PUBLICATIONS

Cooley, R. "Web Usage Mining: Discovery and Application of Interesting Patterns from Web Data" (May 2000), University of Minnesota, pp. 1-170 [retrieved from http://citeseerx.ist.psu.edu/viewdoc/download?doi=10.1.1.411.6912&rep=rep1 &type=pdf].*

* cited by examiner

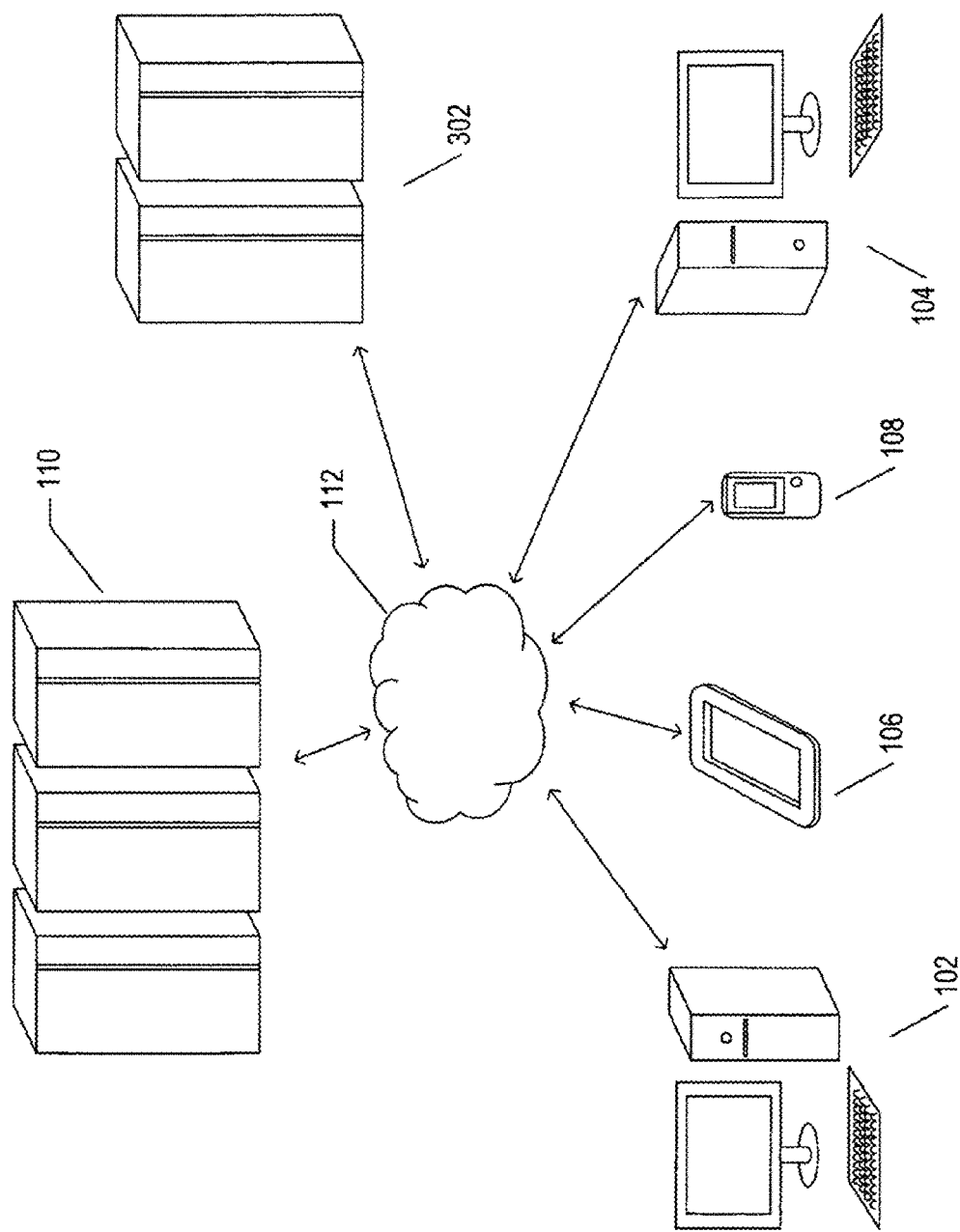

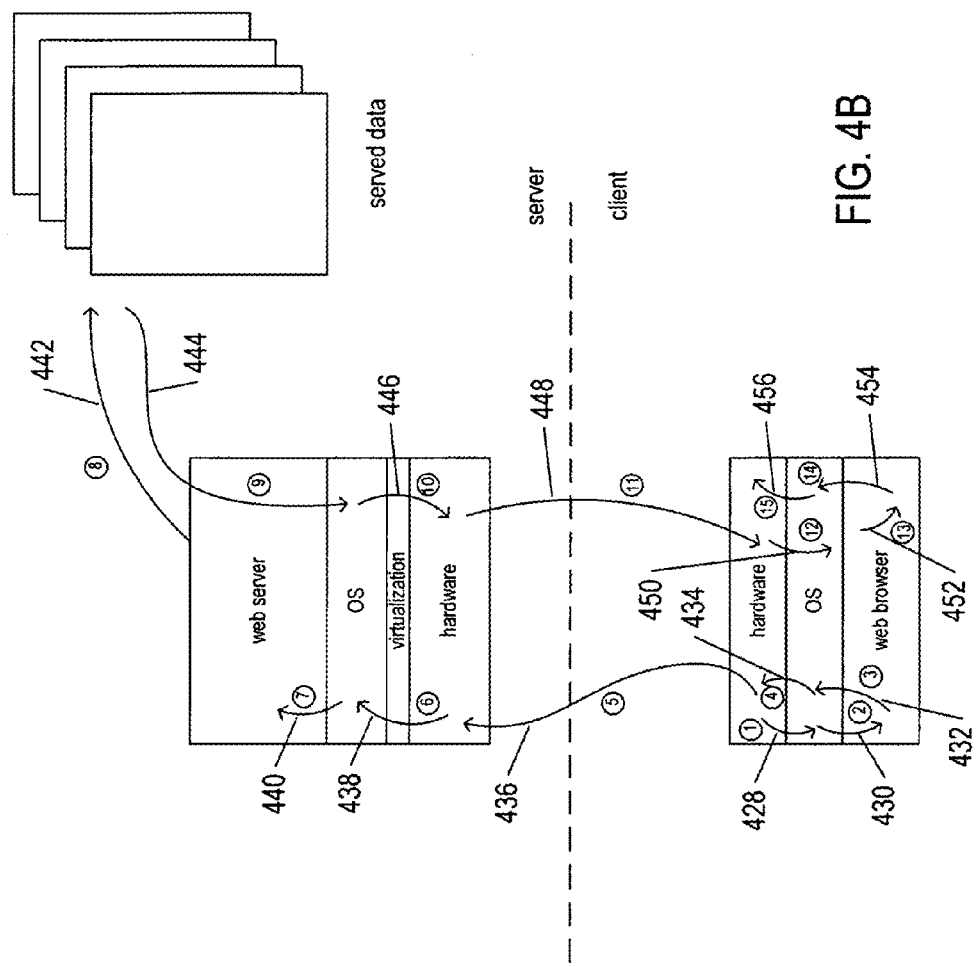

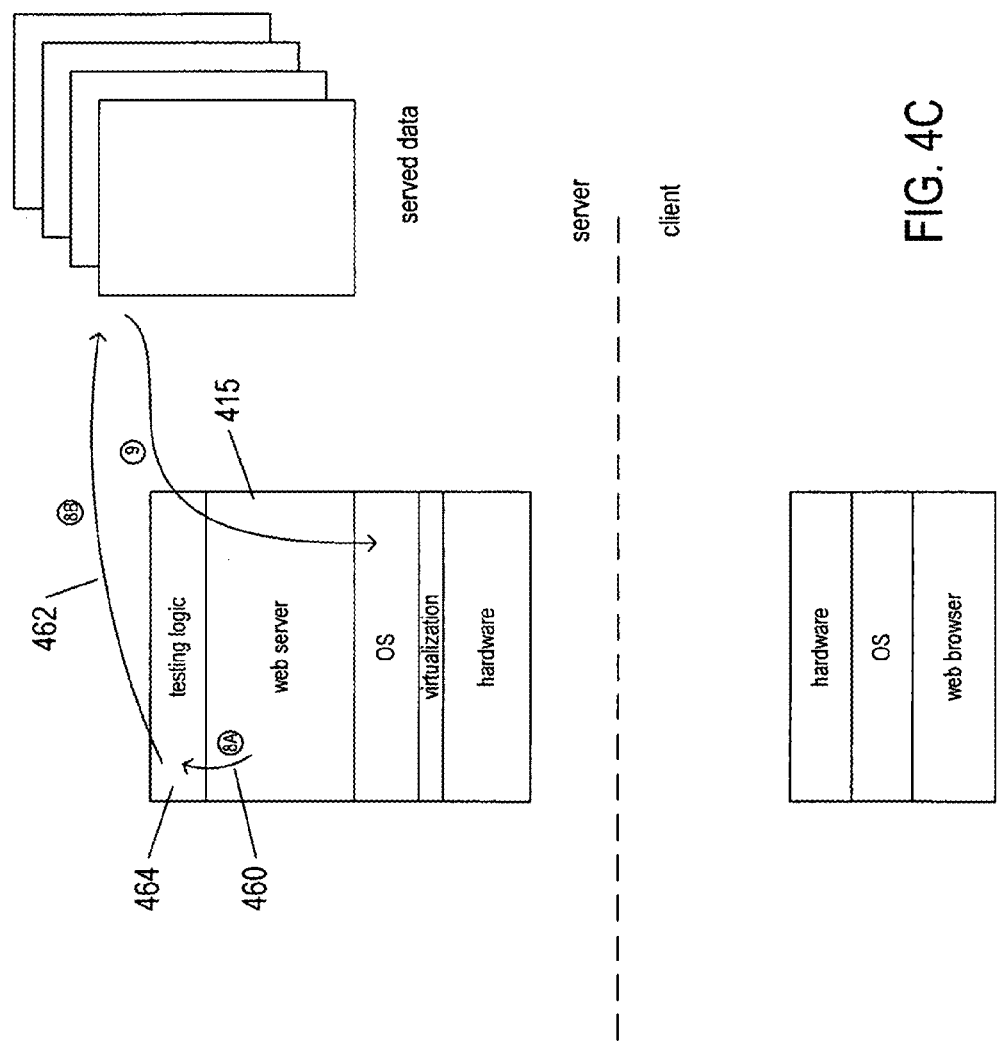

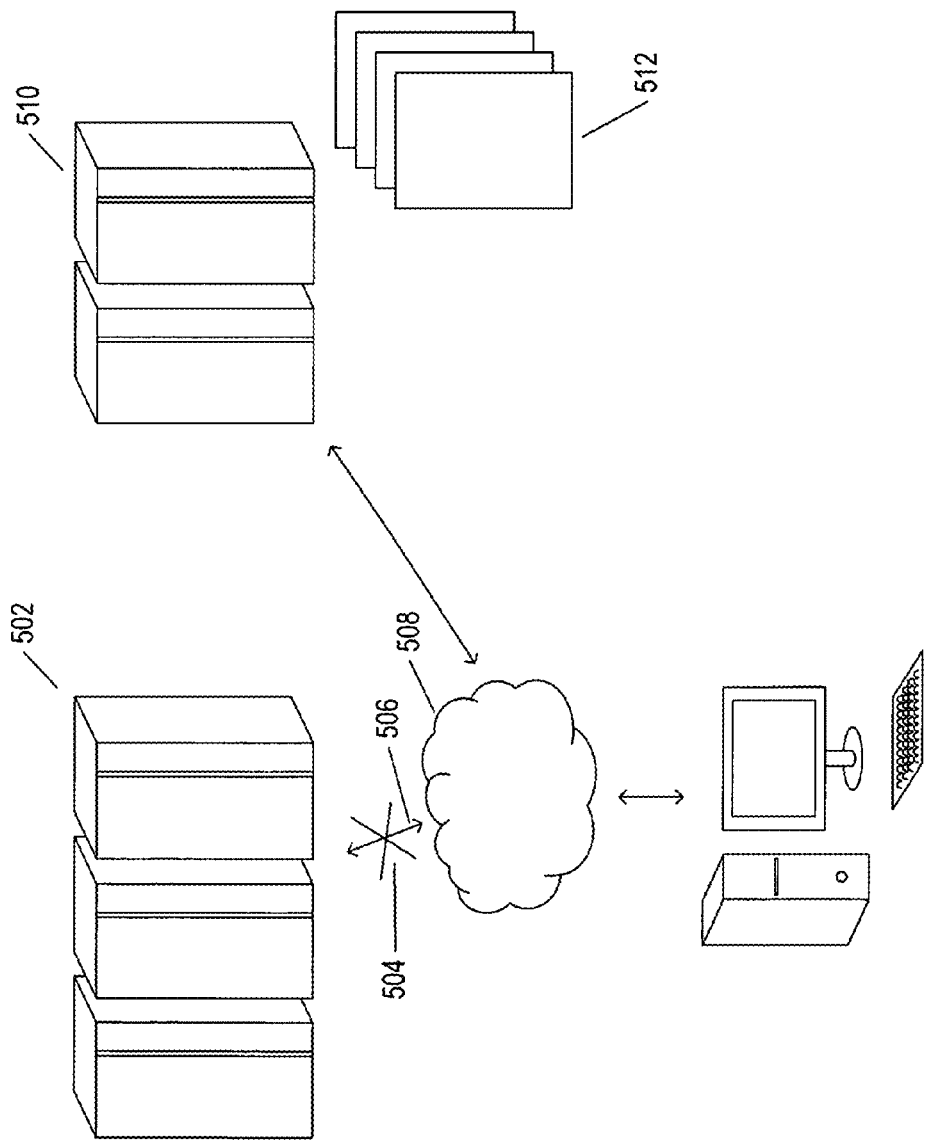

```
912 902 908
         904
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8" />
<title>Demo Web Site Confirmation | Widemile Optimization Platform</title>
<style type="text/css">
Body { margin: 0; padding: 0; background: #b3b3b3; text-align:center; } img{ border:none; }
#container{ background: #fff url (images/demo_site_bg.jpg) no-repeat 0 0; margin:36px auto;/*center*/height:660px; width:952px; }
#header{ padding:24px 24px 0 24px; }
#left{ float:left; width:369px; margin:36px 0px 0px 24px; } * > #left {margin:36px 0px 48px; }/*reset ie6 double margin bug*/
#right{ float:right; width:459px; margin:36px 24px 0px 0px; } * > #right {margin:36px 48px 0px 0px; }/*reset ie6 double margin bug*/
#button{ margin:36px 0px; }
</style>
<!--insert: Widemile Optimization Platform Client Library - -->
<script type="text/javascript" src="http://www.widemile.com/js/wm_capi.js"></script>
</head>          910
<body>           914
<!-- insert: Widemile conversion Tracking Code - -->
<script type="text/javascript"> WM.setup();</script>
<div id="main_ext">
    <div id="container">
        <div id="header">
        <div id="headliner">
            <img src="images/demo_site_confirmation_hd.jpg" alt="Confirmation" />
        </div>
    </div>
    <div id="left">
        <div id="hero">
            <img src="images/demo_site_confirmation_hs.jpg" alt="" />
        </div>
    </div>
    <div id="right">
        <div id="offer">
            <img src="images/demo_site_confirmation_offer.jpg" alt="Thank You" />
        </div>
        <div id="button">
            <a href="index.htm">
                <img src="images/demo_site_confirmation_btn.jpg" alt="Home Button" />
            </a>
        </div>
    </div>     920
</div>
</div>  918
</div>  916
</body> 906
</html>
```

FIG. 9

```
<!DOCTYPE html PUBLIC "-//W3C//DTD XHTML 1.0 transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8" />
<title>Demo Web Site: Landing Page walkthrough | Widemile Optimization Platform</title>
<style type="text/css">
body { margin: 0; padding: 0; background: #b3b3b3; text-align:center; } img{ border:none; }
#container{ background: #fff url(images/demo_site_bg.jpg) no-repeat 0 0; margin:36px auto;/*center*/ height:660px; width:952px; }
#header{ padding:24px 24px 0 24px; }
#left{ float:left; width:369px; margin:36px 0px 24px; } * > #left { margin:36px 0px 0px 48px; }/*reset ie6 double margin bug*/
#right{ float:right; width:459px; margin:36px 24px 0px 0px; } * > #right { margin:36px 48px 0px 0px; }/*reset ie6 double margin bug*/
#wm_offer{ margin:36px 0px; }
</style>
<!-- insert: Widemile Optimization Platform Client Library -->
<script type="text/javascript" src="http://www.widemile.com/js/wm_capi.js"></script>      ~1302
</head>
<body>
<!-- insert: Widemile PageView Tracking Code -->
<script type="text/javascript">WM.setup();</script>      ~1304
<div id="main_ext">
    <div id="container">
        <div id="header">
        <div id="wm_headline">
            <img src="images/demo_site_hd_green.jpg" alt="Green Headline 1" />
        </div>
    </div>
    <div id="left">
        <div id="wm_hero">
            <img src="images/demo_site_hs_green.jpg" alt="Green Hero 1" />
        </div>
    </div>
    <div id="right">
        <div id="wm_offer">
            <img src="images/demo_site_offer_green.jpg" alt="Green Offer 1" />
        </div>
            <a href="conversion.htm"><div id="wm_button">
                <span id="wm_INSERT_BUTTON">
                    <img src="images/demo_site_btn_green.jpg" alt="Green Button 1" />
                </span>
            </div></a>
        </div>
    </div>
</div>
</body>
</html>
```

FIG. 13

```
"meta" :                                    ╱─ 1640
{
    "schema_version" : "2.0",
    "api_version" : "2.0",
    "message_type" : "event",
    "stream_type" : "content"
},
"data" :
{
    "k1" : "xxxxxx",         ╱─ 1642
    "k2" : "xxxxxx",
    "wt" : "xxxxxx",
    {
        "k3" : [ "xxxxxx" ],
        "k4" : "xxxxxx",
        "k5" : [ "xxxxxx", "xxxxxx", "xxxxxx" ],
    }
},
"ext" :
{                                           ╱─ 1644
    "geo" :
    {
              "k20" : "xxxxxx",
   1646 ─╱    "k21" : "xxxxxx",
    },          ⋮
      "device" :
      {
              "k30" : " xxxxxx",
   1648 ─╱    "k31" : " xxxxxx",
      },        ⋮
      "browser" :
      {
              "k40" : "xxxxxx",
   1650 ─╱    "k41" : "xxxxxx",
      }
}                 ⋮                FIG. 16C
}
```

```
{
  "meta" :                                    ← 1660
  {
     "schema_version" : "2.0",
     "api_version" : "2.0",
     "message_type" : "xxxxxx",
     "stream_type" : "xxxxxx"
  },
  "session_id" : "1353515717173",
  "visitor_id" : "216.64.169.240-4057458896.30216649",   ⎫
  "session_closed" : false,                               ⎬ 1662
  "session_summary" :                                     ⎭
  {
     "events" :
1664 ─ {
        "k1" : "xxxxxx",
        "k2" : "xxxxxx"
     },
     "k10" :
     {
        "k11" : "xxxxxx",
        "k12" : "xxxxxx"
     },
     "k20"
     {
        "k21" : "xxxxxx"
     }
  },                              ← 1666
  "events" : [
     {
```

FIG. 16D-1

```
"k30" : "xxxxxx",
        "k31" : ["xxxxxx", "xxxxxx", "xxxxxx"],
        "data" :
        {
            "k32" : ["xxxxxx", "xxxxxx", "xxxxxx"],
            "wt" :
            {
                "k33" : ["xxxxxx", "xxxxxx", "xxxxxx"],
                "k34" : ["xxxxxx", "xxxxxx", "xxxxxx"],
            }
        },
        "ext" :
        {
            "geo"
            {
                "k35" : ["xxxxxx", "xxxxxx", "xxxxxx"],
                "k36" : ["xxxxxx", "xxxxxx", "xxxxxx"]
            },
            "source" :
            {
                "k38" : ["xxxxxx", "xxxxxx", "xxxxxx"],
                "k39" : ["xxxxxx", "xxxxxx", "xxxxxx"]
            },
            "device":
            {
                "k41" : "xxxxxx", "xxxxxx", "xxxxxx"],
                "k42" : ["xxxxxx", "xxxxxx", "xxxxxx"]
            },
            "browser":
            {
                "k44" : ["xxxxxx", "xxxxxx", "xxxxxx"],
                "k45" : ["xxxxxx", "xxxxxx", "xxxxxx"]
            }
        }
    },
    {
```

FIG. 16D-2

```
"k50" : "xxxxxx",
    "k51" : ["xxxxxx", "xxxxxx", "xxxxxx"],
    "data" :
    {
        "k52" : ["xxxxxx", "xxxxxx", "xxxxxx"],
        "wt" :
        {
            "k53" : ["xxxxxx", "xxxxxx", "xxxxxx"],
            "k54" : ["xxxxxx", "xxxxxx", "xxxxxx"]
        }
    },
    "ext" :
    {
        "geo"
        {
            "k55" : ["xxxxxx", "xxxxxx", "xxxxxx"],
            "k56" : ["xxxxxx", "xxxxxx", "xxxxxx"]
        },
        "source" :
        {
            "k58" : ["xxxxxx", "xxxxxx", "xxxxxx"],
            "k59" : ["xxxxxx", "xxxxxx", "xxxxxx"]
        },
        "device":
        {
            "k61" : "xxxxxx", "xxxxxx", "xxxxxx"],
            "k62" : ["xxxxxx", "xxxxxx", "xxxxxx"]
        }
        "browser":
        {
            "k64" : ["xxxxxx", "xxxxxx", "xxxxxx"],
            "k65" : ["xxxxxx", "xxxxxx", "xxxxxx"]
        }
    }
  }
 ]
}
```

FIG. 16D-3

```
function WebTrends() { var that = this; this.dcsid =
"dcscyjdor000004fu02p6j55k_7z2q"; this.domain = "statse.webtrendslive.com";
this.timezone = -8; this.fpcdom = ".motorcycle-superstore.com";
this.onsitedoms = (function () { return (window.RegExp ? new
RegExp(".*motorcycle-superstore.com", "i") : ""); })();this.downloadtypes =
"xls,doc,pdf,txt,csv,zip"; this.navigationtag = "div,table"; this.adclickparam
= "WT.ac"; this.trackevents = true; this.trimoffsiteparams = true;
this.enabled = true; this.i18n = false; this.fpc = "WT_FPC";
this.paidsearchparams = "gclid"; this.splitvalue = ""; this.preserve = true;
this.vid = { params: "WT.dcsvid,WT.i_e_dcsvid", name: "WT_VID", path: ";
path=/", expiry: "; expires=" + (function () { var cur = new Date(); var exp =
new Date(cur.getTime() + 315360000000); return exp.toGMTString(); })(),
domain: "; domain=" + this.fpcdom }; this.DCS = {}; this.WT = {}; this.DCSext
= {}; this.images = []; this.index = 0; this.qp = []; this.exre = (function ()
{ return (window.RegExp ? new
RegExp("dcs(uri)|(ref)|(aut)|(met)|(sta)|(sip)|(pro)|(byt)|(dat)|(p3p)|(cfg)|(
redirect)|(cip)", "i") : ""); })(); this.re = (function () { return
(window.RegExp ? (that.i18n ? { "%25": /\%/g, "%26": /\&/g } : { "%09": /\t/g,
"%20": / /g, "%23": /\#/g, "%26": /\&/g, "%28": /\+/g, "%3F": /\?/g,
"%5C": /\\/g, "%22": /\"/g, "%7F": /\x7F/g, "%A0": /\xA0/g }) : ""); })(); }

1718
WebTrends.prototype.dcsCreateImage = function (dcsSrc) {
    if (document.images) { this.images[this.index] = new Image();
1716  this.images[this.index].src = dcsSrc; this.index++; }
    else { document.write('<img alt="" border="0" name="DCSIMG" width="1"
height="1" src="' + dcsSrc + '">'); }
}

WebTrends.prototype.dcsTag = function () {
    if (document.cookie.indexOf("WTLOPTOUT=") != -1) { return; }
    var WT = this.WT; var DCS = this.DCS; var DCSext = this.DCSext; var i18n =
this.i18n; var P = "http" + (window.location.protocol.indexOf('https:') == 0 ?
's' : '') + "://" + this.domain + (this.dcsid == "" ? '' : '/' + this.dcsid) +
"/dcs.gif?"; if (i18n) { WT.dep = ""; }
    for (var N in DCS) { if (DCS[N] && (typeof DCS[N] != "function")) { P +=
1712  this.dcsA(N, DCS[N]); } }
    for (N in WT) { if (WT[N] && (typeof WT[N] != "function")) { P +=
this.dcsA("WT." + N, WT[N]); } }
    for (N in DCSext) {
        if (DCSext[N] && (typeof DCSext[N] != "function")) {
            if (i18n) { WT.dep = (WT.dep.length == 0) ? N : (WT.dep + ";" +
N); } }
----------------------------------------------------------
```

FIG. 17A

```
        P += this.dcsA(N, DCSext[N]);
    }
}
if (i18n && (WT.dep.length > 0)) { P += this.dcsA("WT.dep", WT.dep); }
if (P.length > 2048 && navigator.userAgent.indexOf('MSIE') >= 0) { P =
P.substring(0, 2040) + "&WT.tu=1"; }
    this.dcsCreateImage(P); this.WT.ad = "";         —— 1714
}
WebTrends.prototype.dcsCollect = function () {
    if (this.enabled) {
        this.dcsVar(); this.dcsMeta(); this.dcsAdv(); if (typeof
(this.dcsCustom) == "function") { this.dcsCustom(); }
        this.dcsTag();
    }                           —— 1710
}
```

1708 { ... }

```
    <script type="text/javascript">     var _tag = new WebTrends();
_tag.dcsGetId();</script>
    <script type="text/
javascript">_tag.trackAllEvents=true;_tag.dcsCollect();</script>
```

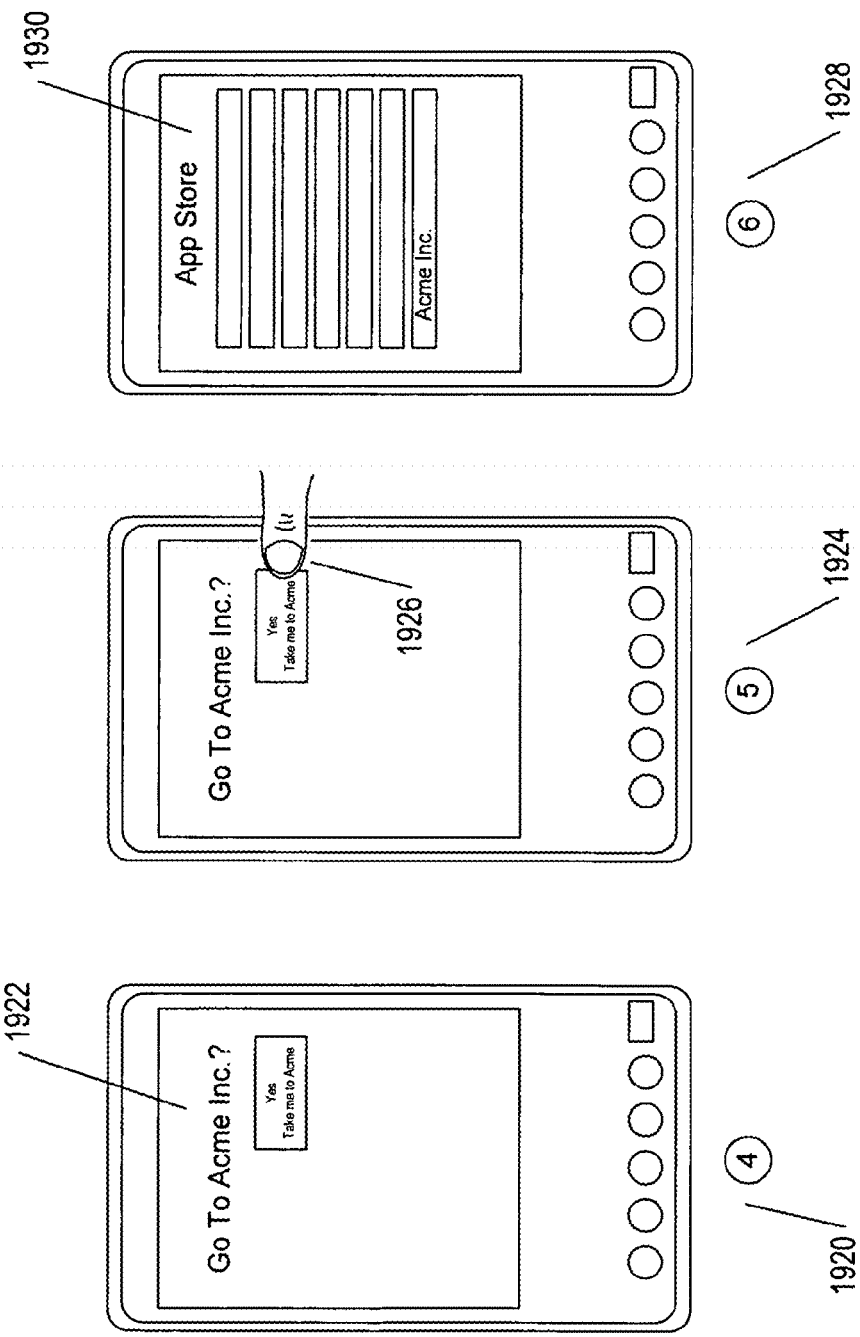

METHODS AND AUTOMATED SYSTEMS FOR TESTING, OPTIMIZATION, AND ANALYSIS THAT PRESERVE CONTINUITY IN IDENTITIES AND STATUS OF USERS WHO ACCESS REMOTE INFORMATION FROM DIFFERENT CONTEXTS

CROSS-REFERENCE TO RELATED APPLICATION

This application claims the benefit of Provisional Application No. 61/712,107, filed Oct. 10, 2012.

TECHNICAL FIELD

The current document is directed to automated systems for testing, optimization, and/or analysis, methods employed in such systems, and, in particular, to website-testing systems and methods that collect and provide information through instrumentation to preserve temporal threads of user access that span multiple user contexts.

BACKGROUND

During the past 20 years, the continued evolution of computer processors, data-storage devices and subsystems, and networking, together with the emergence of the World Wide Web and broad consumer acceptance of the Internet, have created a vast new Internet-based retailing infrastructure that represents a significant portion of current retail transactions for products and services. In certain retail sectors, including books and recorded music, Internet-based retail transactions now rival or have surpassed traditional retailing media, including physical retail establishments and catalog-based mail-order and telephone transactions. It is expected that Internet-based retailing will continue to grow and assume increasingly greater shares of the total retail-transaction volumes on a worldwide basis.

As Internet-based retailing of products and services has evolved and increased in market share, a variety of new support industries have grown up around Internet-based retailing, including cloud computing, website-development services, Internet-transaction services, automated testing and optimization services, and web-analytics services. Automated testing and optimization services provide tools and infrastructure to allow owners and managers of websites to carry out experiments in which websites are systematically altered in order to determine salient features and characteristics of websites and modify the salient features and characteristics to improve website performance.

In many automated testing systems, it is either impossible or difficult and imprecise to track a particular user's information-access activities with respect to websites and other types of remotely accessible information as the user's computational context changes, due to intended and unintended navigation by the user through various programs, sessions, and contexts as the user interacts with one or more processor-controlled devices to access websites and other types of remotely accessible information. As a result, many currently available automated testing and optimization services and web-analytics services cannot reconstruct continuous threads of user activities from collected data. Those who perform testing, optimization, and/or analysis, as well as those for whom testing, optimization, and/or analysis is performed, continue to seek testing, optimization, and/or analysis methods and systems that provide more useful information with regard to web-site users' activities.

SUMMARY

The current document is directed to automated electronic testing, optimization, and/or analysis systems that collect sufficient data from instrumentation, maintain sufficient user status, and provide sufficient communications between instrumentation and testing, optimization, and/or analysis systems in order to follow, reconstruct, and record temporal threads of user activity that span multiple user contexts. In one implementation, JSON-encoded information is collected through instrumentation and supplemented by testing, optimization, and/or analysis systems in order to provide many different types of information about remote-information-accessing users and the device and program contexts from which they access remote information. In addition, instrumentation can provide context-transition alerts to the testing, optimization, and/or analysis systems to facilitate the ability of testing, optimization, and/or analysis systems maintain user-thread continuity over context transitions. The testing, optimization, and/or analysis systems, in certain implementations, provide JSON-encoded information back to instrumentation to allow user programs to establish information about web-site users and their status and activities to, in turn, facilitate subsequent information transmission and processing of transmitted information by testing, optimization, and/or analysis systems.

BRIEF DESCRIPTION OF THE DRAWINGS

FIG. 3 illustrates a second type of environment in which tests are conducted to provide data for an automated web-analytics system.

FIGS. 4A-C illustrate the exchange of information between a user of a website and the remote computer system that serves the website both under normal conditions as well as during testing of a website.

FIGS. 5A-C illustrate three of many different possible methods by which website-testing services carry out tests of web pages served by remote web servers.

FIG. 9 shows the contents of an HTML file that encodes the exemplary web page shown in FIG. 8 and that includes simple modifications.

FIG. 13 shows the HTML modifications used to virtually incorporate a testing service into a web site.

FIGS. 16A-E illustrate the various types of data messages that are transmitted between computers in the example system shown in FIG. 14.

FIGS. 17A-B provide an example of the instrumentation inserted within a web page that carries out data collection.

DETAILED DESCRIPTION

The current document is directed to automated methods and systems for website testing. Because of the complexity of the method and systems to which the current document is directed, the following discussion is divided into a number of subsections that each refer to relatively large numbers of figures. In a first subsection, entitled "Overview of Website-Testing Systems," a general overview of web-analytics systems and of various implementations of web-analytics systems is provided. A second subsection, entitled "Collection of Information by Instrumentation and Supplementation of Collected Information," a particular implementation of instrumentation-based data collection is provided. A third subsection, entitled "Methods and System to Which the Current Document is Directed," discusses the currently disclosed methods and systems for preserving the continuity of temporal user threads over multiple user contexts.

It should be noted, at the onset, that the currently disclosed methods carry out real-world operations within physical systems and that the currently disclosed systems are real-world physical systems. Implementations of the currently disclosed subject matter may, in part, include computer instructions that are stored on physical data-storage media and that are executed by one or more processors in order to carry out website testing and to analyze results accumulated during website testing. These stored computer instructions are neither abstract nor characterizable as "software only" or "merely software." They are control components of the systems to which the current document is directed that are no less physical than processors, sensors, and other physical devices.

Overview of Website-Testing Systems and Other Service Systems

Figure 1:
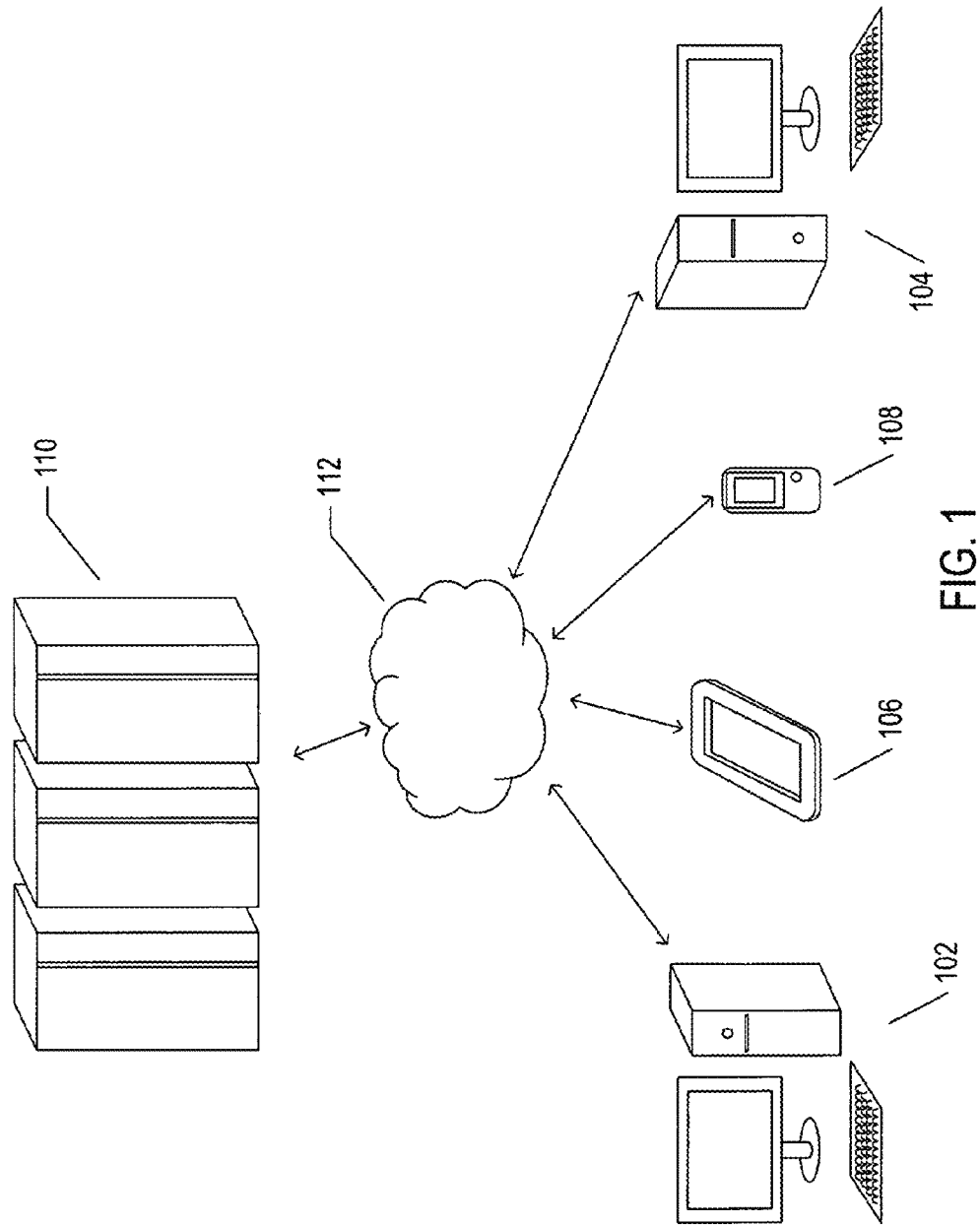
FIG. 1 illustrates an environment in which web analytics are conducted.

FIG. 1 illustrates an environment in which web analytics are conducted. Various users of a website employ a variety of different types of user devices, including personal desktop computers 102 and 104, electronic tablets 106, smart phones 108, and other such processor-controlled electronic devices to connect to a remote computer system 110 in order to access the pages of a website served by the remote computer system 110 through the Internet 112. Of course, each of the user devices, the remote computer system, and the Internet are extremely complex systems that would require thousands, tens of thousands, or more pages to describe in detail. As one example, a particular user device may access the websites served by the remote computer system through a local area network, various bridge and router systems, multiple wide-area networks, various routing systems, and a second local area network. In other cases, these systems may further include mobile-cell systems or public switched telephone networks.

The remote computational system 110 may be a single server computer, a larger system that includes multiple server computers, and an even larger, distributed system that may include a variety of different types of computer systems interconnected with local and wide-area networks, or server computers and other types of computers of a cloud-computing facility that provide virtual web servers and other virtual systems to a website owner. As another example, the remote computer system 110 may include hundreds of blade servers within blade-server enclosures, complex power supplies and other support components, network-attached mass-storage devices, including disk arrays, and many internal layers of control processes and application programs. In certain cases, the collection of data and the analysis of the collected data involved in web-analytics-based analysis of one or more tests may be carried out within the same remote computer system that serves web pages to users. In other cases, as discussed below, a separate web-analytics system carries out all or a portion of the website testing.

Figure 2:
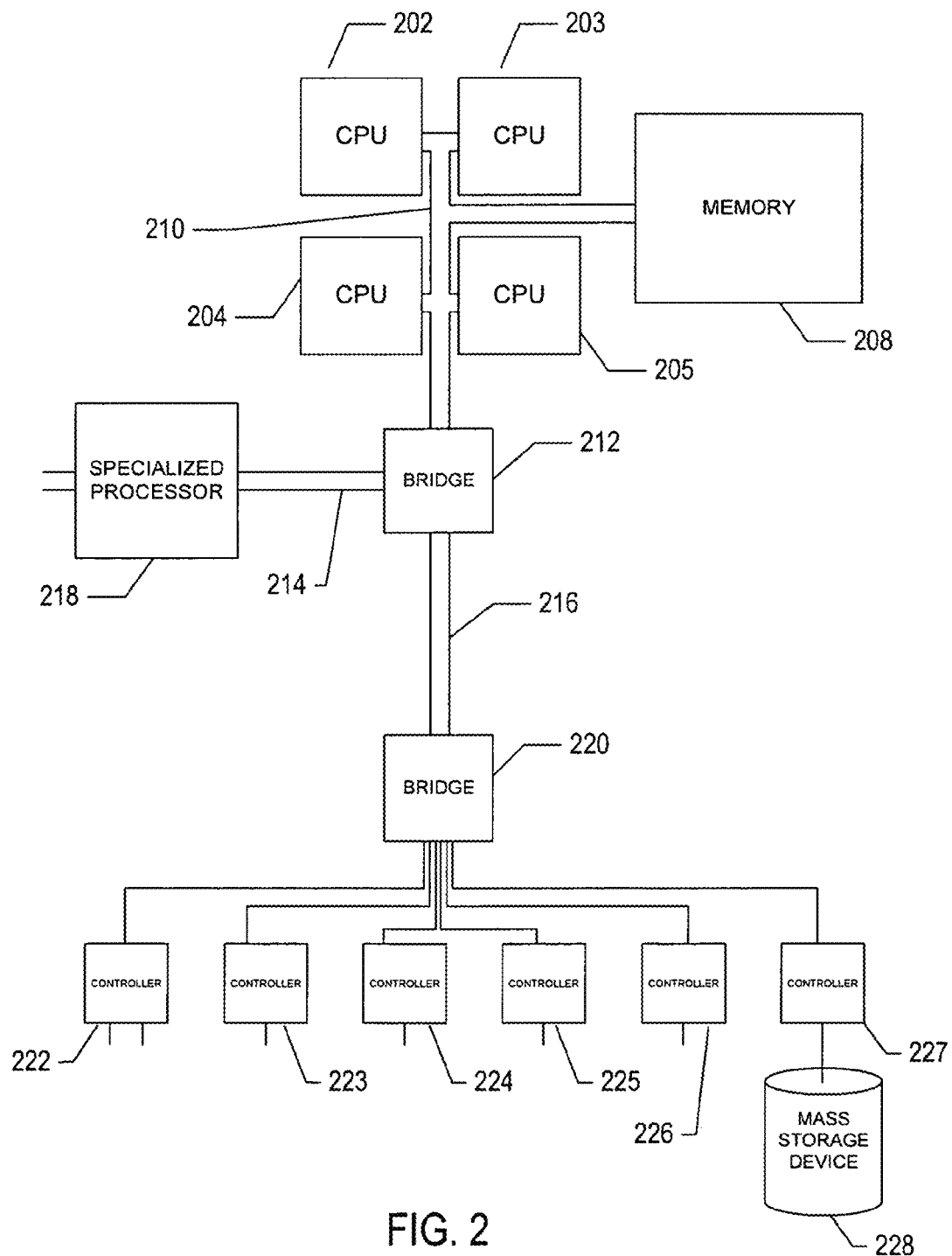
FIG. 2 provides a general architectural diagram for various types of computers.

FIG. 2 provides a general architectural diagram for various types of computers. The computer system shown in FIG. 2 contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational resources.

FIG. 3 illustrates a second type of environment in which tests are conducted to provide data for an automated web-analytics system. FIG. 3 uses the same illustration conventions as used in FIG. 1 and shows the same different types of user devices 102, 104, 106, and 108, the remote computer system 110 that serves a website accessed by users using these devices, and the Internet 112. The computational environment also includes another remote computer system 302 that carries out all or a portion of website testing and analysis of test results. This remote system, just as the website-serving system 110, may be a single computer system, multiple interconnected computer systems, a geographically distributed computer system, virtual computers and data-processing facilities provided by a cloud-computing facility, and other types of computational facilities.

Figure 4A:
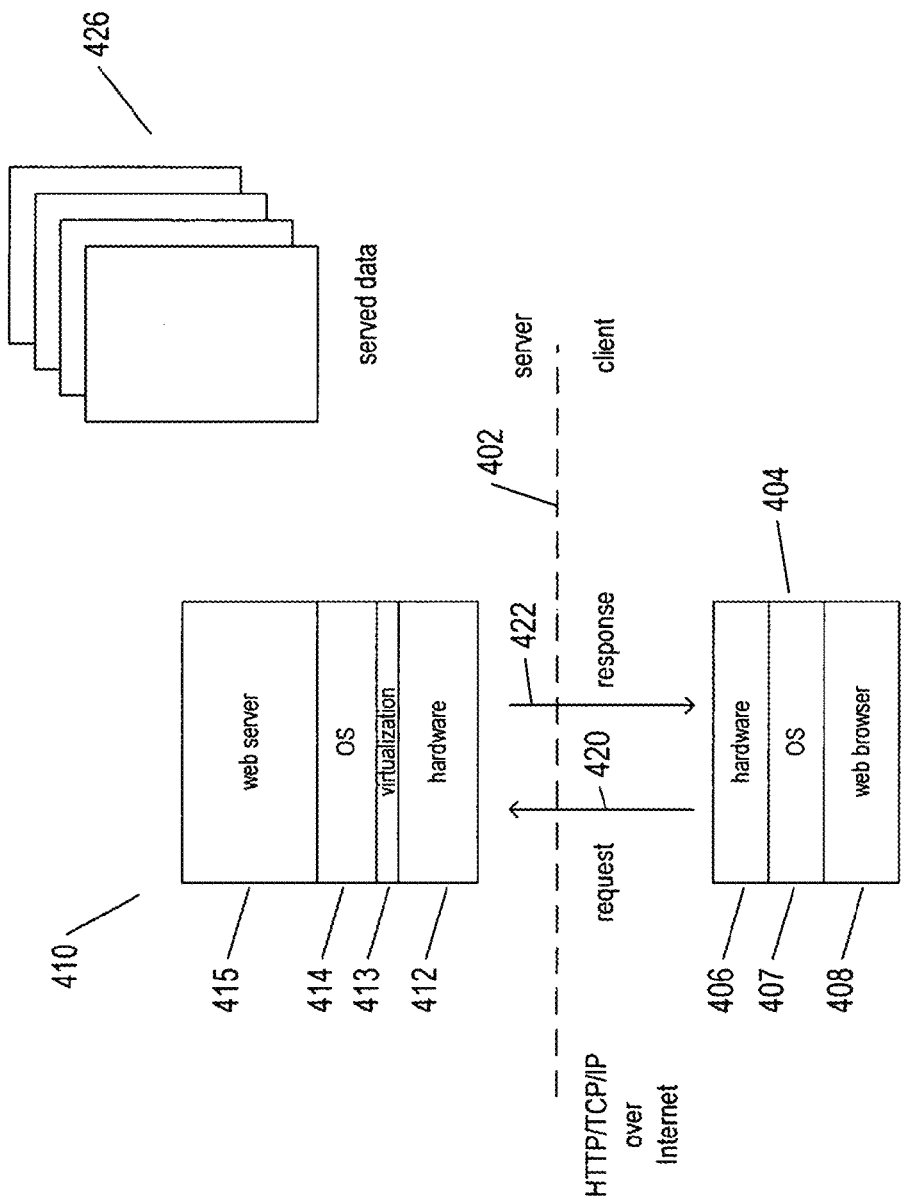

FIGS. 4A-C illustrate the exchange of information between a user of a website and the remote computer system that serves the website both under normal conditions as well as during testing of a website. FIG. 4A shows the basic components within the user device and remote web server. In FIG. 4A, dashed horizontal line 402 represents the boundary between the user or client device, below the dashed line, and the remote website-serving system, above the dashed line. The user device 404 is illustrated as having three fundamental layers: (1) a hardware layer 406; (2) an operating-system layer 407; and (3) a web-browser application program 408. The remote web-serving computer system 410 is similarly illustrated as having four fundamental layers: (1) a hardware layer 412; (2) a virtualization layer 413; (3) an operating-system layer 414; and (4) a web-server application program 415. The basic interaction between users, or clients, and the web-serving computer system is a client/server request/response protocol. In this protocol, clients initiate information exchange by making a request 420 to the server and receive the requested information in a response 422 transmitted from the web server to the client device. In order for the web browser of the client device to receive the information needed to display a particular web page to a user, a large number of request/response transactions may be carried out. Many different types of information may be requested by client devices and furnished by web servers, including hypertext markup language ("HTML") files, any of various different types of image files, such as .JPG files, executable code, audio files, streaming video, and other types of data. Often, the client/server protocol used for website access is a logical stack of protocols described as HTTP/TCP/IP over the Internet, where HTTP is the high-level hypertext transport protocol, TCP is a lower-level transmission control protocol, and IP is the still-lower-level Internet protocol. However, for any particular client and web server, many additional protocol layers may be involved to provide the high-level client/server request/response communications between a user device and the website-serving computer system. In general, the website-serving computer system 410 also stores at least a portion of the data 426 that is exchanged with user devices in order to display web pages on the user devices.

FIG. 4B illustrates a generalized sequence of events that occur during a single request/response transaction between the client and server. FIG. 4B, and FIG. 4C that follows, uses the same illustration conventions as used in FIG. 4A. In the example shown in FIG. 4B, the request sent from the client to the server is initiated by a user input, such as the click of a mouse when the mouse cursor overlays a hyperlink. The user's mouse click is sensed by the mouse controller in a first step represented by arrow 428. Note that, in FIG. 4B, and in FIG. 4C that follows, each step is represented by a curved arrow that is additionally annotated with a step number to indicate the sequence of operations underlying the request/response transaction. Hardware detection of the mouse-click event results in an interrupt being sent to the operating system. The operating system fields the interrupt, in a second step 430, determines that the interrupt represents an event to be handled by the web browser application running within the client device, and notifies the web browser of the occurrence of the event through a software interrupt, asynchronous call back, or some other mechanism by which events are transferred from the operating system to the application program to which the events are related. In a third step 432, the web browser handles the mouse-click event, using the mouse-cursor position to determine that the mouse-click event was directed to a hyperlink and then formulates a request to send to the web server that serves the web page represented by the hyperlink and requests transmission of the request from the operating system by calling a system call for transmitting the request message. In general, there may be additional transactions between the client device and a DNS server in order for the IP address of the web-serving computer system to be identified so that the request message can be directed to the website-serving computer system. Those additional request/response transactions are omitted from FIG. 4B in the interest of clarity and simplicity of illustration.

The operating system then processes the request through numerous protocol layers and passes the processed request to the hardware, in a fourth step 434, which carries out several additional lower-level protocol-based processing steps before transmitting the request message to a communications media that results in the request message traversing the Internet and arriving at the web server, in a fifth step 436. In this case, the primary hardware component involved in the message transmission, aside from internal busses or serial connections, is a network interface controller or wireless interface controller. Within the web server, the message is received by a complementary hardware controller and passed, in a sixth step 438 to the operating system of the web server. The operating system processes the received message and, in a seventh step 440, transfers the message to the web-server application running on the web server along with some type of software interrupt or asynchronous call back to alert the web-server application that a new message is available for processing. The web-server application processes the message contents and determines that the message represents a request for the HTML file that encodes a particular web page that is represented by the hyperlink initially clicked by the user of the user device. The web-server application, in an eighth step 442 then retrieves the HTML file and creates a response message containing the file, in a ninth step 444 that the web-server application passes to the operating system. The operating system then applies various protocol layers and passes the processed response message to the hardware layer, in a tenth step 446 for transmission back to the client device. In many cases, although not shown in FIG. 4B, the various protocol layers executed within the operating system result in the response message being broken up into a sequence of data messages, each containing a portion of the HTML file, which are then transferred one after another to the client device in multiple steps, all represented by the single eleventh step 448 in FIG. 4B.

When the HTML file has been received, possibly through multiple low-level messages, and assembled into memory by the client hardware layer and operating system, in a twelfth step 450, the HTML file is passed to the requesting web-browser application in a thirteenth step 452. The web browser then processes the HTML file in order to generate a series of commands to the operating system, in a fourteenth step 454, that result in the operating system transmitting a large number of low-level display commands to the display device, in a fifteenth step 456 that result in display of the requested web page to the user on the client-device display screen. In many cases, during processing of the HTML file, the web-browser application may need to carry out many additional request/response transactions in order to fetch image files and other files that contain content displayed within the web page in addition to the basic web-page description contained in the HTML file.

FIG. 4C illustrates additional operations carried out within the web server in order to conduct website testing under certain types of website-testing-service implementations. The same actions that occur for general serving of a web page, illustrated in FIG. 4B, also occur during testing of the website. However, as shown in FIG. 4C, the eighth step (442 in FIG. 4B) is now expanded to include two separate steps 460 and 462 and the web-server application 415 includes, or runs in parallel with, an additional layer of testing logic 464. When the web-server application receives the request for a web page, the request is forwarded to the testing logic in step 460. The testing logic then determines, from the identity of the requesting client or client device and the identity of the web pages being accessed, whether the access to the web page represents a testing event or, in other words, whether the web page and requesting client represent a user access that falls under monitoring of events that together comprise a website test. If so, then the testing logic may access different content, in step 462, for return to the client device than the content that would be accessed for a non-test request for the web page. In other words, the testing logic may systematically alter the web page returned to the client device as a portion of an experiment conducted within a time interval corresponding to a test of the web page. The testing logic may also, in certain cases, consider the web-page access to be the start of a session during which other requests made by the same client device are monitored and combined together as a logical user session from which test results can be derived. For example, in a certain class of web-analytics experiments, the test data may include an indication of whether or not the user purchases a product or service during a session while the web page is under test, referred to as a "conversion" event when the user purchases a product or service during the session.

Thus, website testing can be carried out by testing logic included within the web server that serves the web pages under test. After the test period has been completed, or as the test data is being recorded by testing logic, various types of analytical processing may be performed on the test data to derive various types of analytical results.

In many cases, however, the testing of websites and the analysis of test data involves significant complexities and the development of large and complex testing and analysis methodologies. It has therefore become increasingly popular for website testing and the analysis of data collected during website testing to be fully or partially carried out by website-testing services that execute on different, discrete website-testing-service computer systems.

Figure 5B:
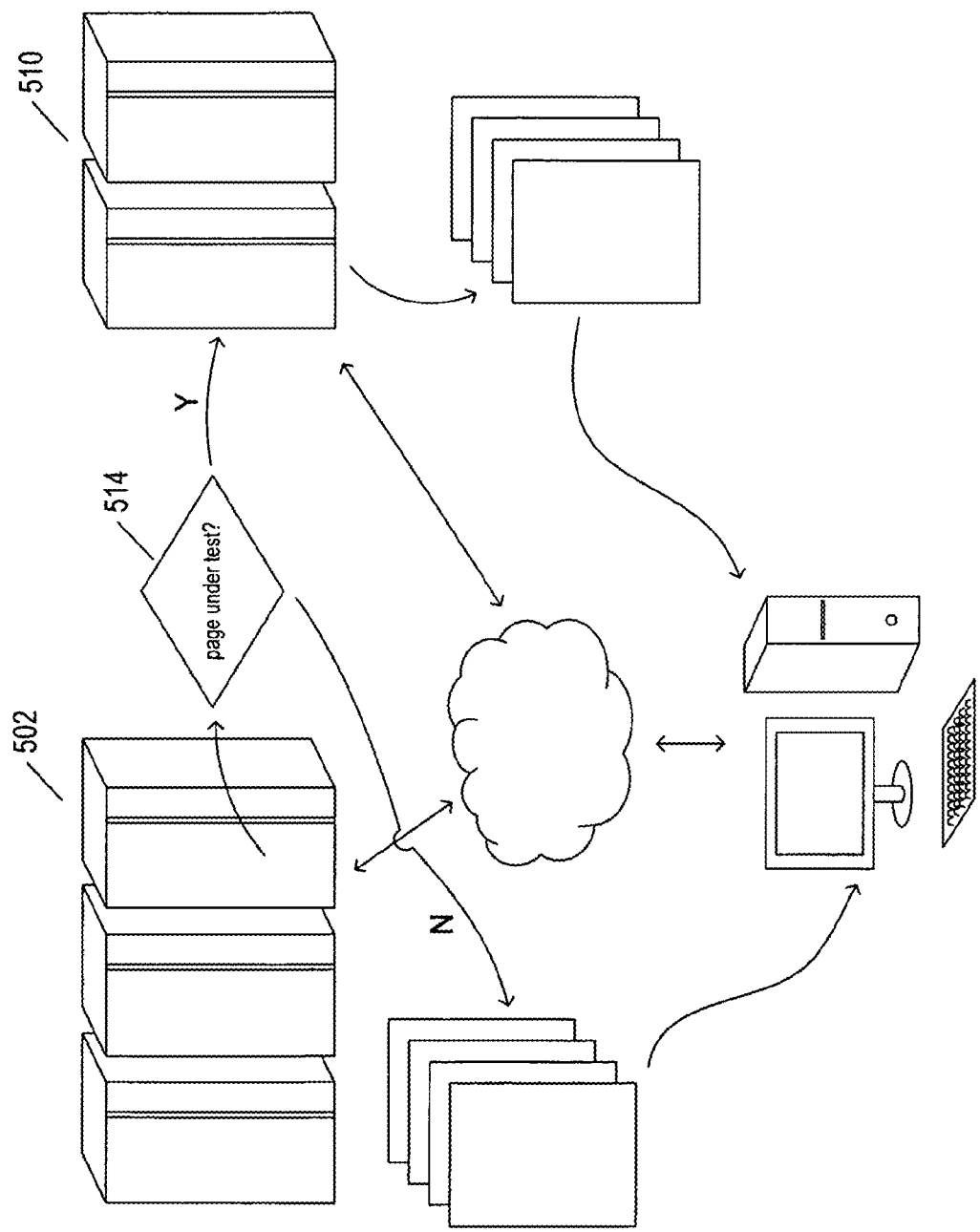
Figure 5C:
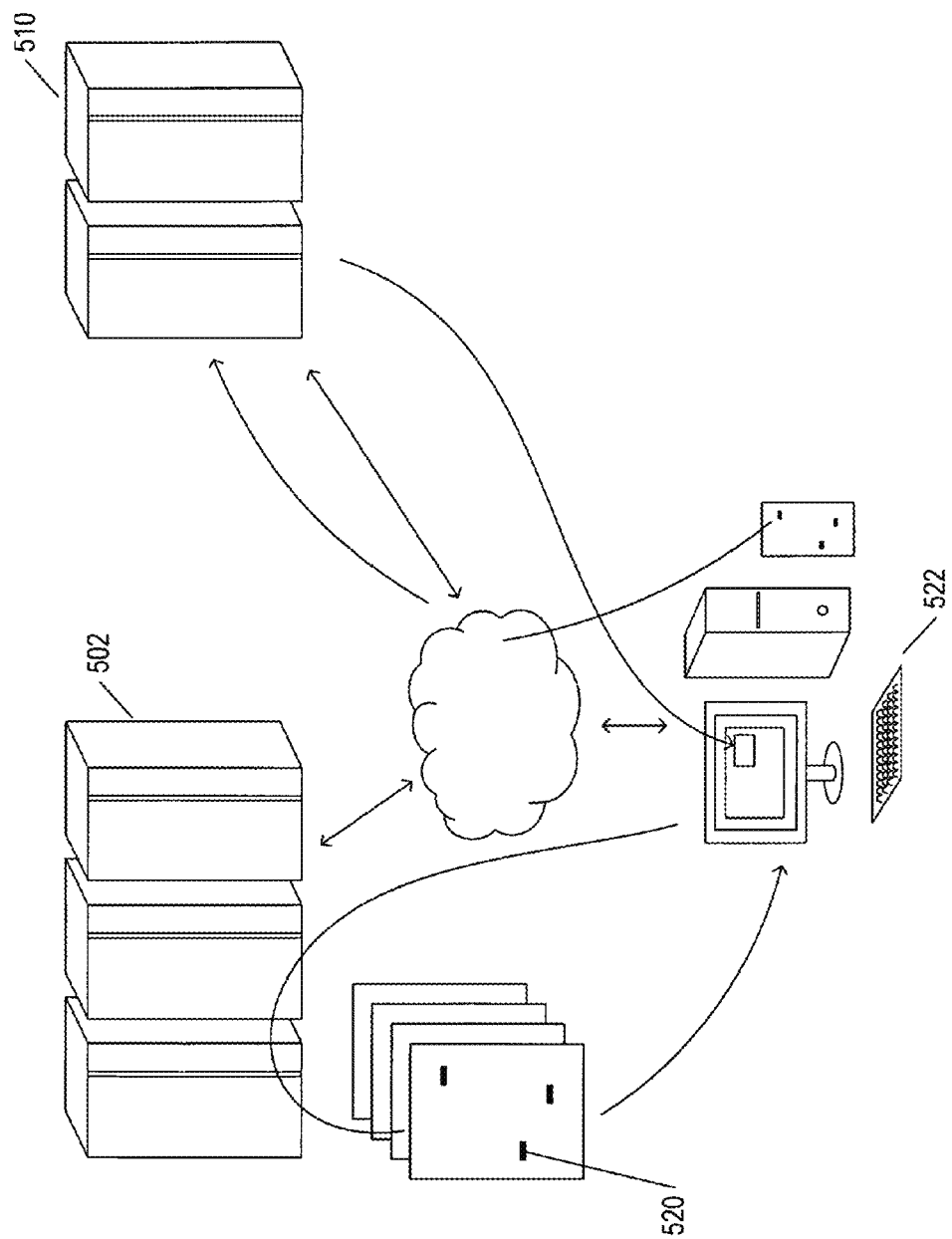

There are many methods for testing web pages by website-testing services. FIGS. 5A-C illustrate three of many different possible methods by which website-testing services carry out tests of web pages served by remote web servers. As shown in FIG. 5A, one approach is that, during the testing of a particular website, the web-server system 502 discontinues serving web pages, as indicated by the "X"-like symbol 504 overlying the double-headed arrow 506 representing request/response traffic between the web-server system 502 and the Internet 508. During testing, requests for web pages under test are redirected to the website-testing-service computer system 510, which serves the web pages under test to client devices in a fashion similar to that in which the web server 502 would normally serve web pages to requesting clients. In this case, the website-testing-service computer system 510 is provided, by the website owner, data for the web pages 512, including various alternative forms of web pages under test, as well as a test design so that the website-testing-service computer systematically provides altered web pages to clients and records client activities with respect to the web pages.

FIG. 5B illustrates a second approach to website testing. In this approach, client requests are initially forwarded to the web-server system 502. The web-server system includes logic to determine whether or not a requested page is currently under test 514. When the web page is under test, then the request is forwarded to the website-testing-service computer system 510 which transfers the requested web page back to the client device. Otherwise, when the requested page is not under test, the page is returned to the requesting client device by the web-server system 502. There are many different variations of this general scheme involving various types of proxy servers and reverse proxy servers.

FIG. 5C illustrates yet an additional type of implementation of a website-testing service. In this approach, various tags, represented in FIG. 5C by the small dark rectangles, such as rectangle 520, within HTML files that encode web pages are introduced into the web pages by the web-server system. These tags indicate portions of the web page that are varied during testing of the web page. When a client device 522 requests the web page, the request is handled by the web-server system 502 in the normal fashion, but the client device receives a tagged web page. As the browser on the client device begins to process the HTML file corresponding to a requested web page under test, the browser identifies and processes the tags by requesting the website-testing-service computer system 510 to return an encoding of the object represented by the tag for display by the browser. The website-testing-service computer system also can use information transferred by the client-device browser in order to monitor user activities, within user sessions, related to web pages under test and collect and process the test data to provide various types of analysis.

Figure 6:
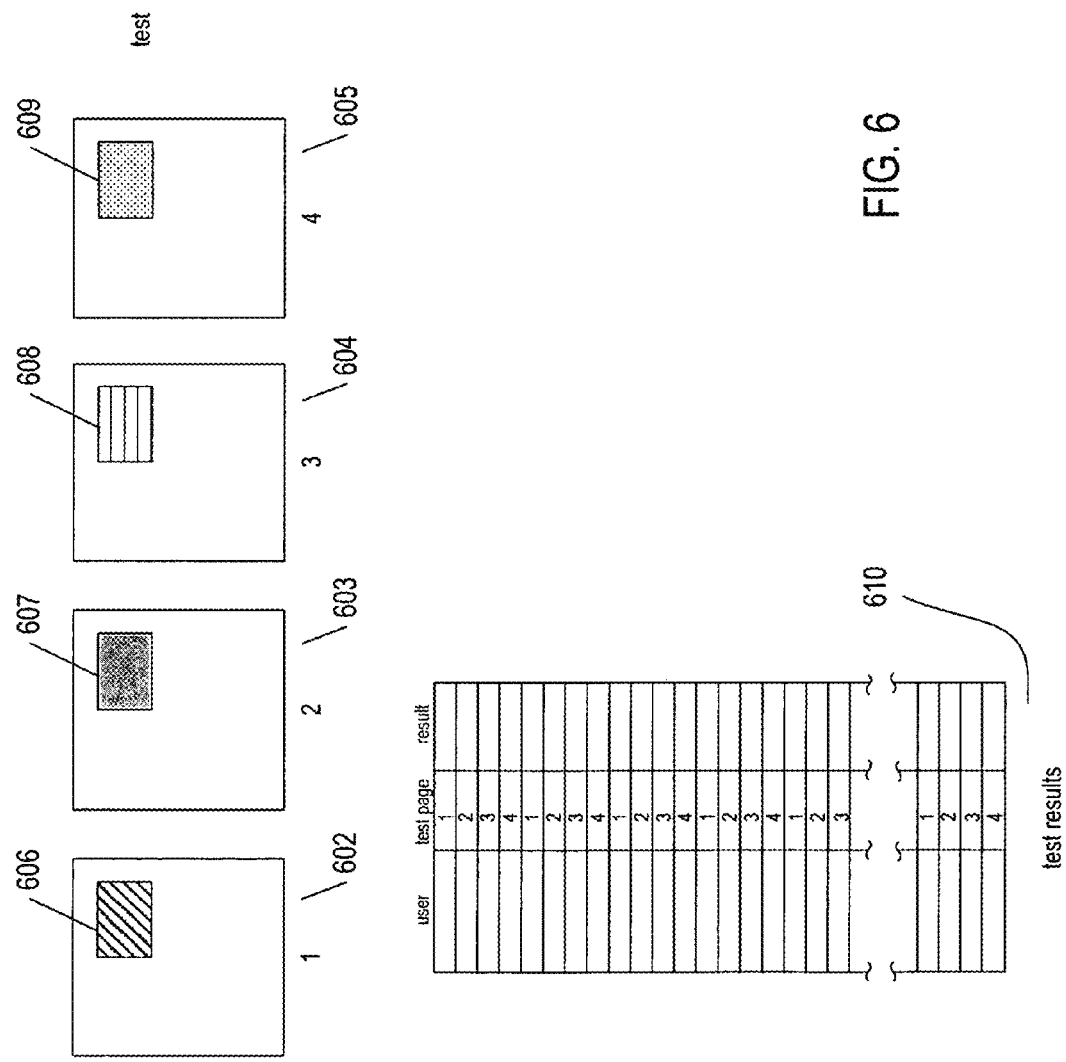
FIG. 6 illustrates single-factor testing.

There are two different fundamental types of testing that are commonly carried out on web pages. A first type of test varies a single object, region, or feature of a web page and is referred to as a "single factor" test. FIG. 6 illustrates single-factor testing. As shown in FIG. 6, the test may involve serving each of multiple different variants of a single web page 602-605. Each web page includes a particular object or region 606-609, the contents of which is varied to generate the multiple web-page variations. Then, a website-testing service or website-testing logic incorporated within a web server provides generally equal numbers of the different web-page variants to users who access the page during a testing interval, often randomly selecting a particular web-page variant to return to each next user who accesses the web page. Ultimately, the accumulated test results can be thought of as comprising a test-result table 610. In the example results table shown in FIG. 6, each row of the table represents an observation, and includes an indication of the user who accessed the test page, an indication of the particular test-page variant served to the user, and a result. As one example, the result may be a binary indicator that indicates whether or not the user completed a retail transaction within a session or time interval following access of the web page. There are many other different types of results that may be derived during web-page testing.

Figure 7:
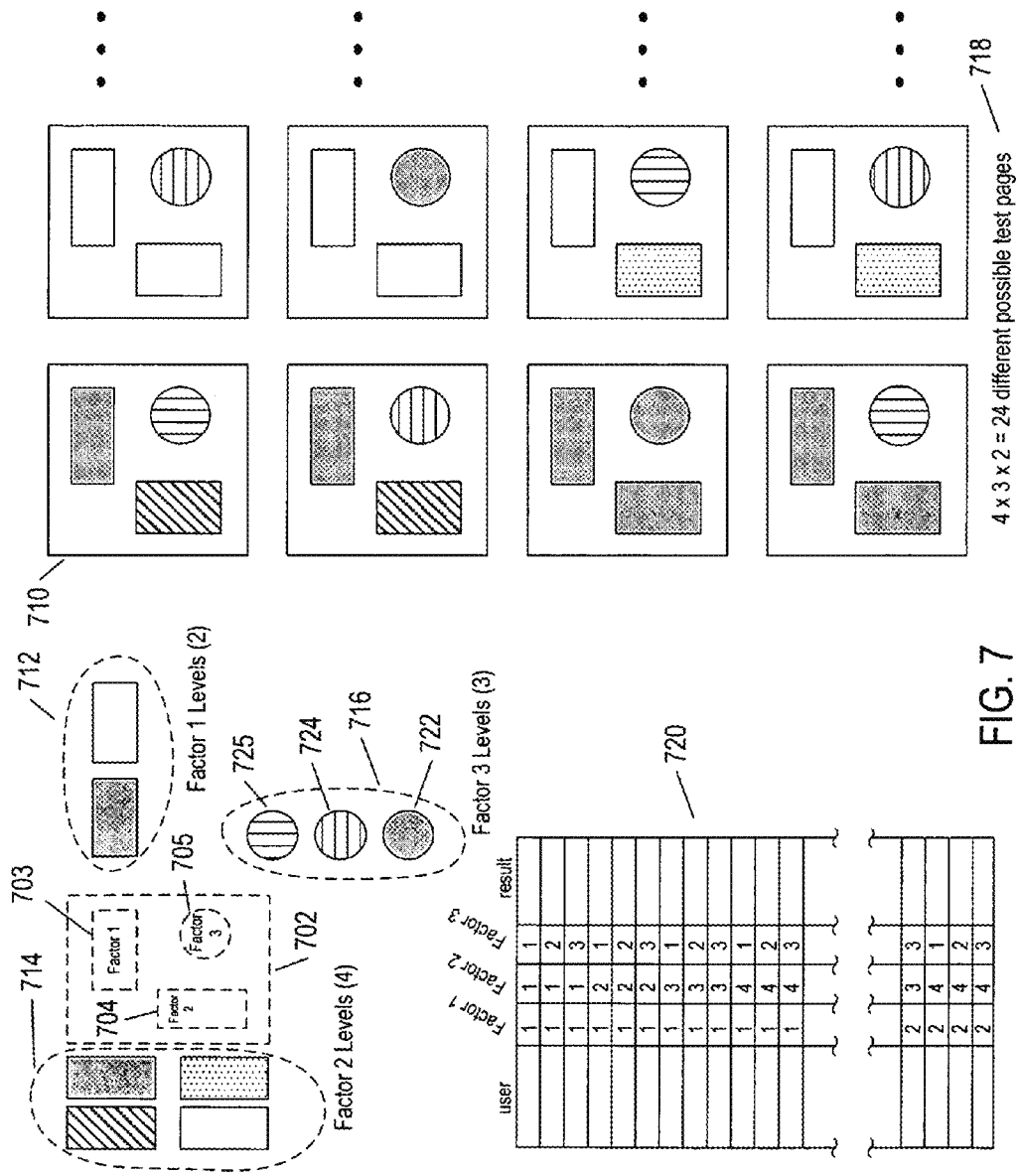
FIG. 7 illustrates a second type of web-page test, referred to as a "multi-factor/multi-level" test.

FIG. 7 illustrates a second type of web-page test, referred to as a "multi-factor/multi-level" test. In the second type of web-page testing, the web page being tested 702 includes multiple items, objects, or features 703-705 that are systematically varied to produce a relatively large number of different web-page variants, a portion of which 710 are shown in the right-hand portion of FIG. 7. The first object that is varied, factor 1 (703 in FIG. 7), includes two different variants, or levels 712, the second item or object within the web page that is varied, factor 2 (704 in FIG. 7), includes four different variants or levels 714, and the third item or object that is varied, factor 3 (705 in FIG. 7), includes three different variants or levels 716. As a result, there are 4×3×2=24 different possible test-page variants 718. Again, a website-testing service or website-testing logic embedded within the web server randomly selects a web-page variant from among the 24 different possible web-page variants to return to each next accessing user during a test interval, and collects observations or results that can be thought of as comprising a test-results table 720. In this test-results table, each row specifies an observation and includes an indication of the user, the level of each factor in the web-page variant served to the user, and a test result.

The goal of website testing is often to try various types of variants in a systematic fashion in order to identify factors that appear to be relevant with respect to a measured result as well as to identify particular levels of significant factors that positively contribute to desired results. For example, in the web-page-testing example of FIG. 7, it may be the case that of the three factors, only factor 3 significantly impacts whether or not users end up completing retail transactions. Furthermore, it may be determined that a solid-colored factor 3 (722 in FIG. 7) results in a larger percentage of completed retail transactions than either of the striped factor 3 variants 724-725. Thus, website testing may allow the website owner to determine that, by including a solid-colored factor 3 object in web pages, a greater proportion of accessing users will end up completing retail transactions through the website. Alternatively, the result of the experiment illustrated in FIG. 7 may encourage the website owner to devise additional tests to test a greater number of possible variants for factor 3, having concluded that factor 3 is the significant factor that determines whether or not retail transactions are completed by those who access the web page. Note that, although factor levels are illustrated in FIG. 7 as different colors or patterns within a rectangular object, factor levels may include one or more of a wide variety of differences, including differences in textural content of features, different images, different colors and shading, different font sizes, and many other such differences.

As discussed further, in subsequent subsections, the approach to website test discussed with reference to FIG. 5C provides potential advantages for web analytics, and is therefore the approach used in implementations discussed below. Further details of the approach are described in the following subsection.

Figure 8:
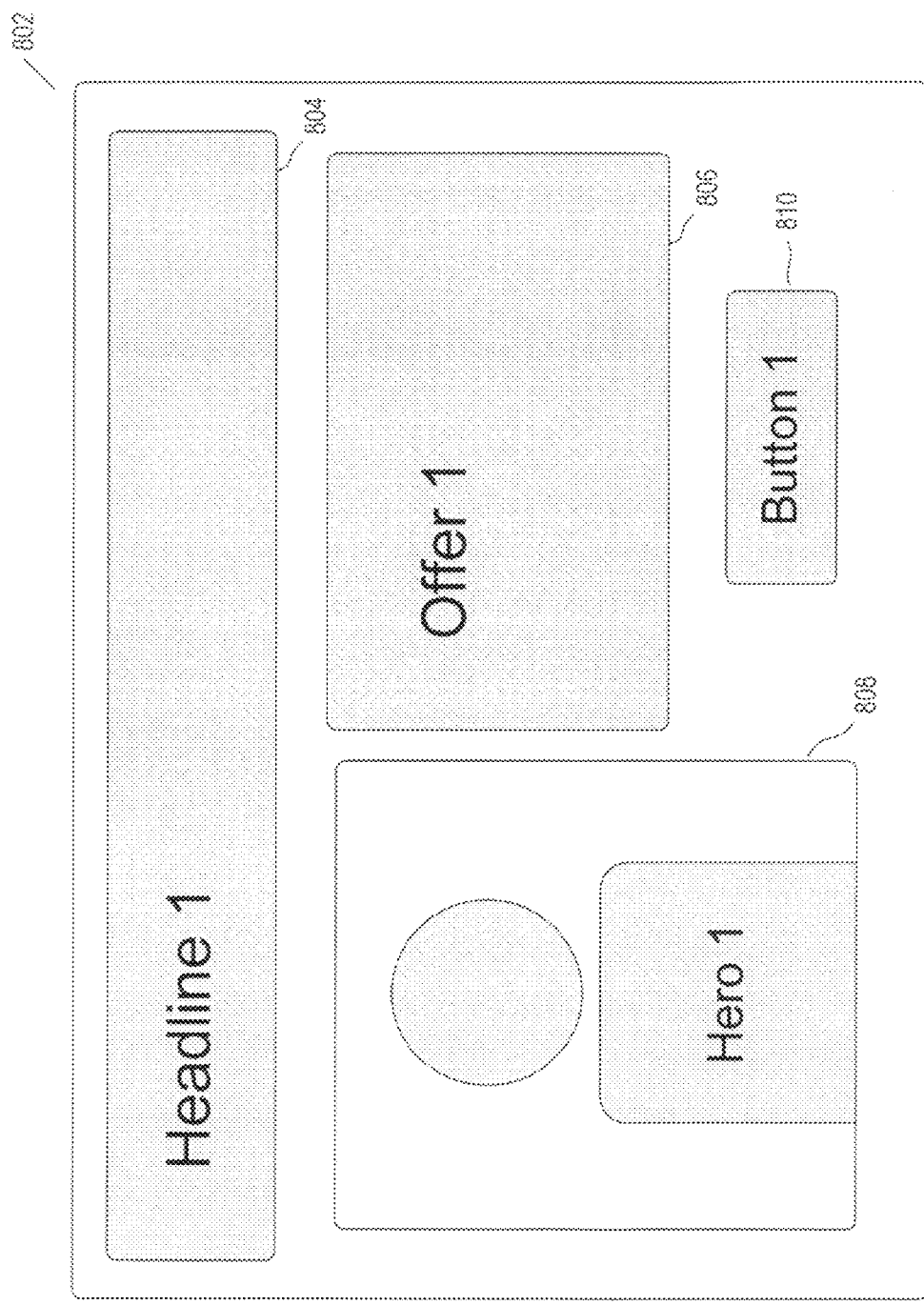
FIG. 8 shows a simple, exemplary web page.

Collection of Information by Instrumentation and Supplementation of Collected Information FIG. 8 shows a simple, exemplary web page. A web page is described by an HTML file, discussed below, which is processed by a web browser executing on a computer in order to generate a web page, as shown in FIG. 8, that is displayed to a user on a display device. The exemplary web page 802 includes a headline graphic 804, an offer graphic 806, a hero graphic 808, and a button graphic 810. The exemplary web page is subsequently discussed in the context of tests and experiments in which altered versions of the web page are provided to users of the web server that serves the web page in order to test the effects of modifications to the web page.

FIG. 9 shows the contents of an HTML file that encodes the exemplary web page shown in FIG. 8 and that includes simple modifications. The modifications, used to virtually incorporate a testing service into a website are discussed below, with reference to FIG. 14.

A complete discussion of HTML is beyond the scope of the current discussion. In FIG. 9, portions of the HTML file are correlated with features in the displayed web page shown in FIG. 8. In addition, general features of HTML are illustrated in FIG. 9. HTML is hierarchical, in nature. In FIG. 9, double-headed arrows, such as double-headed arrow 902, have been drawn to the left of the HTML code in order to illustrate tags and tag scoping within the HTML file. In general, HTML statements are delimited by a pair tags, and are hierarchically organized by scope. For example, an outermost statement begins with a first tag of a tag pair that begins with the text "<html xmlns=" (904 in FIG. 9) and ends with a last tag of the tag pair that begins with the text "</HTML" (906 in FIG. 9). The scope of outermost statement encompasses the entire HTML code. The double-headed arrow 902 at the left of the HTML code, which represents the scope of this statement, spans the entire HTML file. A second-level that begins with the first tag of a tag pair "<head>" 908 and ends with the last tag of the tag pair "</head>" 910 spans a first portion of the HTML file, as indicated by double-headed arrow 912, and a second statement bounded by the first and last tags of a tag pair "<body>" 914 and "</body>" 916 span a second portion of the HTML file, indicated by double-headed arrow 918. By examining the tags within the exemplary HTML file, shown in FIG. 9, and the double-headed indications of the scope of tag-delimited statements, the hierarchical nature of HTML can be readily appreciated.

Figure 10:
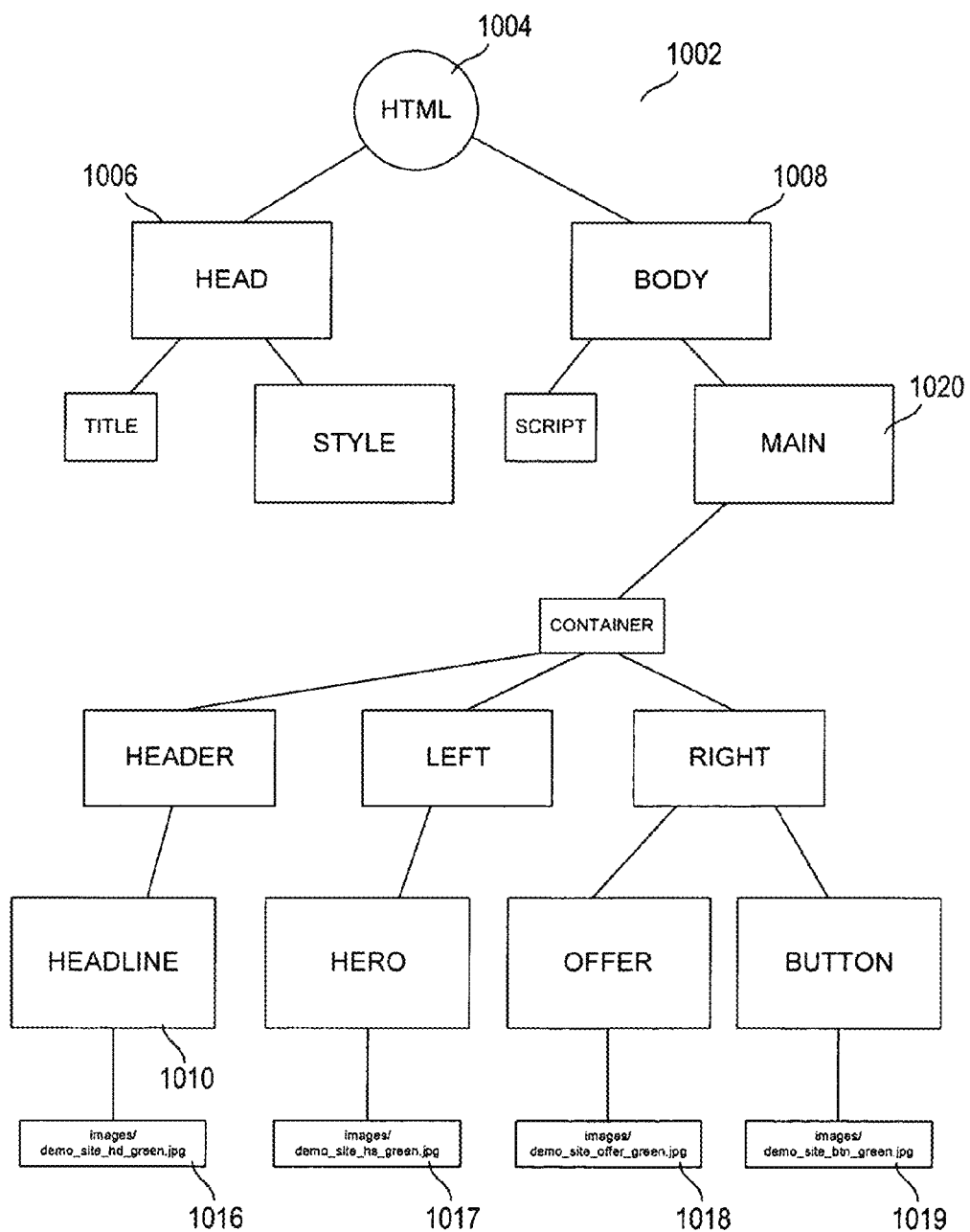
FIG. 10 provides a tree-like representation of the contents of the exemplary HTML file shown in FIG. 9.

FIG. 10 provides a tree-like representation of the contents of the exemplary HTML file shown in FIG. 9. The tree 1002 shown in FIG. 10 is constructed from the double-headed arrows that annotate the HTML code, in FIG. 9, that span the scopes tag-delimited statements in the exemplary HTML file. For example, the root node 1004 corresponds to double-headed arrow 902, and the second level "head" 1006 and "body" 1008 nodes correspond to double-headed arrows 912 and 918 in FIG. 9, respectively. Note that, at the very bottom of the tree representation of the HTML file, shown in FIG. 10, the four leaf nodes 1016-1019 represent the four features 804, 806, 808, and 810 of the displayed web page encoded by the exemplary HTML file, shown in FIG. 8. Each of these nodes is essentially a reference to an image file that contains a jpeg image of the corresponding web-page feature. The head statement, represented by node 1006 in FIG. 10, includes formatting information, references to highest-level resource-location directories, and a great deal of additional information that is used by a browser to plan construction of a displayed web page. The body statement, represented by node 1008 in FIG. 10, includes references to image files, text, and other features that are rendered by the browser into displayed features of the web page. Intermediate nodes include identifiers, particular met-data information, and references to scripts that are downloaded and run by the web browser during web-page rendering and/or display.

As a specific example, node 1016, a direct and only descendant of the node labeled "headline" 1010 in FIG. 10, corresponds to the headline feature 804 displayed in the exemplary web page shown in FIG. 8. This node also corresponds to double-headed arrow 920 in FIG. 9. The statement "<img src="images/demo_site_hd_green.jpg" indicates that the displayed object is encoded as a jpeg image "demo_site_ offer_green.jpg" that can be found in a file-system sub-directory "images."

In order to transform an HTML file into a displayed web page, a web browser constructs a tree-like binary-encoded data object referred to as a "document object model" ("DOM.") The exact contents and structure of a DOM is beyond the scope of the present document. However, implementations of testing and analytics services may rely on standardized DOM-editing interfaces that provide routines to identify nodes and subtrees within a DOM and to edit and modify identified nodes and subtrees. Once a browser has created a DOM from the exemplary HTML file shown in FIG. 9, DOM-editing routines can be used to locate the node in the DOM corresponding to the node "headline" 1010 in FIG. 10 and replace or modify that node to reference a different image. Following modification, the web browser would then display a modified web page in which the headline image 804 in FIG. 8 is replaced by a different image. To effect more dramatic changes, an entire subtree of a DOM, such as the subtree rooted by a node corresponding to the node "right" 1020, can be removed or replaced, to change groups of display features. While various testing and analytics systems, discussed below, uses DOM tree modification techniques, other types of modification techniques provided by interfaces to other types of binary representations of web pages may be used, in alternative implementations. The DOM is only one of many possible binary representations that may be constructed and employed by web browsers.

Another feature of the exemplary HTML file shown in FIG. 9 is that the various features displayed in FIG. 8 are, in HTML, wrapped by tag-delimited identifiers. For example, the "wm_headline" tag indicated by double-headed arrow 920 and by node 1010 in FIG. 10 is an identifier for the headline-image-reference statement 922. Alphanumeric identifiers, such as the identifier "wm_headline," are introduced into an HTML file in order to give easy-to-understand and easy-to-use labels or handles for various objects, particularly objects that correspond to displayed features in a web page. Although objects can be easily identified in this manner, other methods for identifying objects within an HTML file, as well as corresponding nodes of DOM trees and other such binary representations of a rendered page, can be used to reference display objects.

Figure 11A:
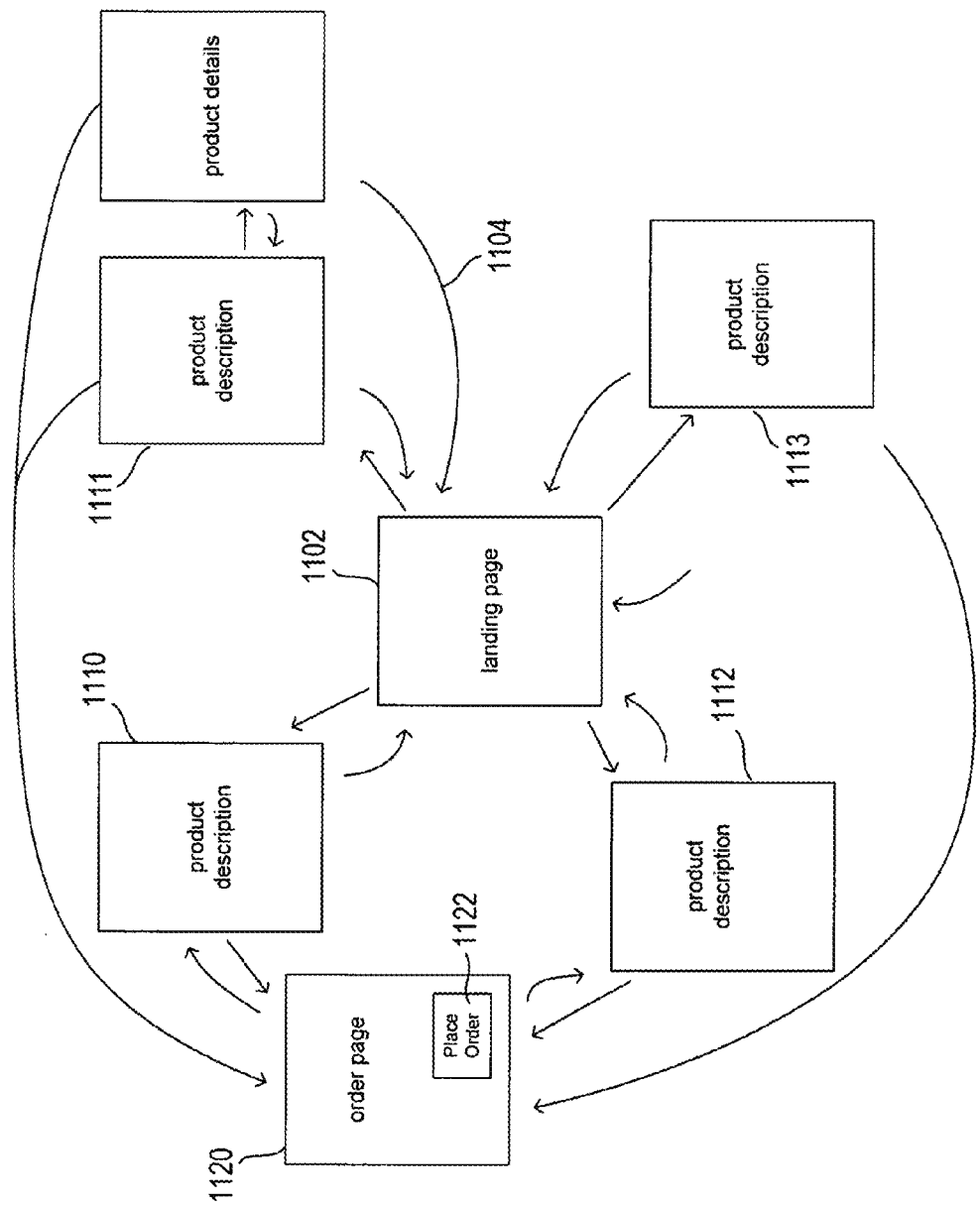
FIG. 11A illustrates a simple web site comprising seven web pages.

FIG. 11A illustrates a simple web site comprising seven web pages. Each web page, such as web page 1102, is represented by a rectangle in FIG. 11A. Curved arrows, such as curved arrow 1104, indicate navigational paths between the web pages. Accessing the web site illustrated in FIG. 11A, a user generally first accesses a landing page 1102 as a result of clicking a link provided by another web page, such as a web page provided by a search engine, or provided in a list of bookmarked links by a web browser. The landing page is often, but not necessarily, a home page for the website. A home page is a central portal for access to all of the remaining web pages in the web site. In general, a user navigates through the web site by clicking on displayed links embedded in web pages. For example, the web site illustrated in FIG. 11A is a retailing web site. The landing page provides links to four different pages 1110-1113 that provide product descriptions for four different products. A user, after viewing the landing page 1102, may click a link in order to navigate to a display of a product-description page 1150. In the exemplary web site shown in FIG. 11A, a user may subsequently navigate from a product-description page or product-details page to a central order page 1120 that contains a button or feature 1122 to which the user can input a mouse click in order to order one or more products. In certain cases, web sites may comprise a single page and, in other cases, a web site may comprise tens to hundreds or more pages, linked together in a network-like graph describing various navigational paths between web pages.

An example application of web-site testing would be to monitor access, by users, of the web pages shown in FIG. 11A in order to attempt to determine how often users end up navigating to the order page and clicking the place-order button 1122. One might then modify one or more of the pages, and again monitor users' access to the pages and subsequent input to the place-order button 1122. In this way, by testing collective user response various alternative web pages, web-site developers and managers may be able to determine an optimal set of web pages that provides the highest ratio of inputs to the place-order button 1122 to user accesses of the landing page 1102. In testing parlance, clicking the place-order button 1122, in the exemplary web site shown in FIG. 11A, is, in this example, considered to be a conversion event. One goal of optimizing the web site might be to increase the percentage of users clicking on the place-order button 1122 after initially accessing the landing page 1102. However, conversion events may be arbitrarily defined, and there may be multiple conversion events for a particular web site. Optimization of a web site may also involve multiple, often at-least partially contradictory goals. One goal may be to increase the number of accesses to any page other than the landing page by users who have initially accessed the landing page. Another goal may be to increase total accesses to the landing page, regardless of subsequent page accesses by users accessing the landing page. Another goal may be to obtain maximum possible conversion rates, even at the expense of decreasing the overall rate of page accesses.

Figure 11B:
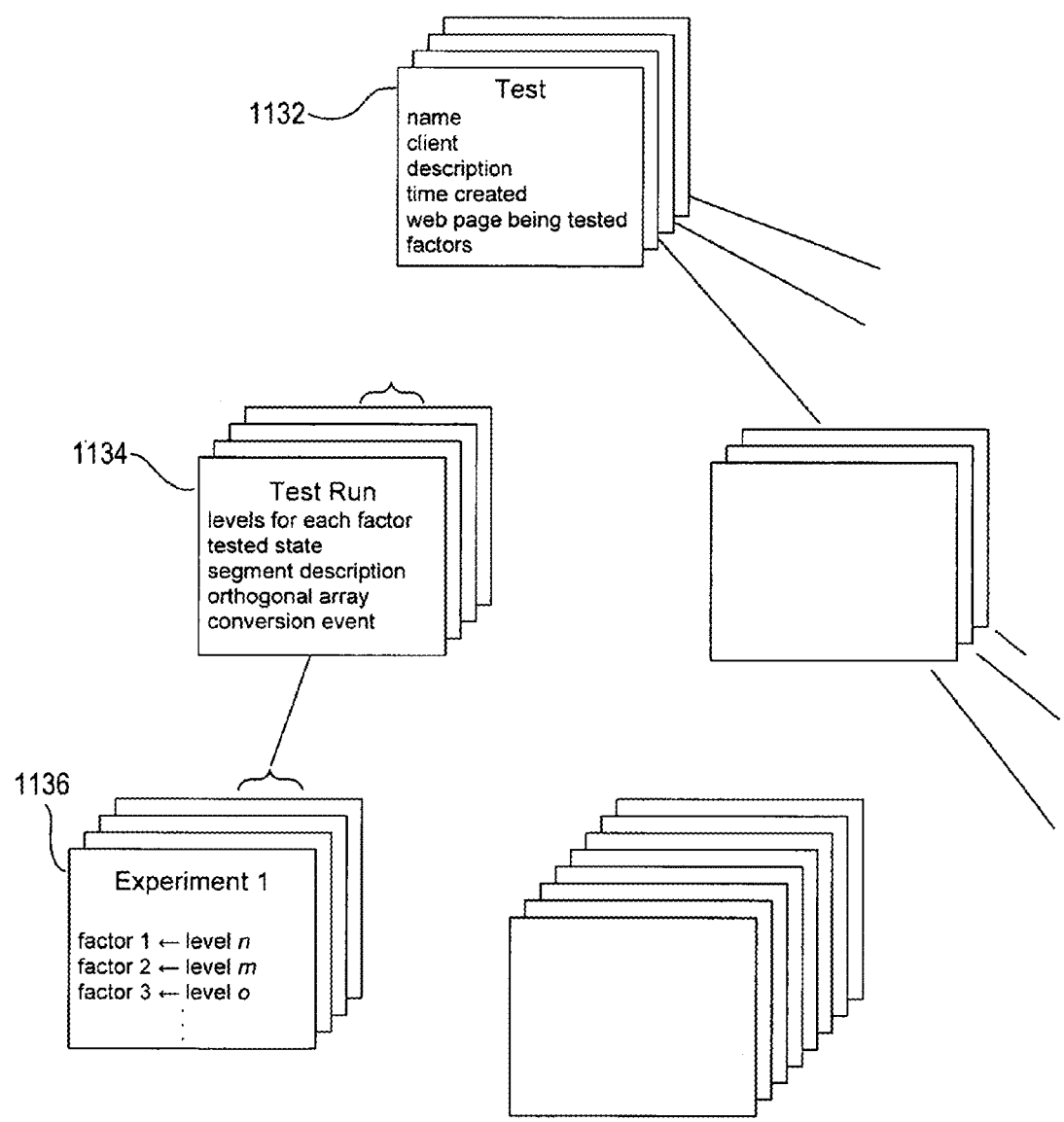
FIG. 11B illustrates the data and data structures that define tests, test runs, and experiments.

FIG. 11B illustrates the data and data structures that define tests, test runs, and experiments. A testing service may, at any given time, carry out a large number of different tests for many different client web-site-based organizations. Each test is defined by a test record, such as test record 1132 in FIG. 11B. Information contained in the test record includes an alphanumeric name of the test, an identifier for the client on behalf of whom the test has been created, a description of the test, an indication of the time that the test was created, an indication of the web page that is tested by the test, and a list of the factors that may be involved in any particular test run associated with the test. Note that the factors can be specified by the identifiers associated with features or objects displayed in the web page. For example, referring to FIGS. 8-10, a list of factors for a test of the exemplary web page shown in FIG. 8 may include the alphanumeric strings: "wm_headline," "wm_hero," "wm_offer," and "wm_button."

Any particular test may be carried out over a series of test runs. For example, each test run may be carried out at a different time, with respect to a different segment of users, and may test a different array of features and feature levels. Thus, each test record, such as test record 1132 in FIG. 11B, may be associated with one or more test-run records, such as test-run record 1134 in FIG. 11B. Test-run records include information such as the levels to be used for each factor, with the levels specified as URLs, or other references to images and other resources, or as text strings or other data directly displayed by the browser, a current state of the test run, a description of the segment to which the test run is directed, an indication of the particular orthogonal-array basis or other test design for the test run, and an indication of one or more conversion events for the test run. Finally, using the orthogonal-array basis or other test design selected for the test run, a test run is associated with a set of experiments, such as experiment 1136 in FIG. 11B. Each experiment corresponds to an altered web page that is displayed to users during the test run. An experiment is essentially defined by associating each factor, tested in the test run, with a particular level, or referenced resource, according to a matrix of test pages generated by the orthogonal-array basis or other test design selected for the test run.

Figure 11C:
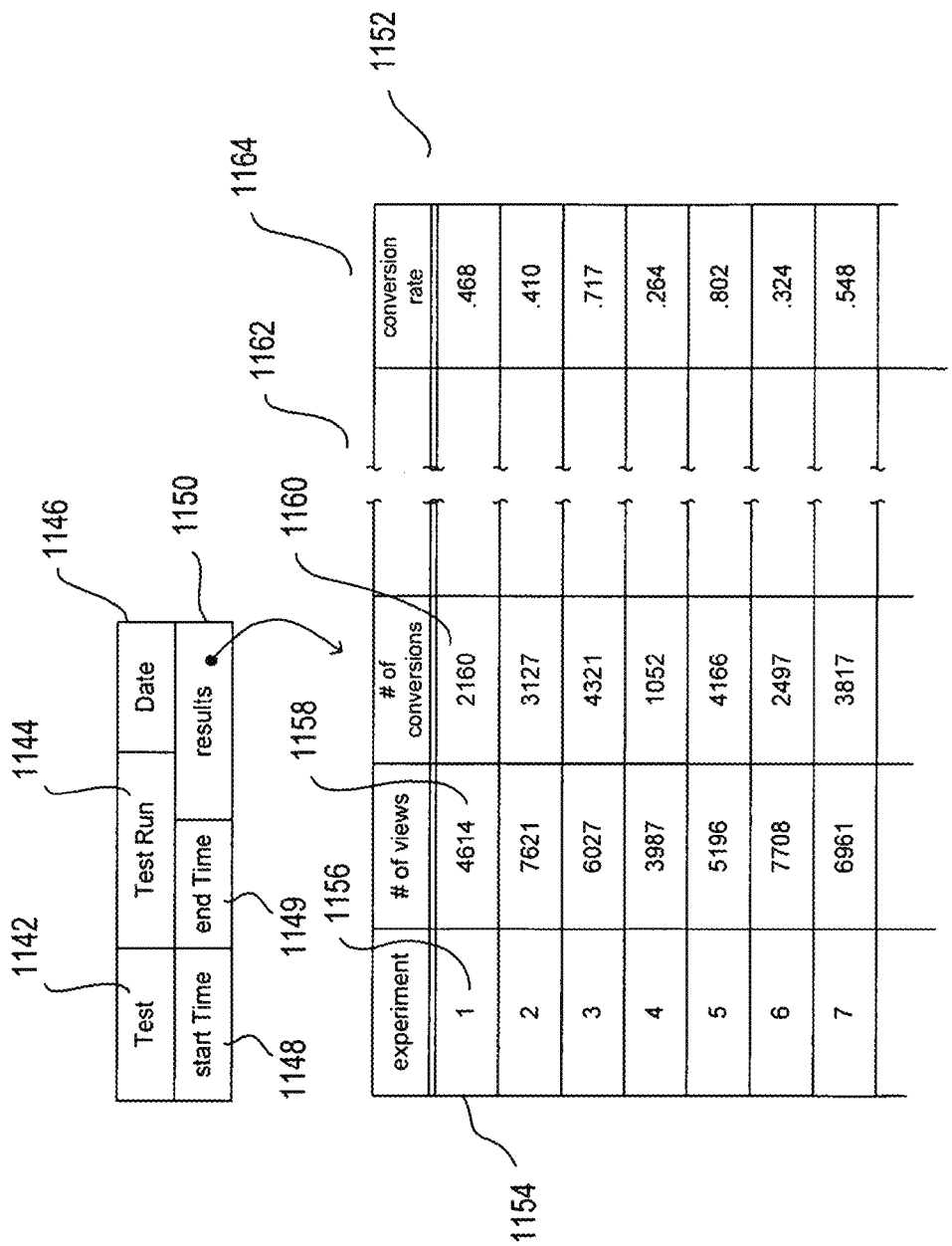
FIG. 11C illustrates the nature of the statistics, or test results, that are collected for a particular test run.

FIG. 11C illustrates the nature of the statistics, or test results, that are collected for a particular test run. The results include indications of the test 1142 and test run 1144, the date on which the test run was conducted 1146, a start time and an end time for the test run 1148-1149, and a reference 1150 to a results table 1152 in which test results are tabulated. The test results table includes a row for each experiment associated with the test run, such as row 1154 in experimental-results table 1152. The row includes an indication of the experiment to which the row corresponds 1156, a count of the number of the times that the page corresponding to the experiment was accessed by a user of an active segment 1158, an indication of the number of times that a user who accessed the test page generated a corresponding conversion event 1160, other similar numerical information in additional columns 1162, and, finally, a computed conversion rate 1164 for each experiment. The test results shown in FIG. 11C are but one example of the type of statistics and data that can be collected during a test run. Different or additional statistics may be collected by different implementations of testing and analytics, or according to different test configurations created by test-service clients.

There are many different possible ways of testing a web server in order to accumulate test results, discussed above with reference to FIG. 11C, for tests defined for particular web pages and factors associated with those web pages, as discussed above with reference to FIG. 11B. One method would require the web server to design a test by creating all or a subset of possible alternative test pages and to then develop a test-page-serving system that would execute concurrently with, or as part of, the web server on an intermittent or continuous basis. As discussed above, testing methods and systems that require the web server to develop and run tests may be prohibitively expensive, both in time and resources, for web-site owners or web-site-based organizations. Furthermore, such testing methods can inadvertently cause serious financial losses and other non-financial damage to a web site. For example, were the test pages improperly constructed or served, sales or other activities generated by real-time users may be lost and, in worst cases, the web site could potentially lose business from particular customers and users altogether. Real-time testing additionally involves significant security risks. A malicious hacker or employee might be able to alter the test system to display fraudulent or offensive test pages, for example. Finally, similar to problems encountered in a variety of physical and behavioral systems, poorly or improperly design tests may so perturb the system being tested that the statistics collected from the tests are meaningless or, in worst cases, lead to false conclusions. For example, a poorly designed test engine may introduce significant delays in web-page service to customers or users. As a result, the conversion rate measured during a test run may fall precipitously, not because of particular alterations made to test web pages, but instead because the significant time delay encountered by users for whom the test page is constructed and to whom the test web page is transmitted. For these, and many other reasons, web-site-based-organization test design and execution can be undesirable and, in worst cases, disruptive and damaging to the web-site-based organization.

An alternative approach involves using a third-party testing service, in tandem with the web server that serves the web site to be tested. However, simply conducting tests by a third-party server does not guarantee that the many pitfalls and disadvantages discussed above with respect to web-site-based-organization test design and execution are necessarily avoided. In fact, in many cases, the pitfalls and disadvantages discussed in the preceding paragraph may be exacerbated by third-party testing of web sites and web servers. For example, in the case that a test web page, requested by a customer, needs to be prepared by the third-party server, in response to a request generated by the web site as a result of a user request for the web page being tested, test-page serving may be significantly delayed, deleteriously perturbing the users' interaction with the web server to the point that the test statistics end up meaningless or misleading. As another example, security issues may be compounded by distributing testing tasks between a web-server computer system and a third-parting testing server. Currently discussed implementations employ an array of techniques and features that address these pitfalls and disadvantages, and that provide minimally intrusive and cost-effective testing for web sites and web servers.

FIGS. 12A-H illustrate the general method and system for web-site testing used in currently described implementations. FIGS. 12A-H all use the same illustration conventions, in which large rectangles 1202, 1206, 1212, and 1216 represent a client computer, client web server, web-server customer, and a testing service. The client computer and client web server are operated by a web-site owner or organization that is a client of the testing service. The web-server customer is a user who accesses a web site served by the client web server.

Figure 12A:
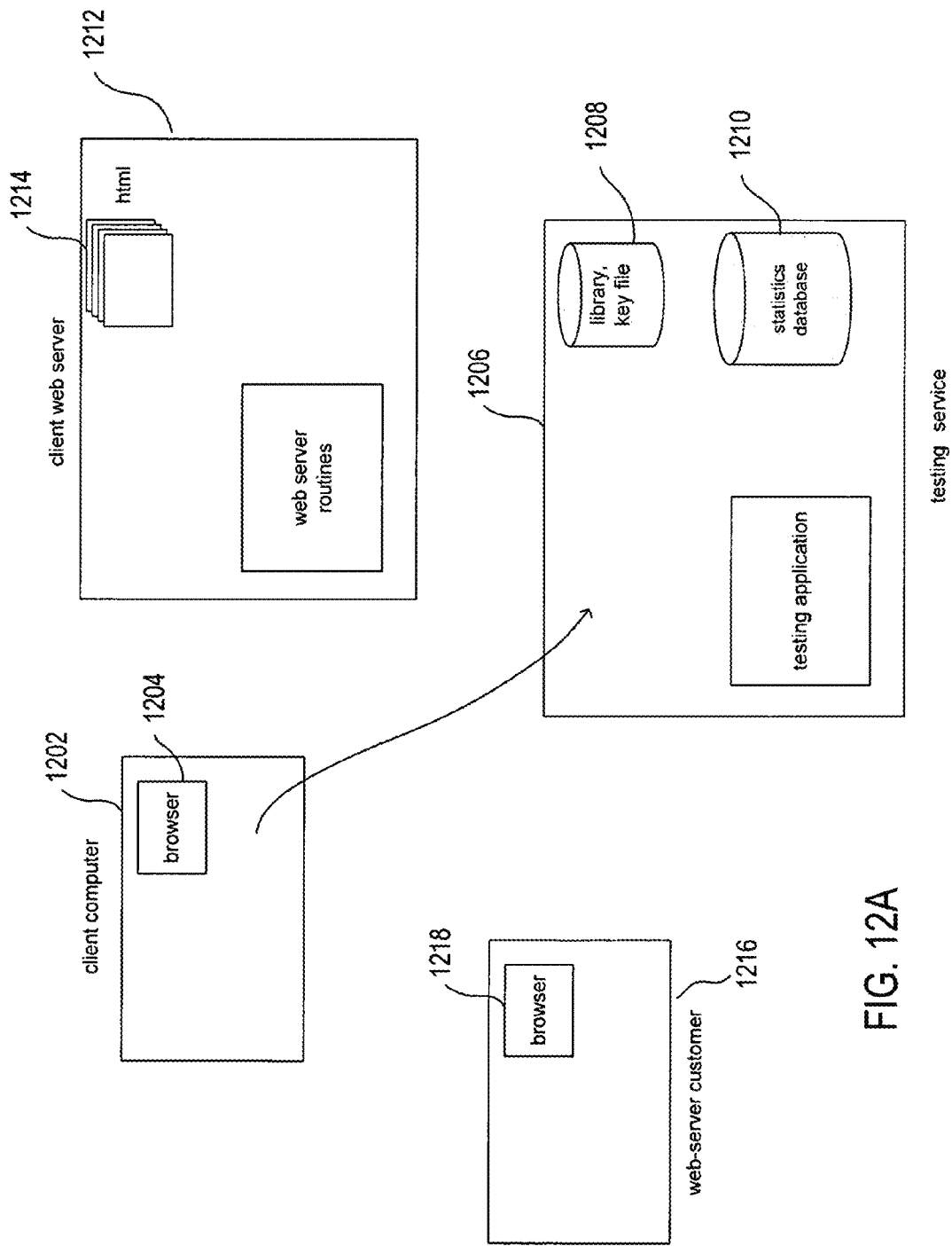
FIGS. 12A-H illustrate the general method and system for web-site testing used in currently described implementations.

A client establishes a relationship with the testing service, as shown in FIG. 12A, by accessing the testing service through a browser executing on the client computer. As shown in FIG. 12A, an employee or owner of the client web server uses the client computer 1202 to access a testing-service web site, via a browser 1204 running on the client computer, which allows the client web server to register as a client of the testing service. The testing service 1206 includes one or more databases 1208 and 1210 that store information used to construct library and key files that are downloaded to client web servers, store statistics collected during testing, and store various different data objects and records that describe clients, tests, test runs, experiments, and other data used to conduct web-site testing. The client web server 1212 serves a number of different web pages described by HTML files 1214 to users, represented by user 1216 who access the web pages served by the client-web server through a browser 1218 running on the customer computer 1216. The testing service and client web server additionally include web-server engines, application programs, and other components of servers and computer systems (1215 and 121 in FIG. 12A).

Figure 12B:
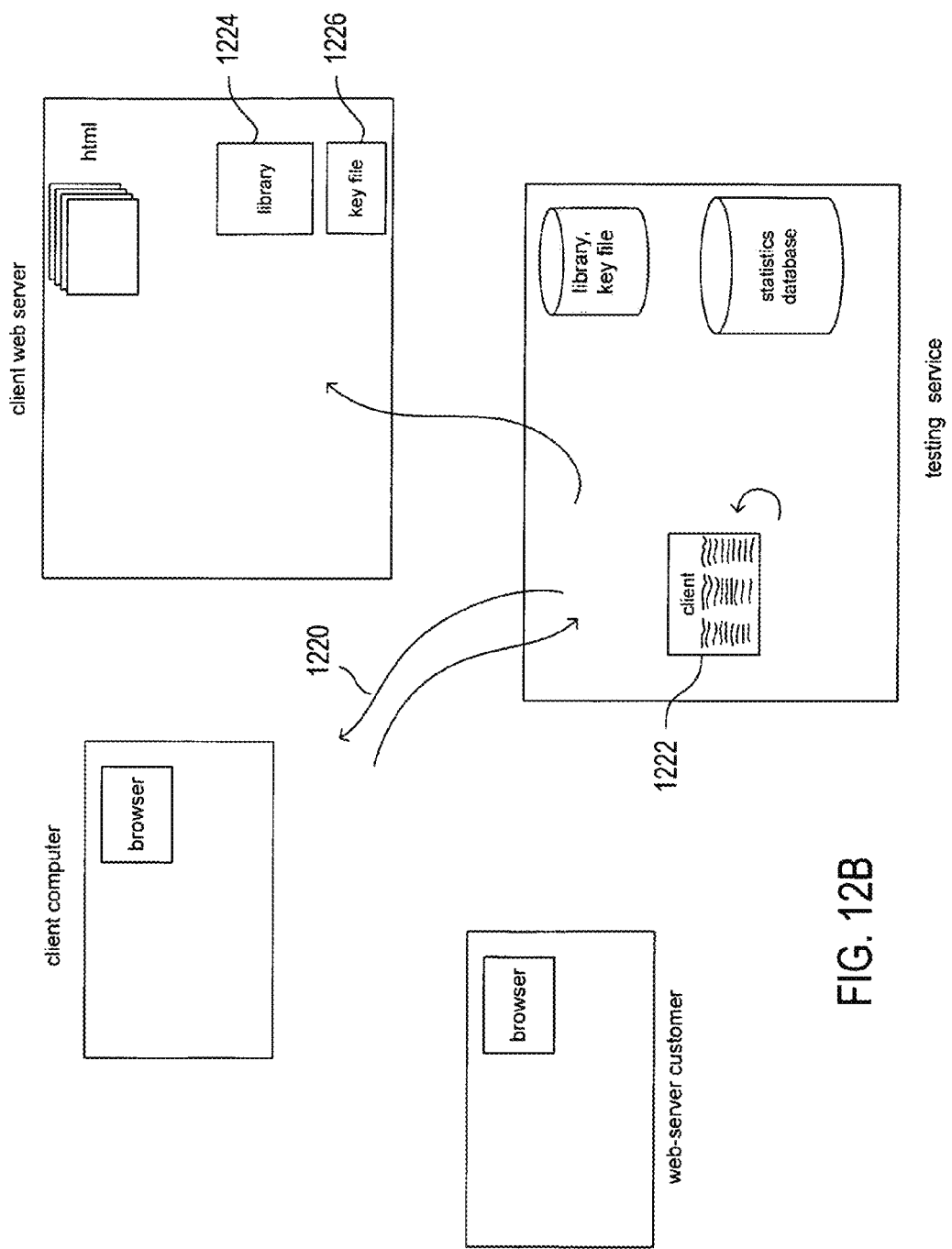

As shown in FIG. 12B, the client carries out a dialog 1220 with the testing service in order to provide the testing service with information about the client that allows the testing service to prepare a client record or records 1222 that describe the client and to store the client record or records in the database. In addition, the testing service may undertake various authorization and authentication steps to ensure that the client web server is a valid web server and that the client can transmit remuneration for testing services to the testing service. As part of client initialization, the testing service prepares a script library 1224 and a key file 1226 that the testing service downloads to the client web server. The script library 1224 includes routines that are called by client-web-server users during web-site testing. This library is referred to as a "script library" because script routines are often provided to browsers for execution. The key file 1226 includes cryptographic information that ensures that all information exchanges that occur between client users and the testing service are secure.

Figure 12C:
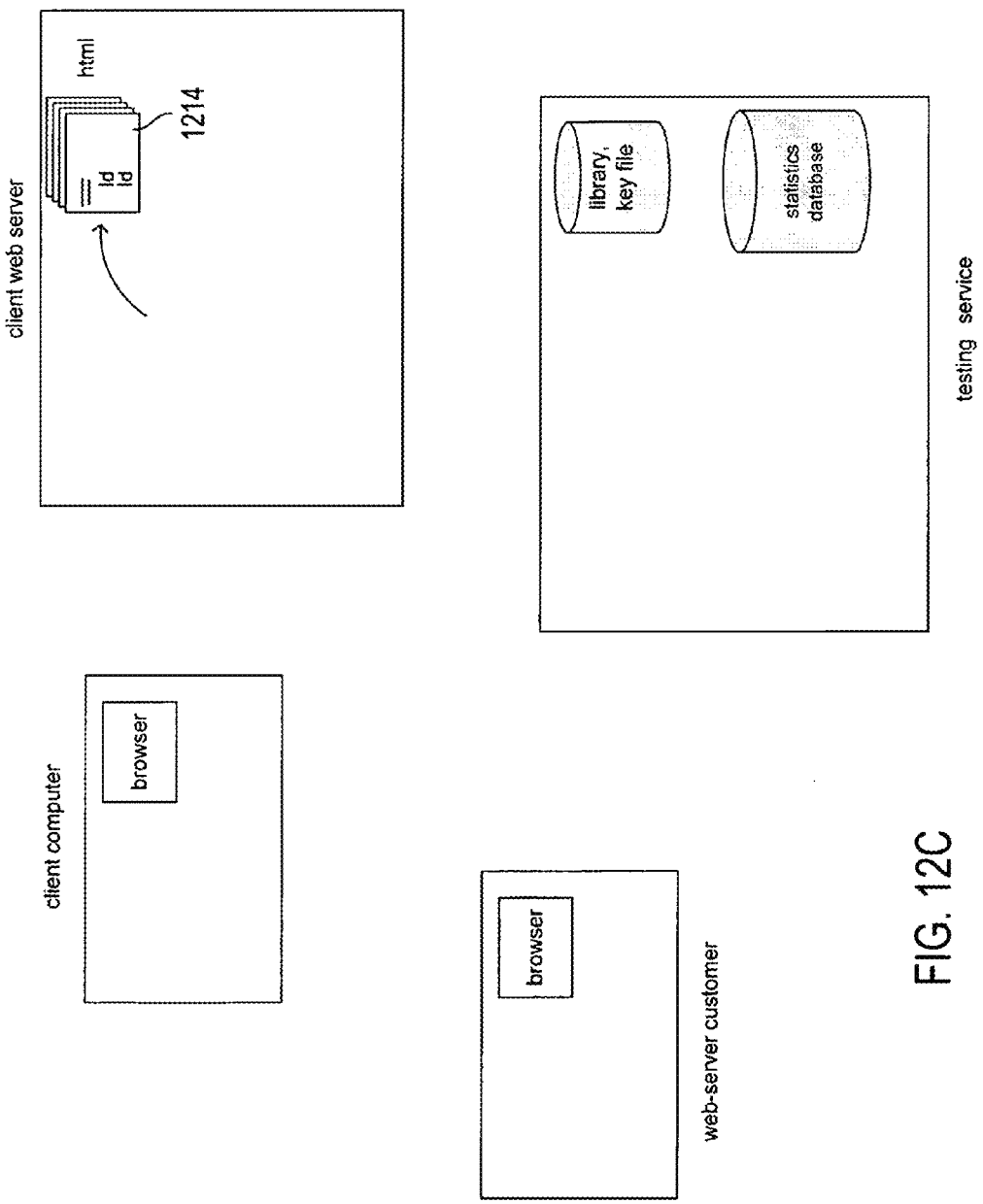

As shown in FIG. 12C, following client initialization, the client modifies any of the HTML encodings of web pages that may be altered during testing of the client-web server by the testing service. The alternations are minimal. To each HTML file that encodes a web page that may be tested, the client generally adds only two single-line statements and, in the case that display objects are not associated with identifiers, as discussed above with reference to FIG. 9, the client web server provide identifiers for each of the objects that may be specified as factors for testing of web pages. The single-line statements are generally identical for all client web pages, greatly simplifying the web-page modification carried out by the client. The first statement results in downloading of a script library from the client web server, and the second script launches one or more information exchanges between the testing server and user computer. In the case that a conversion event is tied to a specific user-activated display device, such as a button, a call to a conversion script is inserted into the HTML file, so that user activation of the user-activated display device generates an information-exchange transaction with the testing service corresponding to a conversion event. As discussed above, these may be the HTML identifiers discussed with reference to FIG. 9, or other types of identifiers. In many cases, simple changes to the HTML files can be automatically carried out by a script or by routines provided by a content-management-service application-programming interface.

Figure 12D:
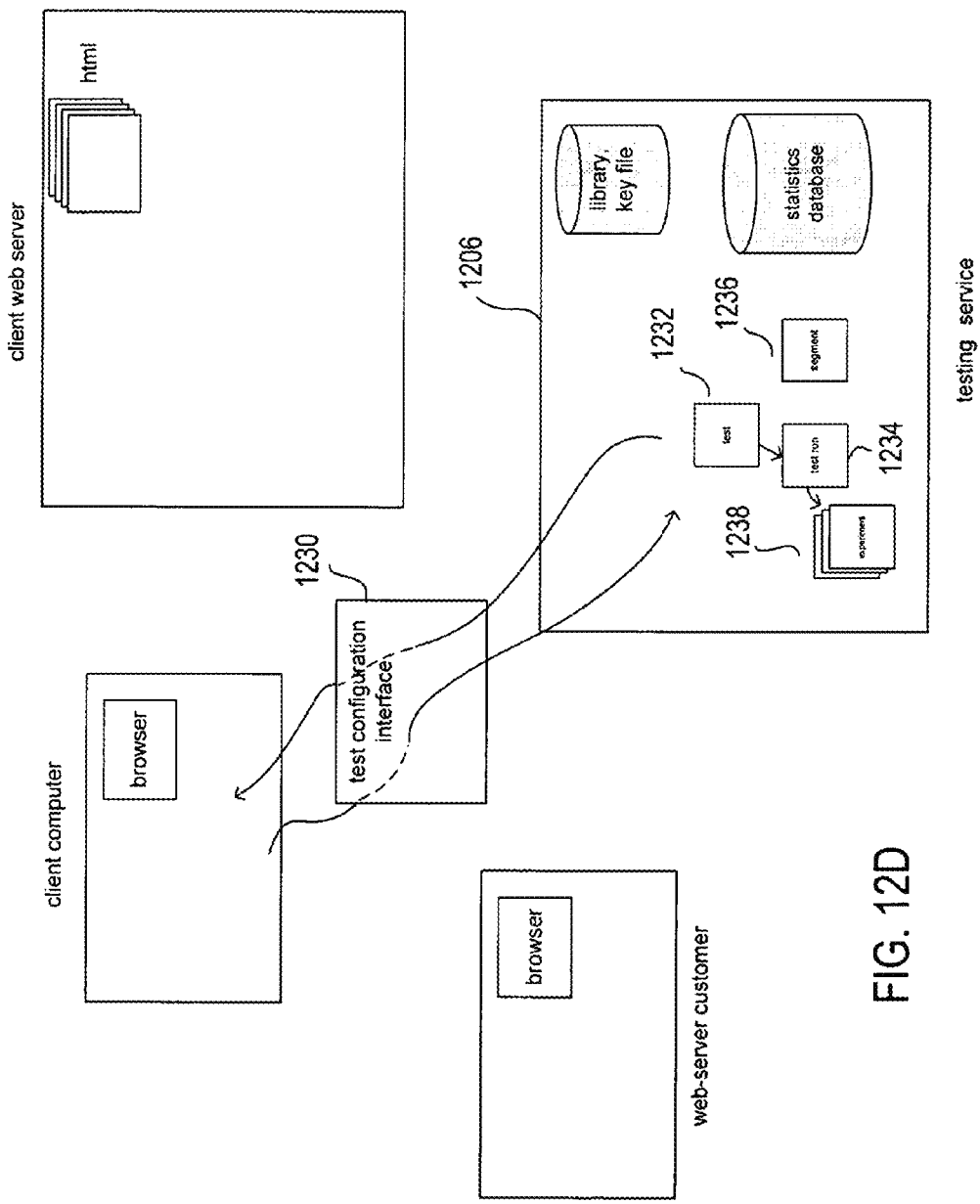

Following client initialization and modification of the HTML-file encodings of web pages that may be subsequently tested, the client can configure and run tests through a test-configuration interface provided as a website by the testing service to clients, as shown in FIG. 12D. The test configuration interface 1230 allows the client computer to define tests 1232, specify and modify already-specified test runs 1234, and specify segments 1236, and, using client-supplied test and test-nm specifications, the testing service generates the experiments 1238 associated with each test run. All of the test, test-run, and segment information is stored in records associated with a reference to the client in one or more databases within the testing service. The test-configuration interface 1230 additionally provides run-time information to the client web server and allows the client web server to launch trial runs and test runs.

When a client web server has created a test and launched a test run for the test, the testing service provides modifications of the tested web page to users of the client-web-server during the test in order that the users receive altered web pages that constitute test experiments, and the testing service collects statistics based on users' access to web pages under test. This process is next described, with reference to FIGS. 12E-G.

Figure 12E:
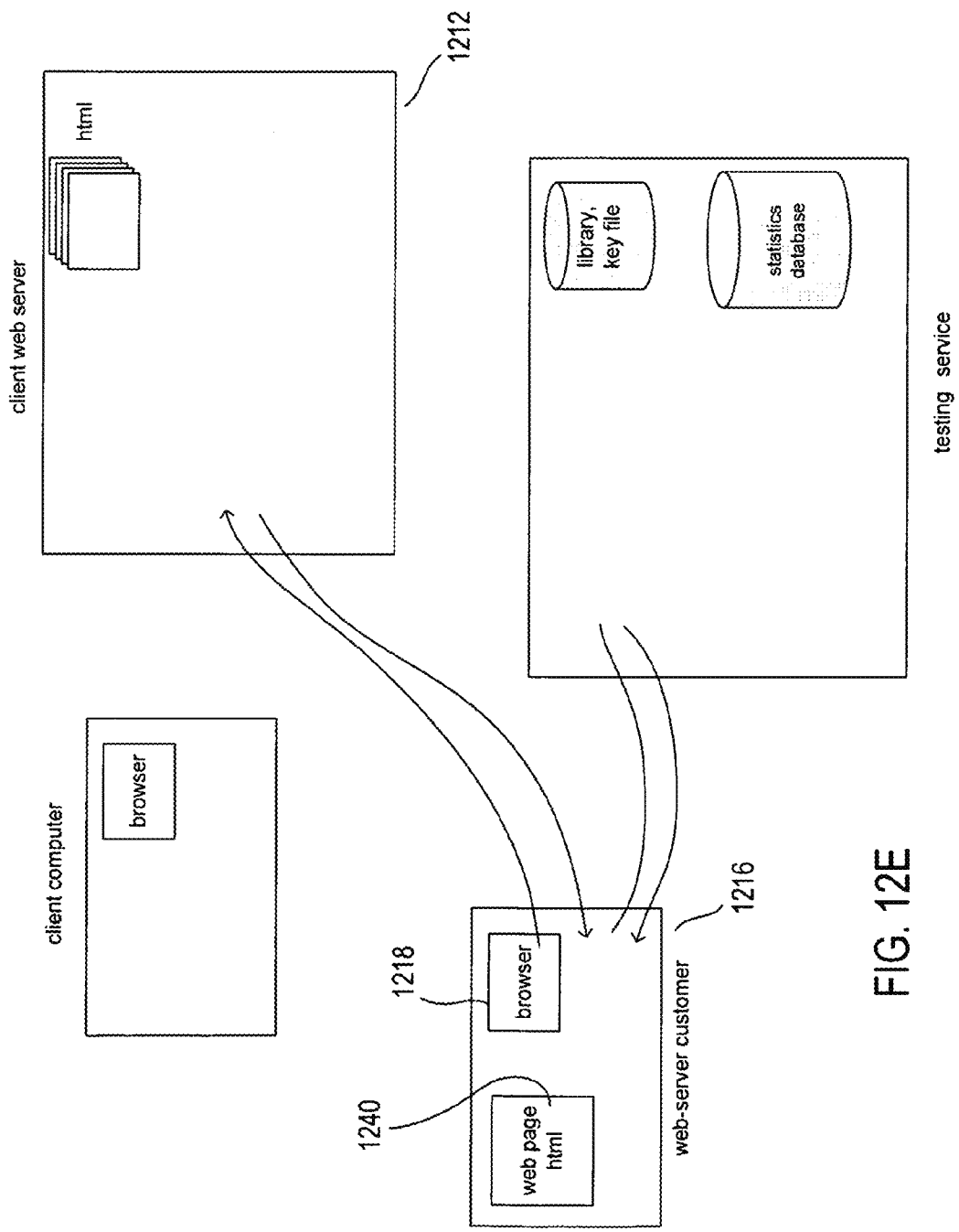

When a client-web-server user 1216 accesses a test web page, the client-web-server user sends an HTML-file request through the Internet to the client web server 1212, as shown in FIG. 12E, which returns the requested HTML page to the client-web-server user 1216 for rendering and display by the browser 1218 executing within the user's computer. As the browser begins to process the HTML file, the browser encounters a statement 1240 that causes the browser 1218 to request the script library from the client web server. When the script library is downloaded by the client web server, the HTML file is modified, on the user computer, to launch an additional information exchange with the testing service to download additional library routines from the testing service. This additional information exchange is carried out only when the web page being processed is an active test page, the user computer is a valid test subject for an active test, and the additional library routines are not already cached in the user computer's browser. Insertion of the library-routine-fetch statement is one of the two modifications to the HTML files corresponding to tested web pages made by the client.

Figure 12F:
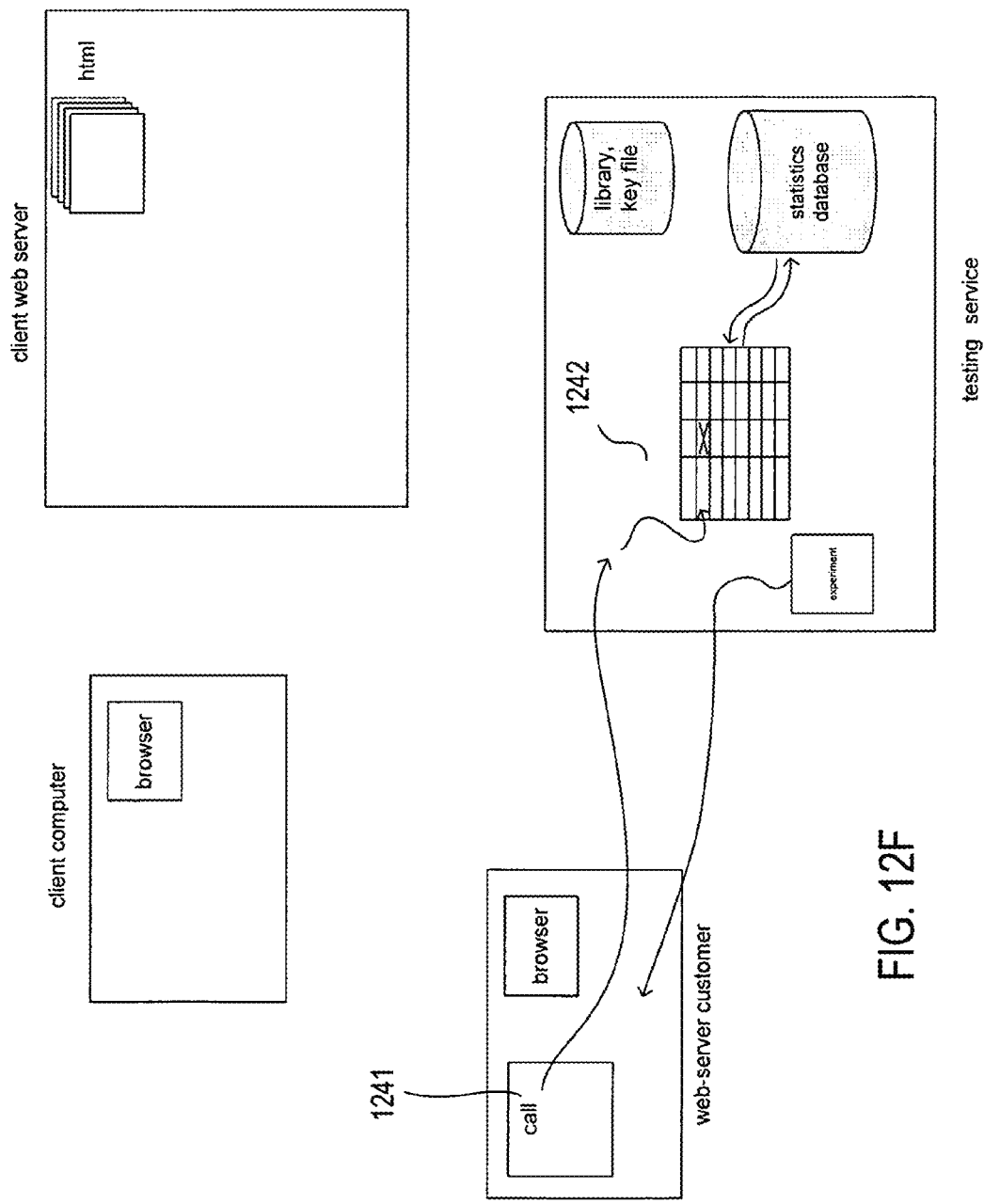
Figure 12G:
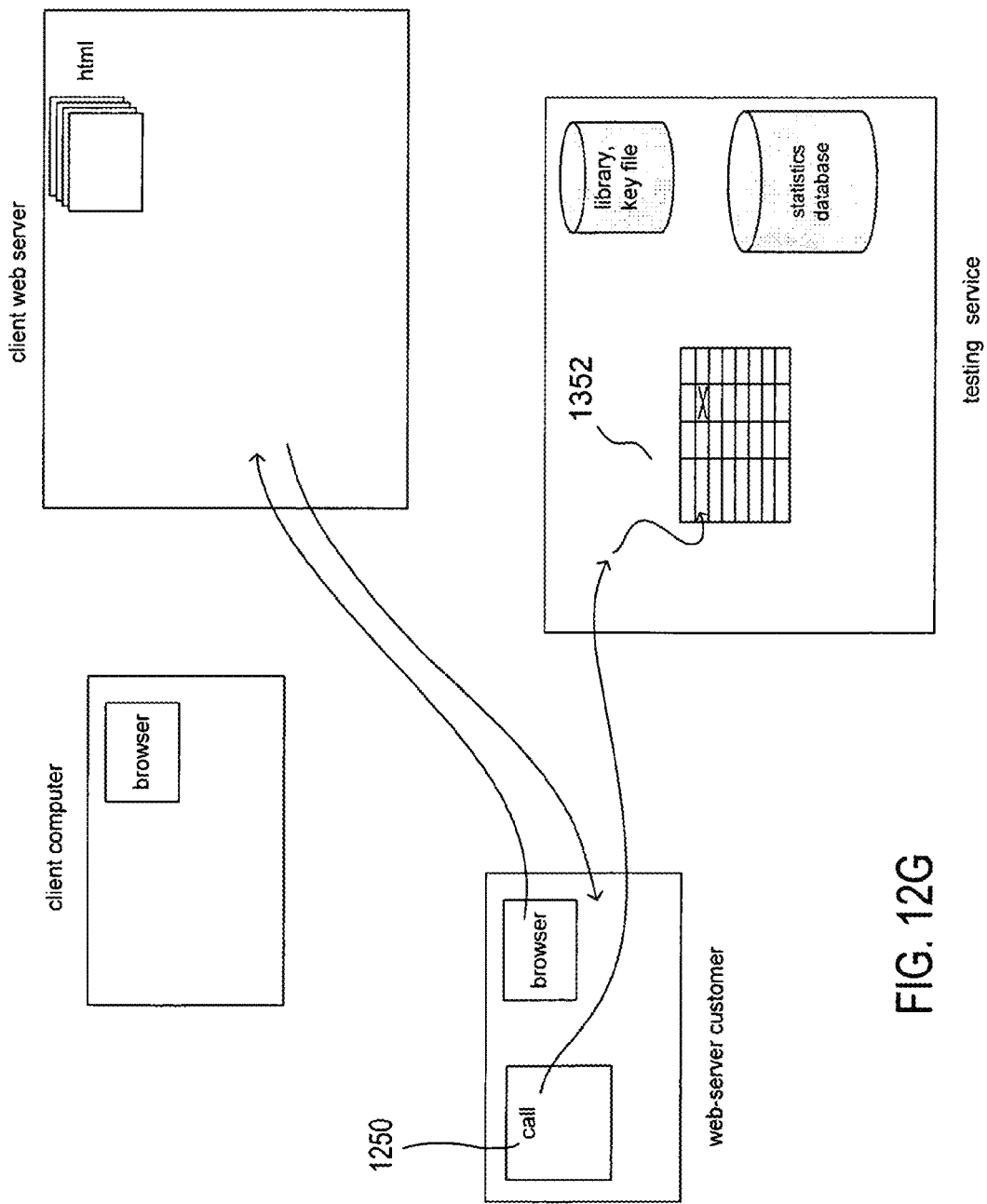

Next, as the browser continues to process the HTML, as shown in FIG. 12F, the browser encounters a call to the library routine "WM.setup" 1241. When executed by the browser, WM.setup initiates one or more information exchanges with the testing service during which the testing service can access cookies and other information associated with the web page on the user's computer, and the user computer receives web-page modifications from the testing service. Cookies can be used, for example, to ensure that a test subject who repeatedly accesses a landing page receives the same experiment, or test page, each time. Only when the web page being processed by the user computer is an active test page, and the user computer is an active test subject, are web-page modifications returned to the user computer by the testing service, and information uploaded by the testing service from the user computer. When this web page and user are validated, the testing service records the page accessed by the user, an identifier of the user, and a time of access in one or more database entries 1242 and returns a snippet, representing one or more nodes or sub-trees of the DOM corresponding to the web page, to the user computer, which modifies the DOM constructed by the browser to incorporate the snippet downloaded by the testing service to the user. In other words, the testing service downloads modifications that transform the web page downloaded by the user to a particular altered web page representing an experiment. Thus, following the information transaction illustrated in FIG. 12F, the user's browser alters the DOM and displays, to the user, the altered web page corresponding to an experiment as part of the test run. The snippet is constructed or retried by the testing service based on the orthogonal-array test basis or other test design. The stored test design defines the experiments, from which the testing service selects experiments for provision to users in order to obtain a well-distributed sampling of experiments during the test. Subsequently, as shown in FIG. 12G, should the user download a page, or invoke a feature on a page, corresponding to a conversion event, the user's browser, in processing the HTML file, encounters a library call 1250 that results in an information transaction between the user and testing service. The testing service checks to ensure that the web page is a valid conversion page for an active test, that the user is a valid test subject. When all of these tests are valid, the conversion event is recorded 1352 for the experiment by the testing service.

Figure 12H:
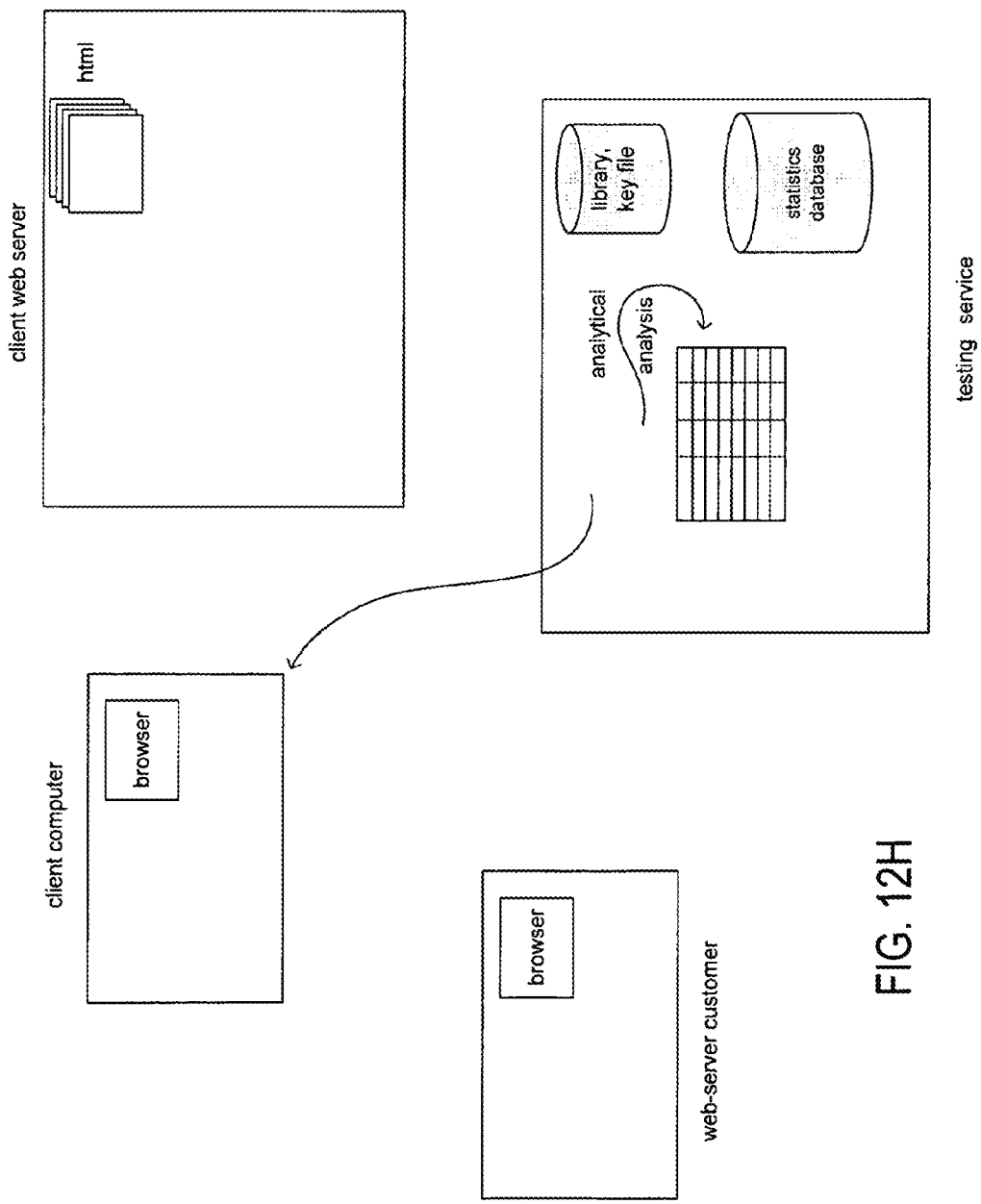

Finally, as shown in FIG. 12H, when the testing service has collected sufficient data to consider the test run to be complete, the testing service changes the status of the test run to complete, and may then undertake analysis and reporting of the test results. The test results may be automatically returned to the client web server, or may be subsequently returned, on demand, when the client checks the status of the test run and determines that the test run has been completed.

FIG. 13 shows the HTML modifications used to virtually incorporate a testing service into a web site. The HTML code, previously shown in FIG. 9, includes first statement 1302 that directs a browser to download the script-routine library and a second statement 1304 that calls a script-library entry point "WM.setup" that results in sending a message or request to the testing service to indicate a landing-page-access event or page-access-conversion event. A page that includes a displayed object, activation of which is defined to be a conversion even, is similarly modified to include a call to the library routine "WM.convert." By merely adding two statements to an HTML file, or three in the case that the page corresponds both to a landing-page-access event and to a conversion event, the HTML file becomes a potential test web page, and the testing service is virtually incorporated into the client web server. Again, the statements used to modify landing-access-event-associated web pages are identical for all such web pages, as is the statement that is used to modify display-objects associated with conversion events. A client can easily write a script or other program, or use a content-management-system programming interface to introduce these identical statements into web pages. Alternatively, website-testing services may provide software developer kits ("SDKs") that provide a graphical user interface and tool sets that allow clients to easily incorporate testing-service instrumentation into HTML code and other information to allow the testing service to collect data from client web pages and other type of information provided by the clients to users.

Figure 14:
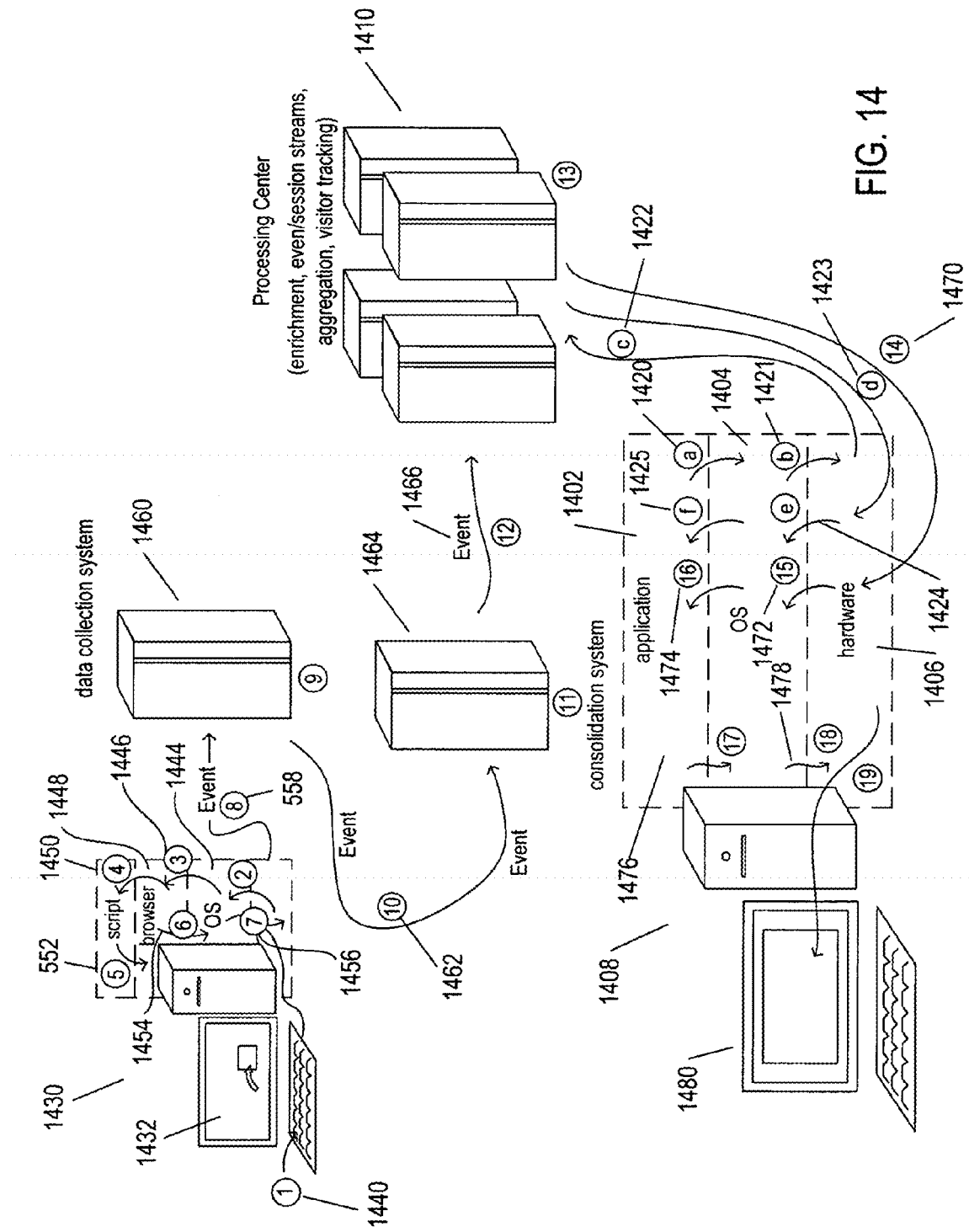
FIG. 14 illustrates the high-level components and data paths within one implementation of a system that collects data from web browsers executing on processor-controlled user appliances.

FIG. 14 illustrates the high-level components and data paths within one implementation of a system that collects data from web browsers executing on processor-controlled user appliances. The collected data may be used for website-testing and web analytics, as in the examples discussed above, but may also be used for real-time display of user activity to clients of a website-data-collection-and-rendering service. In FIG. 14, a website-data-collection-and-rendering service is illustrated, but, in general, the data-collection system may be alternatively or concurrently used for collecting test data for website-testing and web analytics. Initially, when a data-rendering application 1402 begins to execute, the application initializes various data structures and then opens at least one communications socket to a processing center. In FIG. 14, the console-or-monitor-like application 1402 executes within an execution environment provided by an operating system 1404 that executes above the hardware platform 1406 within a client computer system 1408. The processing center 1410 is generally a remote, distributed computer system that includes tens to hundreds of server computers and other types of processor-controlled devices, systems, and subsystems. In order to open a communications socket and communicate with the processing center, the following high-level steps occur: (a) the application executes an open-socket system call 1420; (b) in response to the system call, the operating system creates an open-socket-request message and, via a device driver, queues the message to the input queue of a communications controller and signals the communications controller to transmit the message to the processing center 1421; (c) the communications controller controls a transceiver to transmit the open-socket-request message to a listening process executing on a computer within the processing center 1422; (d) the processing center returns an acknowledgement message to the transceiver 1423 within computer system 1408; (e) the operating system 1404 within computer 1408 is notified of the reception of the acknowledgement message and retrieves the acknowledgement message from a memory buffer 1424; and (f) the acknowledgement message is passed to the application program to indicate successful opening of the communications socket 1425.

Once the socket is opened, or, in other words, a protocol-based communications link is established between the application 1402 and the processing center 1410, the processing center begins to send a stream of data messages to the application program through the communications socket. This stream continues until the occurrence of some type of stream-ending event, such as closing of the socket via a system call by the application program, termination of the application program, or various types of failures and computational discontinuities. The application program may choose to open two or more different sockets to the processing center in order to concurrently receive two or more different streams of data messages.

Continuing with FIG. 14, the process by which a data message is created and transmitted to the application program is next described. The system depends on instrumentation introduced into HTML files and/or other resources that are used by a web browser or other type of application program or control program. In the example shown in FIG. 14, the instrumentation is included in HTML files that are processed by a web browser 1448 to render and display web pages to a remote user on a remote computer system 1430. In the example, a user is viewing a currently displayed web page 1432. The following events occur, in this example: (1) the user depresses a key or clicks a mouse button 1440 in order to input a command, make a selection, or carry out some other such input to the web browser; (2) the user input is sensed by the hardware of the remote computer system 1442, which generates an interrupt or other signal to the operating system 1444 within the remote computer system; (3) the operating system receives the interrupt and notifies 1446 the browser 1448 within the remote computer system of the input event; (4) as a result of receiving the input, the browser executes a script routine 1450 within which instrumentation has been embedded for collecting data; (5) instrumentation within the script collects data programmatically 1452, encodes the data within a uniform resource locator ("URL"), and requests that the browser retrieve a remote resource specified by the URL; (6) the browser executes an HTTP request for the resource 1454 that results in a system call to the operating system 1444; (7) the operating system creates a request message and passes the request message to a communications-device controller 1456 for transmission 1458 to a data-collection system 1460; (8) the data-collection system retrieves the encoded data from the URL request and packages the data in a BON-encoded event message; (9) the event message is transmitted by the data-collection system 1462 to a consolidation system 1464; (10) the consolidation system consolidates event messages received from many different data-collection systems in temporary storage, with a temporary storage area allocated for the event messages corresponding to each of one or more different clients; (11) upon request from the processing center 1410, the consolidation system forwards 1466 a next set of events to the processing center for processing; (12) a processing center 1410 processes received event messages by adding derived and calculated data to the event messages and, in certain cases, aggregating and coalescing individual event messages into higher-level messages as well as filtering the messages for output to each connection/steam; (13) those processed messages that belong to the stream requested by the application program are forwarded 1470 by the processing center to the computer system 1408; (14) the hardware layer of the computer system notifies the operating system and passes the received processed message or messages to the operating system 1472; (15) the operating system notifies and passes the received processed messages to the application program 1474; (16) the application program then uses the data to generate and update to the monitor display or console display based on the received data and passes this update 1476 to the operating system; (17) the operating system controls a graphics processor and other video components of the hardware level 1478 to update the monitor display or console display; and (18) update operations are transferred from the graphics subsystem to the display device 1480 resulting in an update of the monitor display or console display. The consolidation systems may store collected data for a specified period of time, in certain cases, for a week or more, allowing the stored data to be subsequently streamed or re-streamed for various purposes. Data may be additionally archived for subsequent retrieval, processing, and streaming, either within consolidation systems or processing centers.

Figure 15:
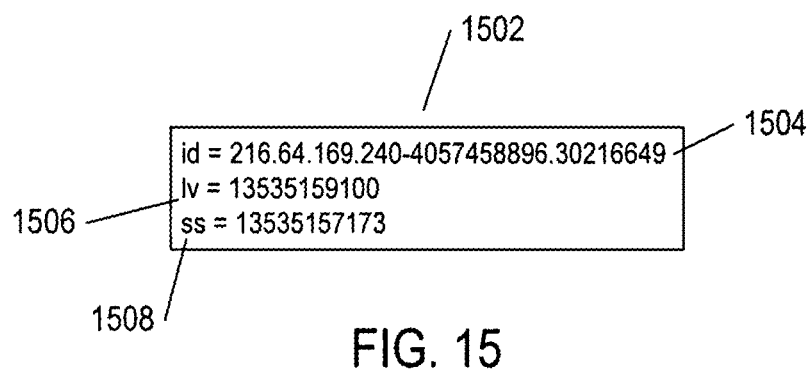
FIG. 15 shows a cookie, or small data structure, that is stored within the memory of each remote computer system that is instrumented for data collection according to one implementation of the currently disclosed methods and systems.

The currently disclosed method and systems generally maintain state information within remote computer systems to facilitate data collection and processing. FIG. 15 shows a cookie, or small data structure, that is stored within the memory of each remote computer system that is instrumented for data collection according to one implementation of the currently disclosed methods and systems. The cookie 1502 includes a unique identifier for the user/processor-controlled appliance 1504, a system time stamp 1506 that indicates the most recent event detected by the instrumentation, and a session-start time stamp 1508 that indicates the time at which a session that includes the most recent event began. The identification of the user/processor-controlled appliance, id, is generally a combination of an IP address and other numbers that uniquely identify the user/processor-controlled appliance. The time stamps that indicate the last detected event, or last visit, lv, and the start of the session, ss, are generally system time values that indicate the number of seconds or fractions of seconds that have elapsed since some arbitrary point in time. The data contained in the cookie is used by the instrumentation for encoding data within a URL for transmission to a data-collection system and subsequent downstream processing of the data.

Figures 16A, 16B:
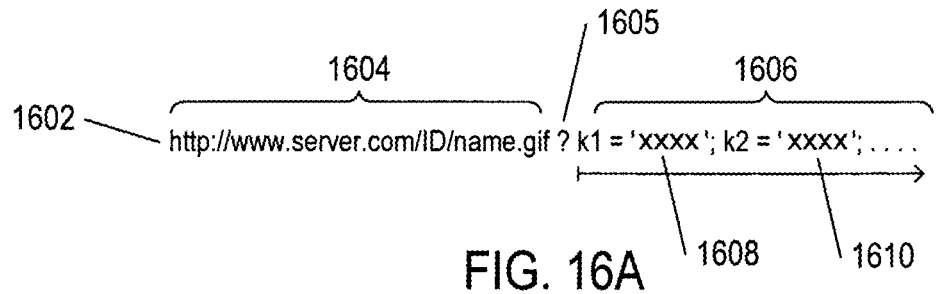
Figure 16E:
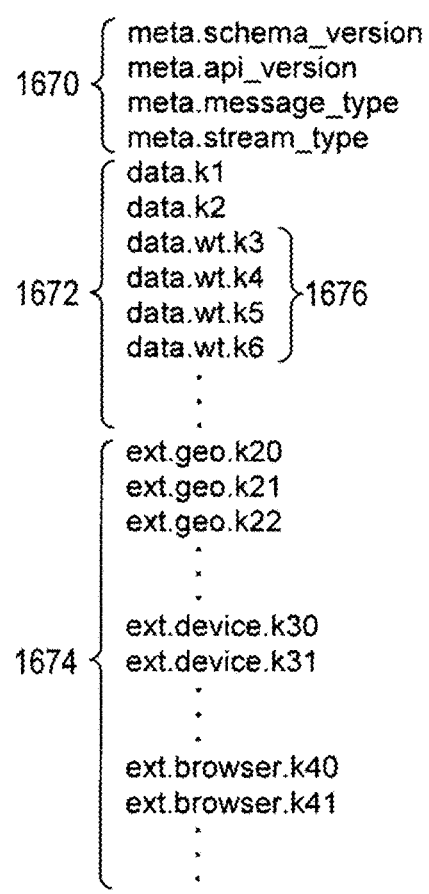

FIGS. 16A-E illustrate the various types of data messages that are transmitted between computers in the example system shown in FIG. 14. The data initially collected by instrumentation within the web browser is encoded as a series of key/value pairs within a URL. FIG. 16A illustrates the encoding of key/value pairs generated by instrumentation within a URL. The URL 1602 includes a path name to a resource stored on a data-collection server 1604 followed by a question mark 1605 and then a series of semi-colon-delimited key/value pairs 1606. In FIG. 16A, and in subsequent figures, the symbol strings "k1," "k2," . . . are used to indicate different keys and the corresponding values are generally indicated by a series of "x" symbols between pairs of single quotes or double quotes, such as "x" symbol strings 1608 and 1610 in FIG. 16A indicating the values corresponding to keys "k1" and "k2." The values may be any alphanumeric symbol string and the key names may also be arbitrary alphanumeric symbol strings.

FIG. 16B illustrates a JSON-encoded event message that is generated by a data-collection system, transmitted to a consolidation system for storage, and pulled from storage and transmitted to the processing center. A JSON-encoded event message includes a "meta" object 1612, previously discussed with reference to FIG. 7, and a "data" object introduced by the symbol string "data" 1614 and including key/value pairs and objects within the bracket pair 1616-1617. A "data" object may include key/value pairs, such as key/value pairs 1618 and 1620, and objects, such as the object named "wt" 1622 that includes key/value pairs within brackets 1624-1625. Key/value pairs may include two symbol strings separated by a colon, such as key/value pair 1626 or may comprise a key followed by a colon that is in turn followed by an array of symbol strings, such as key/value pair 1628. Arrays of symbol strings are delimited by square brackets, such as the pair of square brackets 1630-1631. Event messages generally include a "meta" object and a "data" object.

FIG. 16C illustrates an enriched event message that is produced within the processing center (1410 in FIG. 14). An enriched event message includes a "meta" object 1640, a "data" object 1642, and an "ext" object 1644. The "ext" object includes three lower-level objects "geo" 1646, "device" 1648, and "browser" 1650. The geo object contains key/value pairs that describe the geographical location of a user/processor-controlled user appliance. The device object 1648 includes key/value pairs that characterize the user/processor-controlled appliance. The browser object 1650 includes key/value pairs that characterize the type of browser used by the user. The data values included in the "ext" object 1644 are derived from the data values included in the "meta" and "data" objects as well as additional calculated values and data sources accessible to the processing center and used for event-message enrichment. Many types of enrichments are possible. For example, an enriched even message may include indications of the current weather at a user's location, the size of the town or city in which the user is located, public data related to the user, and many other types of information.

FIG. 16D illustrates a session message. A session message is a higher-order message that includes session information as well as a "session_summary" object and an array of "event" objects. The "meta" object 1660 is the same as the "meta" object in previously described event messages. A number of key/value pairs 1662 describe session-related information. The "session_summary" object describes the number of events included in the session message and other information related to the session 1664. Finally, the key/array pair "events" 1666 includes the traditional enriched-event data for each of a series of events.

The data within a JSON-encoded data message may alternatively be described using a hierarchical notation. The alternate hierarchical notation for the extended event message shown in FIG. 16C is provided in FIG. 16E. The keys within the "meta" object are specified by strings that begin with the substring "meta" 1670. The keys contained in the data object 1642 are specified with strings that begin with the substring "data" 1672. The keys contained within the "ext" object 1644 are specified by symbol strings that begin with the substring "ext" 1674. Periods are used to delimit hierarchical levels. For example, there is only a single hierarchical level within the meta object and thus all of the keys within the meta object of FIG. 16E include a single period between the substring "meta" and the names of the keys of the key/value pairs contained in the meta object. By contrast, the keys that occur within the "wt" object that, in turn, lies within the "data" object 1642 include two periods 1676 to indicate two hierarchical levels. The hierarchical key names shown in FIG. 16E can be thought of as the names of variables, and the corresponding values are the values stored in the variables.

Almost any type of data value that can be accessed from a script or computed by a script running in the context of a web browser or similar application programs is a candidate for data collection by instrumentation. The data values may be values produced by system calls, such as a call to a system-time routine or a call to retrieve the IP address of the computer within which the web browser is executing. Other values include data values that indicate a particular state of a displayed web page within the context of a web site, such as indications of pages, sections, and subsections currently accessed by a user, indications of various types of input events to web pages, indications of other web sites through which a user passed in navigating to the current web site, information requested by and displayed to a user, and many other types of information related to a user's interaction with the web site. The data values are named hierarchically, as discussed above with reference to FIG. 16E, or, equivalently, associated with key symbol sequences encoded within a JSON-encoded message. In either case, each data value is uniquely named and can be extracted from the parameters within a URL passed to a data-collection system by a web browser executing on a remote user computer.

FIGS. 17A-B provide an example of the instrumentation inserted within a web page that carries out data collection. The data collection is initiated, from a web page, by a script (1702 in FIG. 17B) embedded within an HTML file that specifies a particular web page displayed to a user. The script creates a new tag object 1704 and then calls a "dcsCollect" tag member function to collect data and transfer the data to a data-collection system 1706. The "dcsCollect" member function 1708 calls a "dcsTag" function 1710. The "dcsTag" function 1712 creates a URL for a one-pixel resource image and then embeds in the URL, following the "?" symbol, a list of key/value pairs. The URL is contained within the symbol-string variable P which is passed to the "dcsCreateImage" routine 1714. The "dcsCreateImage" routine 1716 makes an assignment to an image variable 1718 which is processed by the browser by using an HTTP request and the URL created by the "dcsTag" routine to fetch the one-pixel image. The one-pixel image is not used for display, but is merely a vehicle for transmitting the key/value pairs encoding in the parameters within the URL to the data-collection system.

It should be noted that the data collected by the instrumentation is unstructured. The value of a key/value pair can be an arbitrary symbol string or an array of symbol strings. Multiple values may be later combined to create longer symbol strings. The data collected is specified by the instrumentation code. The data processing and data enhancement generally take place downstream, in a processing center or other system remote from where the instrumentation is executed to collect data. There are many advantages to downstream data processing. One advantage is that the instrumentation remains simple and efficient, and does not introduce potentially disruptive computational burdens on processor-controlled user appliances. The data collected via the instrumentation is also relatively independent of the remaining system components. For example, the instrumentation may be modified to collect a new key/value pair, and that key/value automatically ends up passed to data consumers who have not chosen to filter out the key/value pairs using queries. The instrumentation can be, in many cases, modified even while the data is collected and streamed to data consumers.

Figure 18:
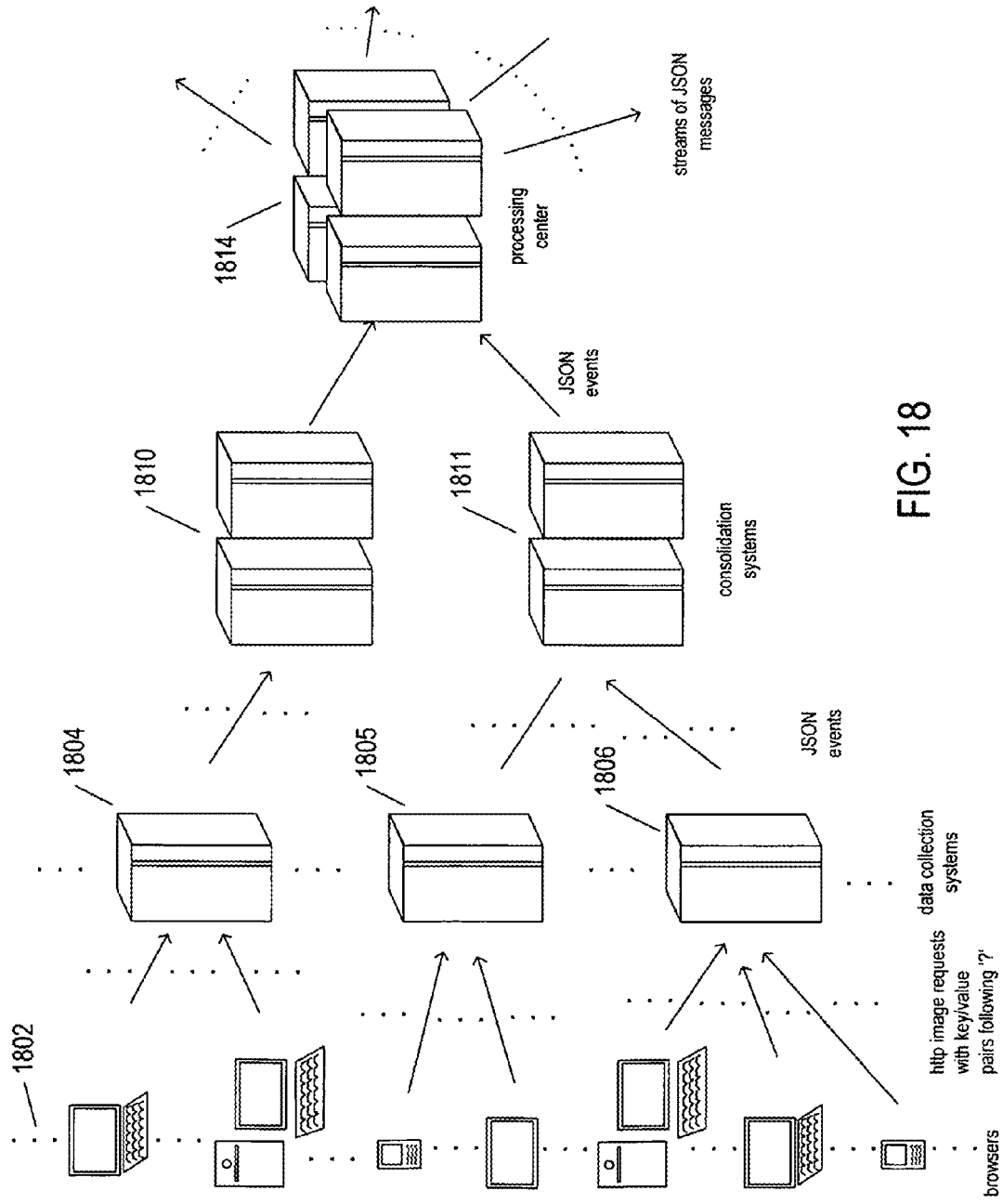
FIG. 18 illustrates, in a fashion similar to FIG. 14, an example of a data-collection system.

FIG. 18 illustrates, in a fashion similar to FIG. 14, an example of a data-collection system. As discussed previously, data collection occurs within HTML files or scripts executed by browsers running within the remote processor-controlled user appliances shown in column 1802. Web browsers make HTTP requests for resources, specified by URLs, that are directed to various different geographically dispersed data-collection systems 1804-1806. Listener processes within the data-collection systems receive the parameter string following the "?" symbol in the URL specification of a resource, generate, from the key/value pairs in the parameter string, a JSON-encoded event message, and transmit the JSON-encoded event messages to a consolidation system 1810 and 1811.

In one implementation, the consolidation systems comprise a large number of servers that execute, in a distributed fashion, the Kafka distributed messaging system. Kafka is a distributed messaging system developed for collecting and delivering high volumes of log data with low latency. Kafka processes streams of incoming messages, dividing the incoming messages into messages belonging to each of a number of categories, referred to as "topics." A testing or analytics system may, for example, partition collected data into topics that each corresponds to a different client organization. Kafka further partitions topics into topic partitions, each of which comprises a set of segment files stored in memory and/or mass-storage devices. Kafka also defines brokers, which are distributed processes, each of which may process incoming messages for a particular set of topics and topic partitions. Messages are input to Kafka by producers, and thus, in the currently disclosed system, the data-collection systems represent the producers. The Kafka system aggregates the incoming messages for each topic and stores the messages in segment files for subsequent retrieval by consumers. In the currently disclosed system, the processing center or processing centers 1814 are the consumers of messages consolidated by the Kafka distributed messaging system. Incoming messages are appended to a current in-memory segment file. Once the segment file fills up, it is flushed to mass storage, at which point the messages are made available to consumers. Kafka stores messages for a defined period of time, often on the order of a week. During that time, consumers may repeatedly access messages. In general, the Kafka distributed message system acts as a kind of very large input/output queue, with the lag time between message input and message consumption on the order of seconds or fractions of seconds, when used in the currently disclosed real-time processed-data streaming system.

In one implementation, the data-collection portion of a testing or analytics system employs a Storm big-data processing system within the processing center. Storm is an open-source system originally developed for handling Twitter messages. Storm is fully distributed and features high performance, fault-tolerance, and guaranteed message processing. The conceptual model for Storm is a graph representing interconnections between spouts, which are data sources, and bolts, which are data-processing entities. Spouts pull data messages from the consolidation systems and pass the data messages on to one or more bolts, each of which performs processing activities, including enrichment, query filtering, and other such processing. The spouts and bolts are interconnected by communications paths, with the furthest-downstream bolts emitting processed data messages through communications sockets to client applications.

Methods and System to which the Current Document is Directed

In many types web testing, including those discussed above, it is desired to follow a thread or sequence of events related to a particular user through many different contexts and activities as the user interacts with a processor-controlled device, such as a mobile phone, pad, tablet, laptop, or desktop computer. However, in many cases, currently available testing services and analytics systems are unable to follow user threads through various patterns of remote information access and interaction, as a result of which the testing services and analytics systems cannot process and report desired statistics and compiled information to clients.

Figure 19A:
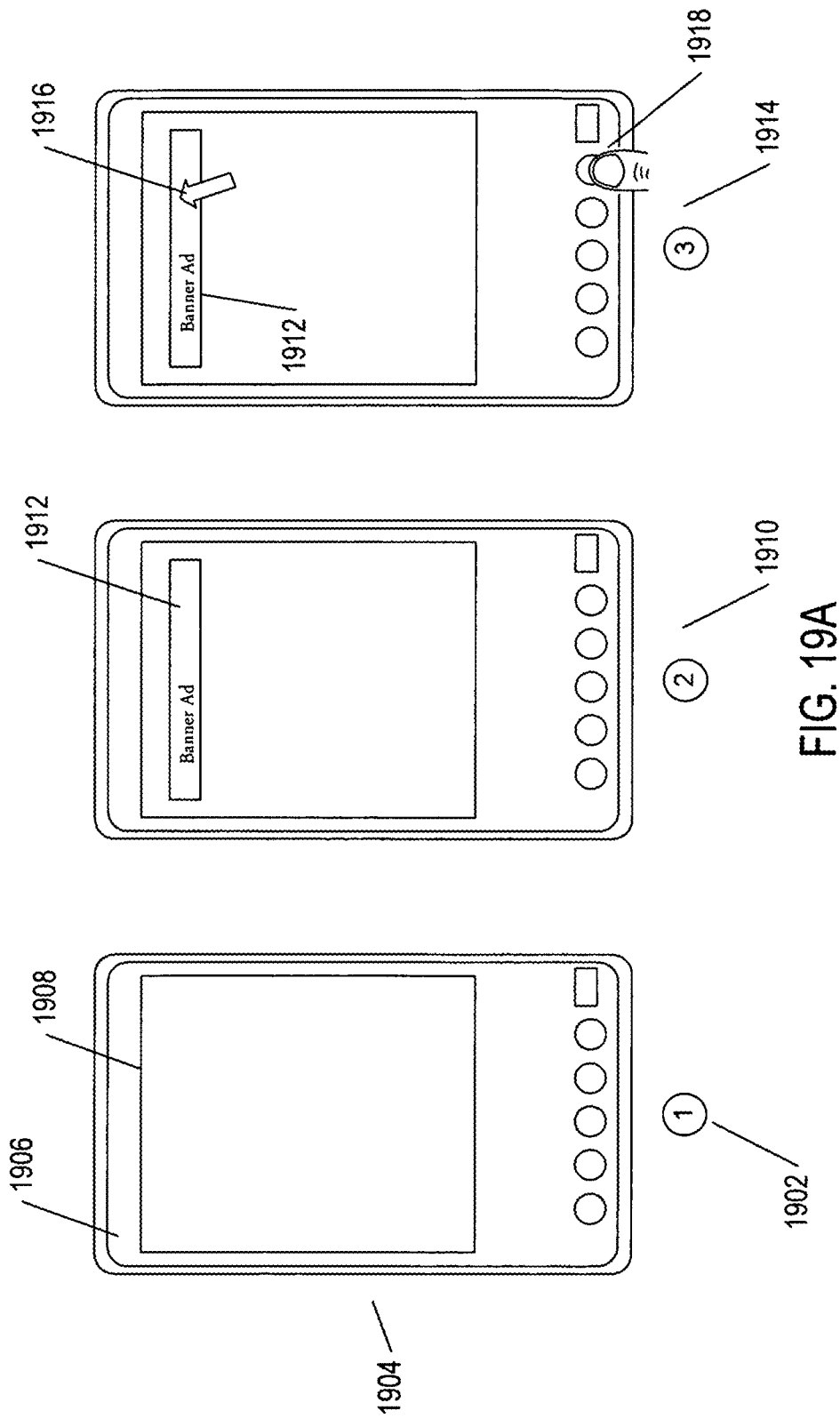
FIGS. 19A-21 illustrate a user thread that spans multiple contexts as a user interacts with a processor-controlled device to access remote information and, in certain cases, transmit information to remote servers.

FIGS. 19A-21 illustrate a user thread that spans multiple contexts as a user interacts with a processor-controlled device to access remote information and, in certain cases, transmit information to remote servers. FIGS. 19A-C illustrate a series of interactions of a user with a smart phone. In FIGS. 19A-C, each view of a cell phone represents a different stage of the user's interaction, and each is associated with a circled integer, representing the stage illustrated, such as the circled "1" 1902 in FIG. 19A. The smart phone 1904 is shown to include a display screen 1906 on which a displayed information window 1908 is displayed to a user. In the first stage, represented by the first illustration of the cell phone 1902, a user is viewing a web page rendered for display by a web browser mobile-phone application. In a second stage 1910, the user has navigated to a different web page on which a banner advertisement 1912 is displayed. In a third stage 1914, the user positions a cursor 1916 over the banner advertisement 1912 and inputs a touch-screen command 1918 to the mobile phone to navigate to whatever additional information that can be displayed related to the banner add. Continuing to FIG. 19B, in stage 4 1920, the user now sees a displayed web page that asks the user whether the user wishes to navigate to an Acme service or information display 1922. In stage 5 1924, the user inputs a touch-screen command 1926 to the smart phone indicating a desire to navigate to Acme. However, in this case, the underlying HTML code includes a truncated URL, referred to as a "custom URL" or "CURL," which, when used by the web browser in an HTTP command to fetch a remote resource, results in the mobile phone operating system searching for an appropriate application to launch that corresponds to the CURL. In the currently illustrated case, however, no appropriate application is registered for the CURL, as a result of which the mobile phone invokes a new session within the web browser to access and display a web page for an application store where the user may select an appropriate application to download in order to complete the desired navigation to the Acme service or information display. In stage 6 1928, the application-store web page 1930 has been rendered and displayed to the user. Continuing to FIG. 19C, in stage 7 1932, the user inputs a touch-screen command 1934 to the smart phone to download and launch an Acme application. The Acme application launches, in stage 8 1936, and displays information 1938 to the user.

In this case, the initial Acme web page, displayed in stage 4 1920, may have been instrumented, so that Acme can determine when a user has navigated to the Acme web page from a banner advertisement and from what previously viewed web page that included the banner add. In addition, the Acme application, launched in stage 8, has also been instrumented, so that Acme can determine how often users who respond to the banner advertisement purchase and download the Acme application.

Figure 19C:
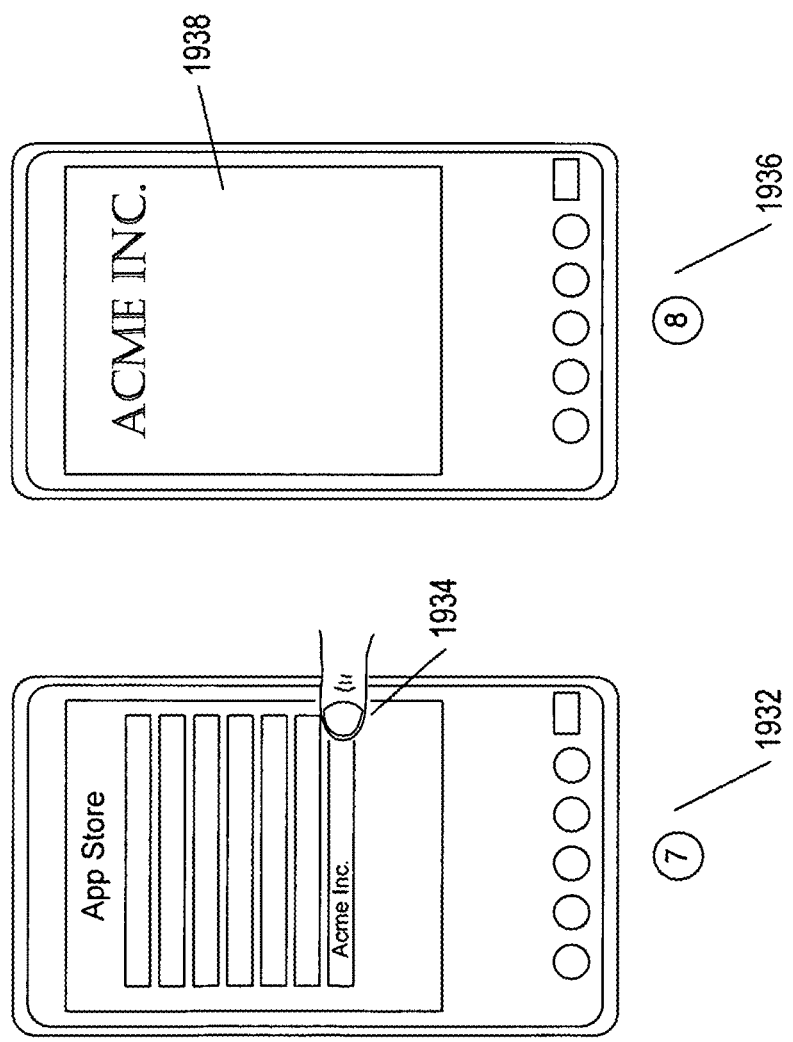
Figures 20, 21:
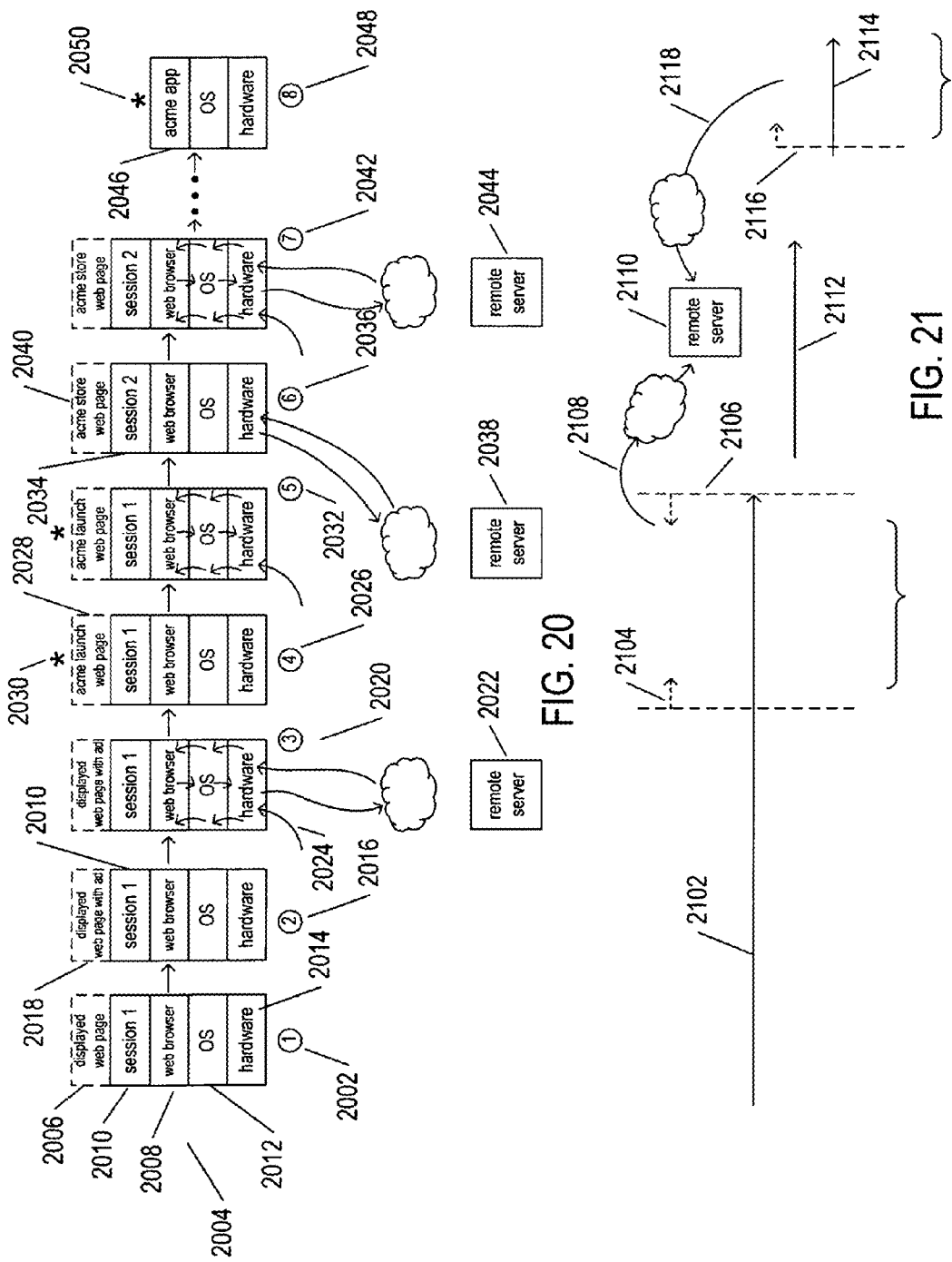

FIG. 20 provides a different view of the eight stages discussed above with reference to FIGS. 19A-C. Circled stage numbers, such as circle "1" 2002, are again used to related FIG. 20 to FIGS. 19A-C. In FIG. 20, small layer diagrams, such as layer diagram 2004, are used to illustrate the computational context of the smart phone at each stage. In stage 1 2002, a web page is rendered and displayed 2006 to the user by a web browser 2008 executing within a first session 2010 or web-browser-execution context. The web browser, in turn, executes within an execution environment provided by the smart-phone operating system 2012 that operates above the smart-phone hardware 2014. In stage 2 2016, a different web page with the banner advertisement (1912 in FIG. 19A) 2018 is displayed to the user, still within the first session 2010. In stage 3 2020, the user touch-screen input is received by the hardware, passed through the operating system to the web browser which, on receiving the input, requests the first Acme web page via the operating system, hardware, and a remote server 2022, as indicated by curved arrows, including curved arrow 2024, in FIG. 20. In stage 4 2026, the first Acme web page 2028 is now displayed to the user. The asterisk 2030 indicates that this first Acme web page is instrumented. In stage 5 2032, the user inputs a touch-screen input to the smart phone that results in the smart-phone operating system invoking a new session or web-browser-execution context 2034, in stage 6 2036, in which the web browser fetches the application-store web page from a remote server 2038, renders the web page, and displays the rendered application-store web page 2040 to the user. In stage 7 2042, the user inputs a touch-screen command to download the Acme application, which the web browser downloads from a remote server 2044 and launches, in cooperation with the smart-phone operating system, the Acme application 2046 which executes in stage 8 2048 within an execution environment provided by the operating system. In this case, the second web-browser session may have been terminated, and the first web-browser session may be suspended while the Acme application executes. Asterisk 2050 indicates that the Acme application is also instrumented.

One might assume that since both the first Acme web page is instrumented and the Acme application is instrumented, it would be relatively straightforward for the instrumentation in the first Acme web page to transmit data to a web-testing service to indicate that the user has navigated to the first Acme web page and for the instrumentation in the Acme application to transmit data to the web-testing service to indicate that the user has downloaded the Acme application, which represents a type of conversion. In this fashion, the testing service can keep track of user downloads from various different banner adds displayed on various web pages to determine which type of banner adds and which web-page hosts for banner adds are most effective in steering users to downloading the Acme application. But, in fact, there is a serious problem.

FIG. 21 illustrate the problem introduced in FIG. 20 with respect to user-thread following by a testing service. FIG. 21 alternative illustrates the stages shown in FIGS. 19A-C and 20. In FIG. 21, horizontal arrows, such as horizontal arrow 2102, represent user interaction in each of various different computational contexts. Arrow 2102 represents the computational context that includes the first web-browser session, within which the user interacts with the smart-phone and remote servers in stages 1-5. The portion of this interaction within vertical dashed lines 2104 and 2106 represent the period of time, corresponding to stages 4 and 5, when Acme instrumentation is active within the first Acme web page. Thus, during the portion of this interaction within vertical dashed lines 2104 and 2106, Acme instrumentation can transmit data 2108 to a testing-service server 2110 from within the first computational context represented by horizontal arrow 2102. During a second computational context corresponding to the second web-browser session being active, in stages 6 and 7, represented by horizontal arrow 2112, because the application-store web page is neither instrumented nor accessible to the Acme organization, there is no communication between instrumentation and the Acme remote server 2110. In a third computational context, represented by horizontal arrow 2114 and corresponding to stage 8 and subsequent stages not shown or discussed in FIGS. 19A-C and 20, instrumentation within the Acme application can again, as indicated by vertical dashed line 2116, transmit data 2118 to the testing service server 2110. However, the data transmitted 2108 from the Acme web page is transmitted from an entirely different computational context 2102 than the data transmitted 2118 from the Acme application executing in context 2114. The first web-browser session cannot transfer user-identifying or user-thread-identifying information to the Acme application, for various reasons. The smart-phone application may fence off different computational contexts from one another to prevent many different types of security problems and unintentional collisions in memory between concurrently executing processes. Moreover, the data collectable from within different computational contexts may be quite different. In some computational contexts, for example, cookies may be accessible, while, in other computational contexts, they may not be. Thus, the data transmitted 2108 from the first computational context appears to come from a different user thread, to the testing service, than the user thread from which data is transmitted 2118 from the third computational context. Many currently available testing services and systems cannot correlate these two received data sets and can therefore not follow the entire user thread that spans computational contexts 2102, 2112, and 2114.

Figure 22:
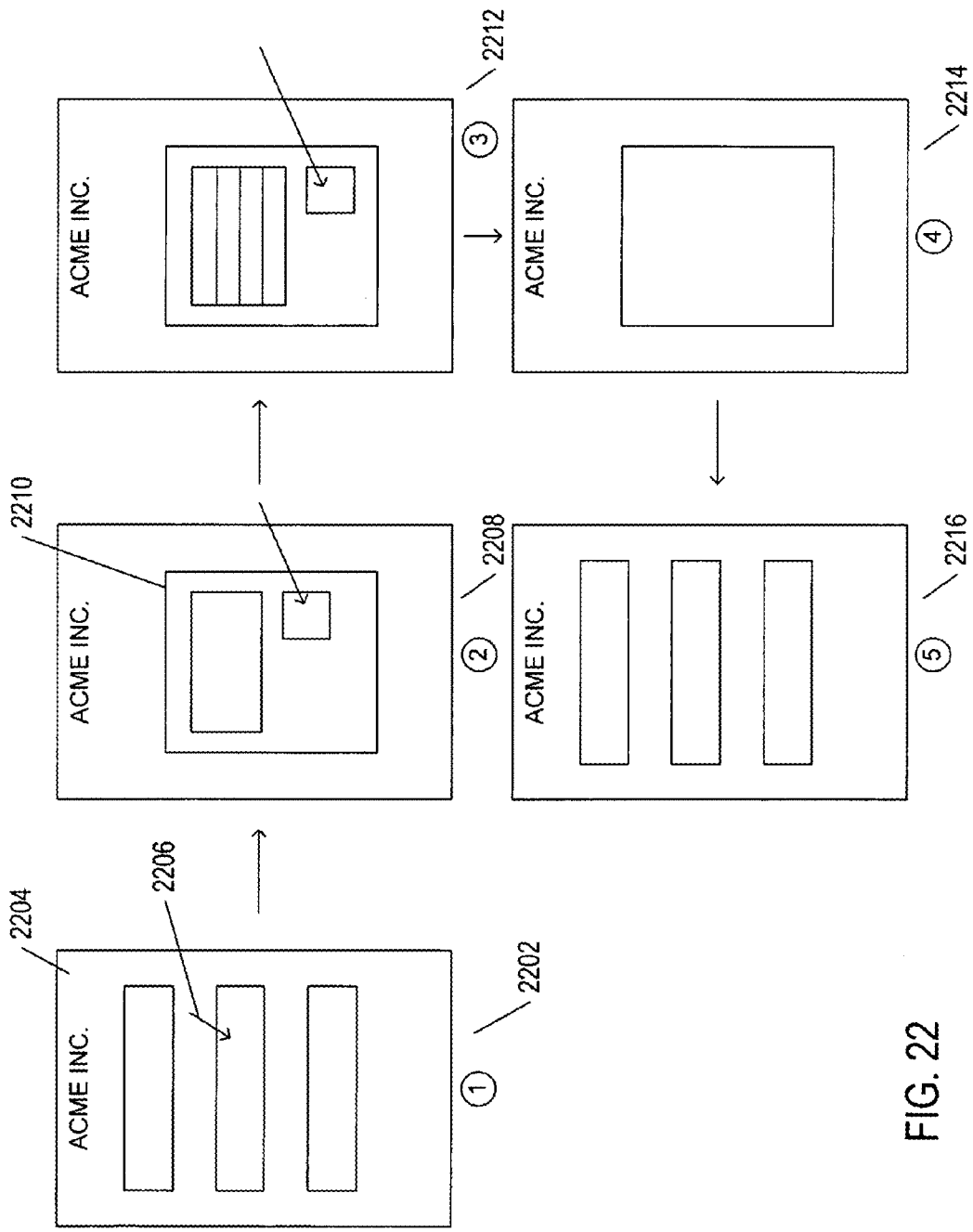
FIGS. 22 and 23 illustrate another user thread that spans multiple computational contexts.
Figure 23:
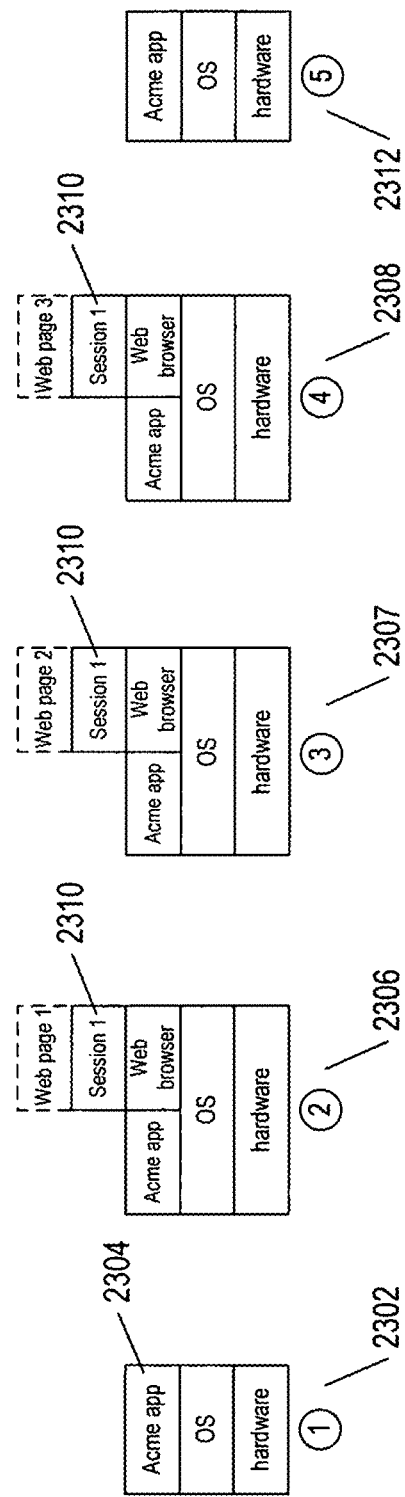

FIGS. 22 and 23 illustrate another user thread that spans multiple computational contexts. These figures use similar illustration conventions as used in FIGS. 19A-C and 20, including stage numbers. In stage 1 2202, a user is viewing an Acme information page 2204 on the user's processor-controlled device. The Acme information page is generated and displayed by an Acme application executing on the user's processor-controlled device. The user inputs a touch-screen command or mouse click 2206 to request display of additional information. In stage 2 2208, the requested additional information is displayed within a display window 2210 by a concurrently executing web browser, a session within which launched by the Acme application. In stages 3 2212 and 4 2214, the user interacts with the web browser, through the display window 2210, to purchase an Acme product, and then returns to the Acme application context, in stage 5 2216.

FIG. 23 shows layer diagrams that represent the five stages of FIG. 22. In the first stage 2302, the user is viewing information and interacting with the Acme application 2304 in a first computational context. In the second through fourth stages 2306-2308, the Acme application is suspended while the user views information and interacts with the web browser in a second computational context corresponding to a web-browser session 2310. Finally, in stage 5 2312, the user returns to the first computational context. Both the Acme application and the Acme web pages may be instrumented, but because the instrumentation is active in two different computational contexts, data transmitted by the instrumentation in the first computational context does not appear related to the data transmitted from the second computational context.

As can be seen from FIGS. 19A-FIG. 23, many currently available testing services cannot follow temporal user threads when the user information access and interaction spans multiple computational contexts. The currently disclosed methods and systems provide a number of instrumentation features and testing-service procedures that allow a testing service to computationally stitch together seemingly unrelated user threads, represented by data received by the testing service, to follow an entire user thread that spans multiple computational contexts.

Figure 24A:
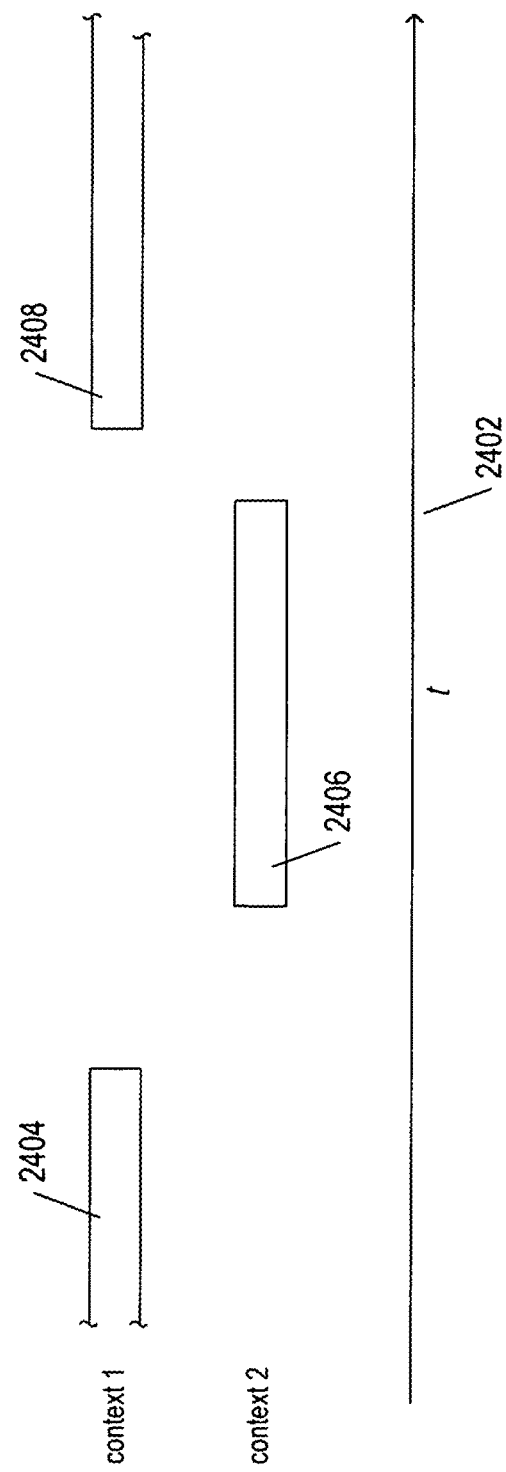
FIGS. 24A-E illustrate the instrumentation features and testing-service procedures used by the methods and systems to which the current document is directed.

FIGS. 24A-E illustrate the instrumentation features and testing-service procedures used by the methods and systems to which the current document is directed. FIG. 24A illustrates a multiple computational context example used in FIGS. 24B-E. The horizontal arrow 2402 represents the progression of time. A user interacts with a processor-controlled device during the time interval represented by horizontal arrow 2402 in a first computational context 2404, then in a second computational context 2406, and then returns to the first computational context 2408. This is a simple multiple computational context example. The same features and procedures described below with respect to the multiple computational context example shown in FIG. 24A may be similarly employed to stitch together any number of seemingly unrelated user threads corresponding to any number of different computational contexts.

Figure 24B:
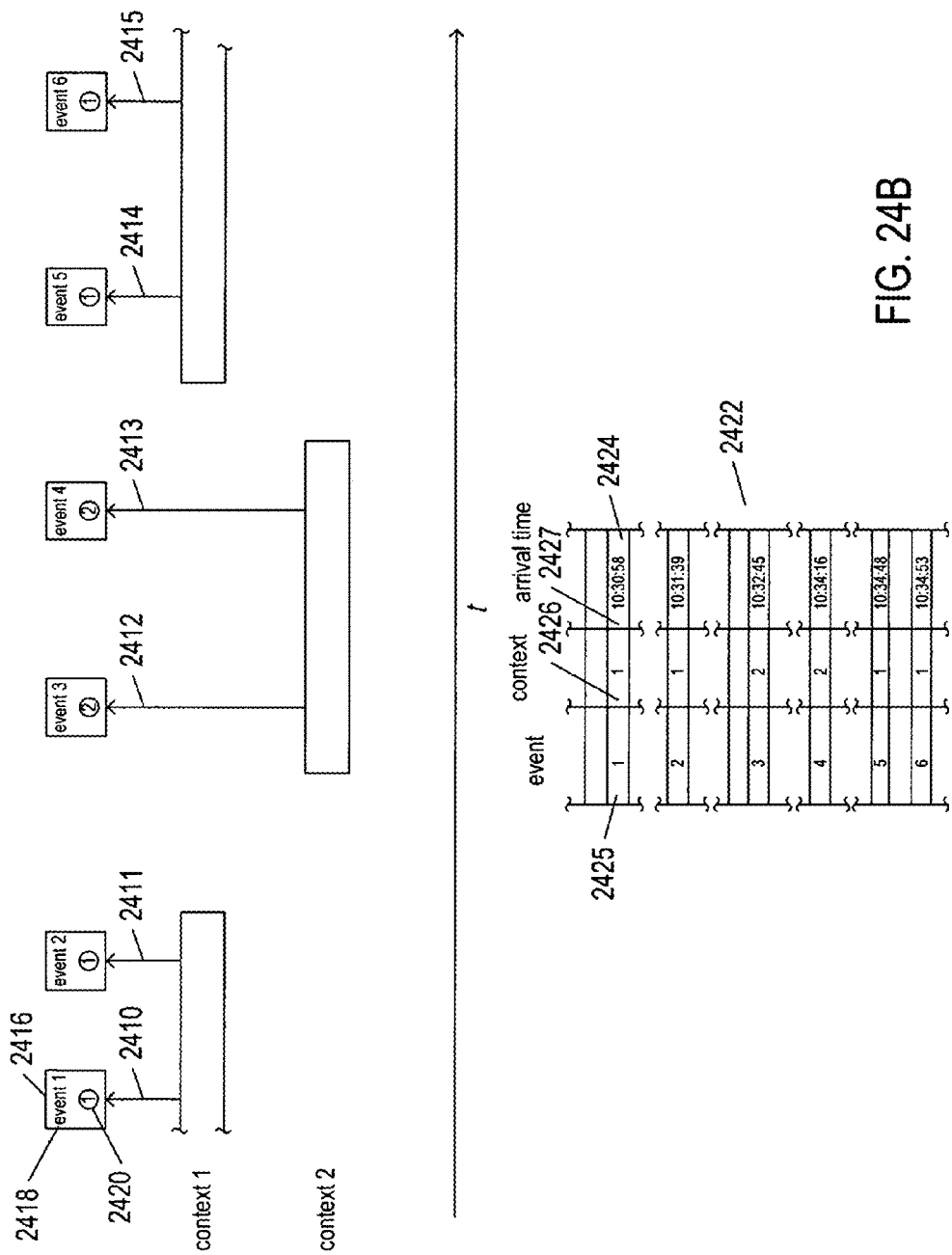

FIG. 24B illustrates a first method that might be undertaken by many currently available testing and analytics services to attempt to stitch together seemingly unrelated user threads. In FIG. 24B, data corresponding to the occurrence of six different events, such as user inputs or requested and viewed information, is transmitted from the user's device to a testing service, as represented in FIG. 24B by data transmissions 2410-2415. In each case, the transmitted data, such as transmitted data 2416, includes an identification of the event that is being reported, such as event identification 2418, and whatever information might be available to identify the user thread within the computational context from which the data is transmitted, such as information represented by the circled context identifier 2420 for the first computational context. The information received from these data transmissions, as well as from data transmissions generated by many other users concurrently interacting with many other processor-controlled user devices, is received and stored by the testing service in a log or table 2422. As shown in FIG. 24B, each entry of the log or table, shown as a horizontal row, such as entry 2424, includes an event identifier 2425, whatever context-related information was included in the data transmission 2426, and an arrival time 2427 when the testing service received and processed the transmitted data. The testing service may try to correlate various table entries by arrival time and by comparing whatever context-related information was provided in the corresponding data transmission. Unfortunately, because the testing service may receive hundreds, thousands, or more data transmission per second, entries corresponding to a user thread may be widely spaced within the table or log. Furthermore, the arrival times may not reflect the time sequence in which the data was initially transmitted from the user's device, due to network and system-hardware anomalies. In many cases, the context-related information is insufficient to make reasonably high-probability inferences with regard to the relatedness of table entries.

Figure 24C:
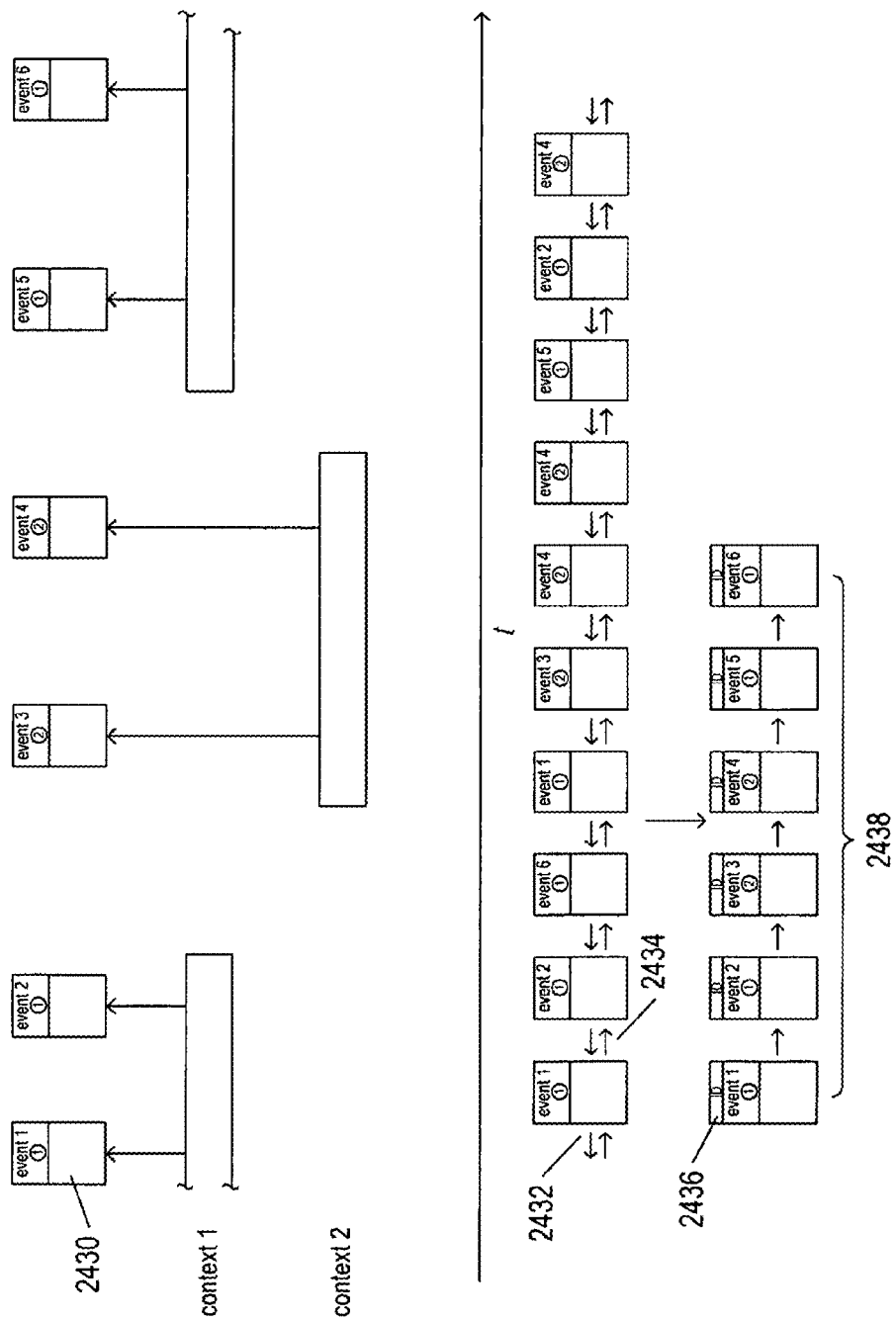

FIG. 24C illustrates a first procedure used in the currently disclosed systems and methods. FIG. 24C illustrates reporting of the same six events illustrated in FIG. 24B. However, in this case, the data transmission include key/value-pair-encoded information, such as key/value-pair-encoded information represented by rectangle 2430, as discussed with reference to FIG. 16A, that is processed and enhanced by the testing-service data-collection subsystem to produce corresponding enriched event messages, discussed above with reference to FIG. 16B-E and represented by rectangles in FIG. 24C such as rectangle 2432. The enriched event messages, as discussed above, may include a great deal of information not provided in event messages received by many currently available testing services, including the time of transmission of the message by the user device, geographical location information, device-characterization information, and any of many different types of identifiers that identify the user, including social-network handles and identifiers, various visitor IDs, and many other types of user-identifying information. The many different types of information available in the enriched event messages can be used to compare event messages, as represented by double arrows, such as double arrow 2434, in FIG. 24C. In the vast majority of cases, this rich information is sufficient for the testing service to associate a unique user-thread identifier, such as user-thread identifier 2436, with each received data transmission, and this, combined with the data-transmission times, allow the testing service to easily reconstruct an entire user thread 2438, even when the reported events span multiple contexts.

Figure 24D:
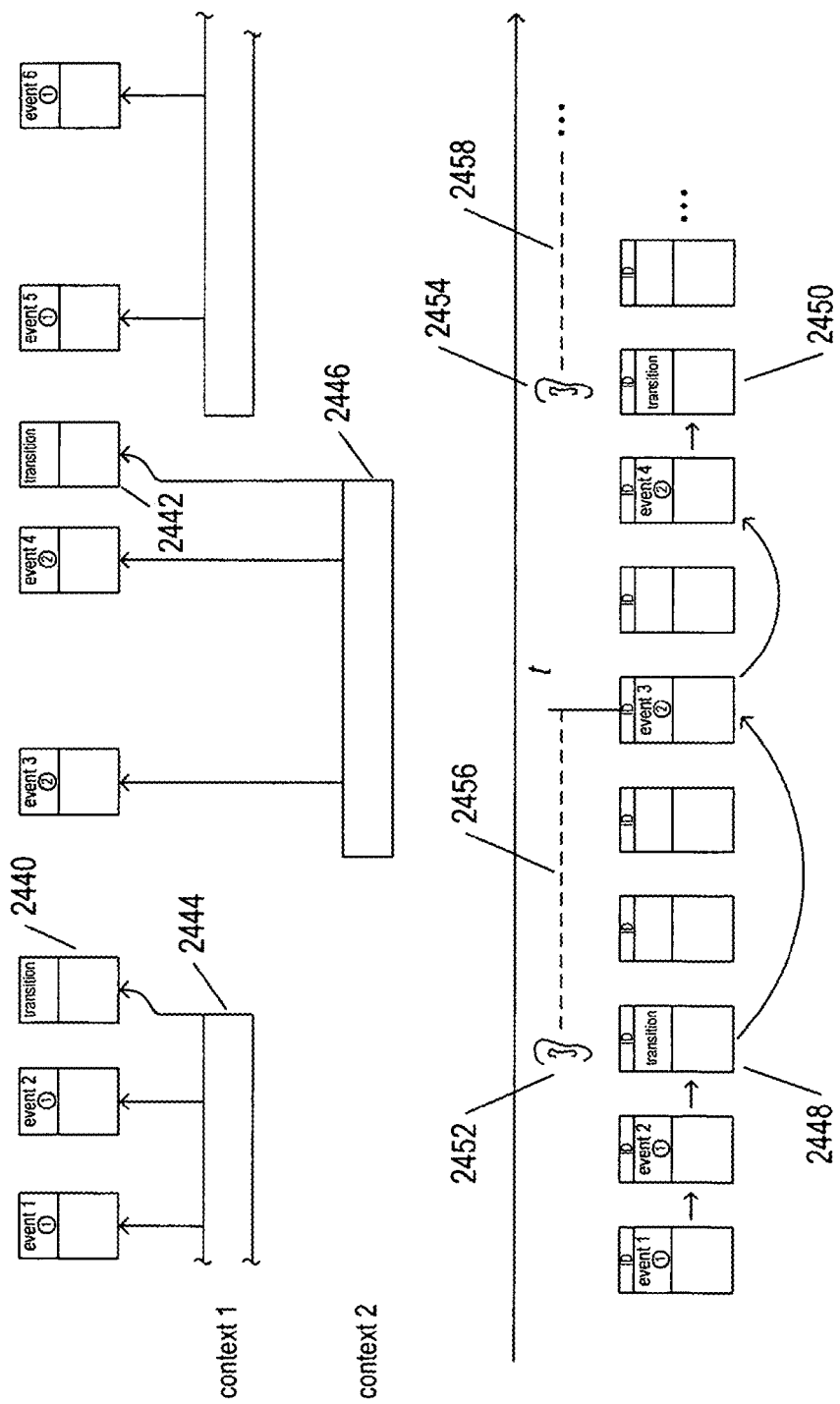

FIG. 24D illustrates an instrumentation feature and associated testing-service procedure that facilitates user-thread stitching in methods and systems disclosed in the current document. In FIG. 24D, the same six events illustrated in FIGS. 24B-C are reported, the messages generated by instrumentation to include key/value-pair-encoded information that enables the data-collection subsystem of the testing service to generate corresponding enriched event messages. In addition, the procedure illustrated in FIG. 24C is used to assign user-thread identifiers to the enriched event messages. However, additional instrumentation is included in web-page encodings, applications, and other computational entities to notify the testing service that a computational-context change is about to occur. In the example of FIGS. 19A-C, for instance, a transition event message can be transmitted by the first Acme web page, in stage 5 (1924 in FIG. 19B), prior to executing an HTTP request corresponding to the CURL that ends up launching a second web-browser session. Thus, in FIG. 24D, transition-event messages 2440 and 2442 are transmitted by the additional instrumentation added to web pages, applications, or other instrumented entities, prior to a computational context change represented by edges 2444 and 2446. These transition-event messages are received and processed by the testing service as additional enriched event messages 2448 and 2450. When the testing service receives these transition-event messages, the testing service can begin listening, or waiting, as represented in FIG. 24D by ear icons 2452 and 2454 and dashed lines 2456 and 2458, for a next event message from the same user transmitted from a different computational context. In this case, the transition-event messages serve as yet additional, confirmatory information with regard to data-comparison used to stitch together seemingly different user threads, and also facilitate computationally efficient stitching, since the time window over which detailed comparisons are needed to determine which event messages with different information correspond to a single user may be significantly shortened. In cases in which information comparison, alone, is insufficient to assign the same user-thread identifier to two different event messages transmitted from two different computational contexts, the presence of an intervening transition-event message may increase the probability that the different event messages were transmitted as a result of activities of the same user above a threshold probability to allow the user-thread-identifier assignment to be made.

Figure 24E:
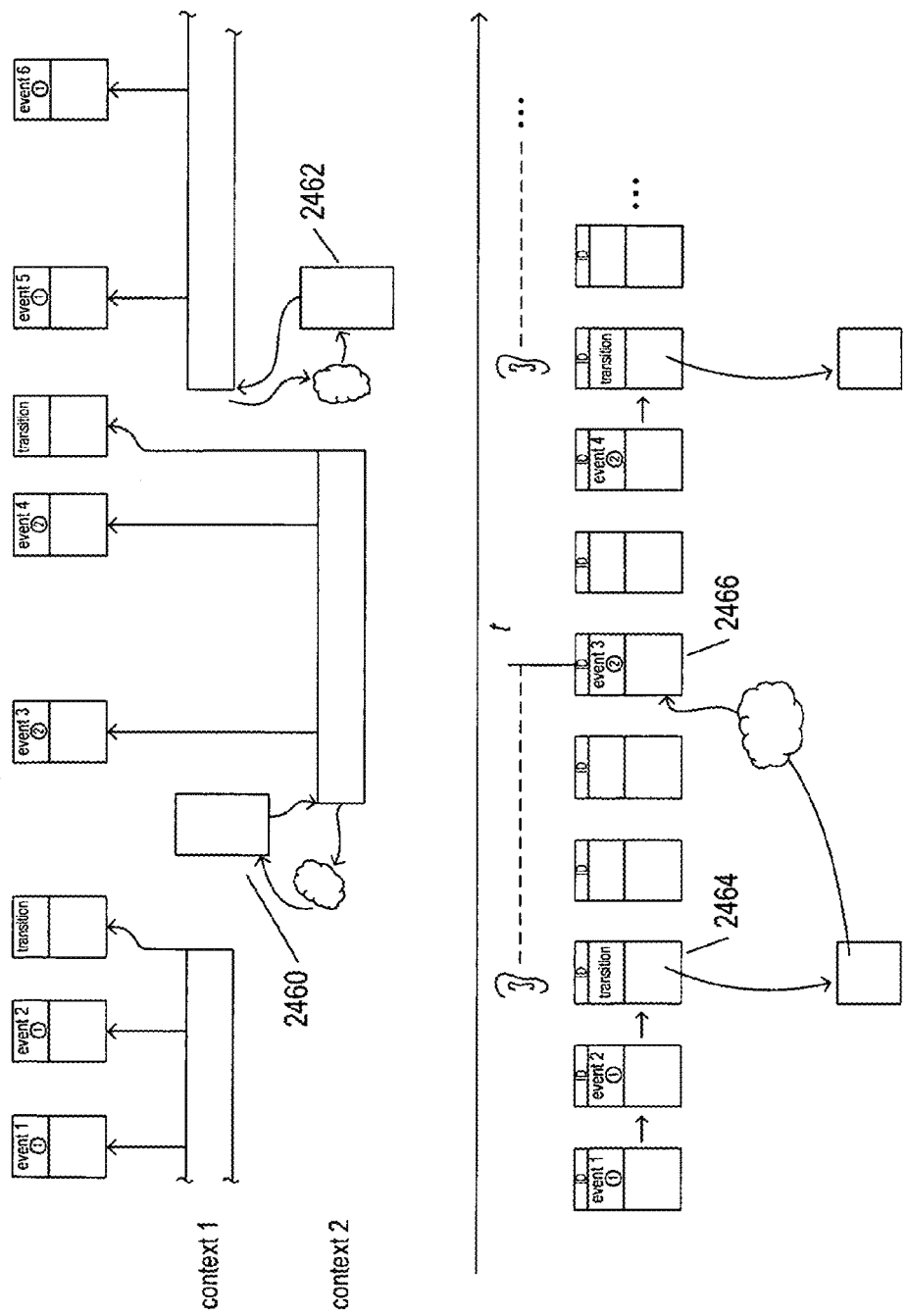

FIG. 24E illustrates an additional instrumentation feature and associated testing-service procedure that facilitates user-thread stitching in methods and systems disclosed in the current document. FIG. 24E shows reporting of the same events and use of the same features and procedures used in FIG. 24D. However, an additional instrumentation feature is added. The new instrumentation feature requests, at the beginning of each new computational context and when a suspended computational context resumes, user information from the testing service. In FIG. 24E, the new user-information requests are shown by rectangles and curved arrows 2460 and 2462. As shown in the lower part of FIG. 24E, the user-information requests allow the testing service to essentially synchronize information within the messages that arrive from a single user from multiple computational contexts. For example, the information included in transition-event message 2464 sent from the first computational context can be acquired by the entity executing in the second computational context, so that event messages transmitted by the entity executing in the second computational context arrive with the same or similar information 2466. This further facilitates user thread stitching. Moreover, the testing service can serve as a communications bridge between instrumentation incorporated within different entities, such as web pages, applications, and other information-related entities. Thus, not only can the testing service stitch together seemingly different user threads, but an organization, such as Acme in the preceding examples, can use instrumentation to allow the testing service to transfer information between web browsers, organization applications, and other entities executing on behalf of a user.

The features and procedures described with reference to FIGS. 24A-E, when incorporated within testing-service instrumentation and the testing service, allow a testing service to correctly correlate received data transmissions from a user that span multiple computational contexts in order to follow user information requests and interactions over an entire user thread. Thus, when certain information requests are made in a first computational context, and a conversion event occurs in a second, different computational context, the testing service can determine that the information requests and conversion event are related to a particular user, and therefore maintain accurate statistics about those information requests that precede conversion events. This is, of course, but one example of the many different types of testing and analysis that are enabled by user-thread stitching disclosed in the current document. The additional instrumentation features can be incorporated in SDKs by testing services to allow the additional information features to be easily incorporated within web pages, applications, and other entities by clients of the testing service.

Figure 25A:
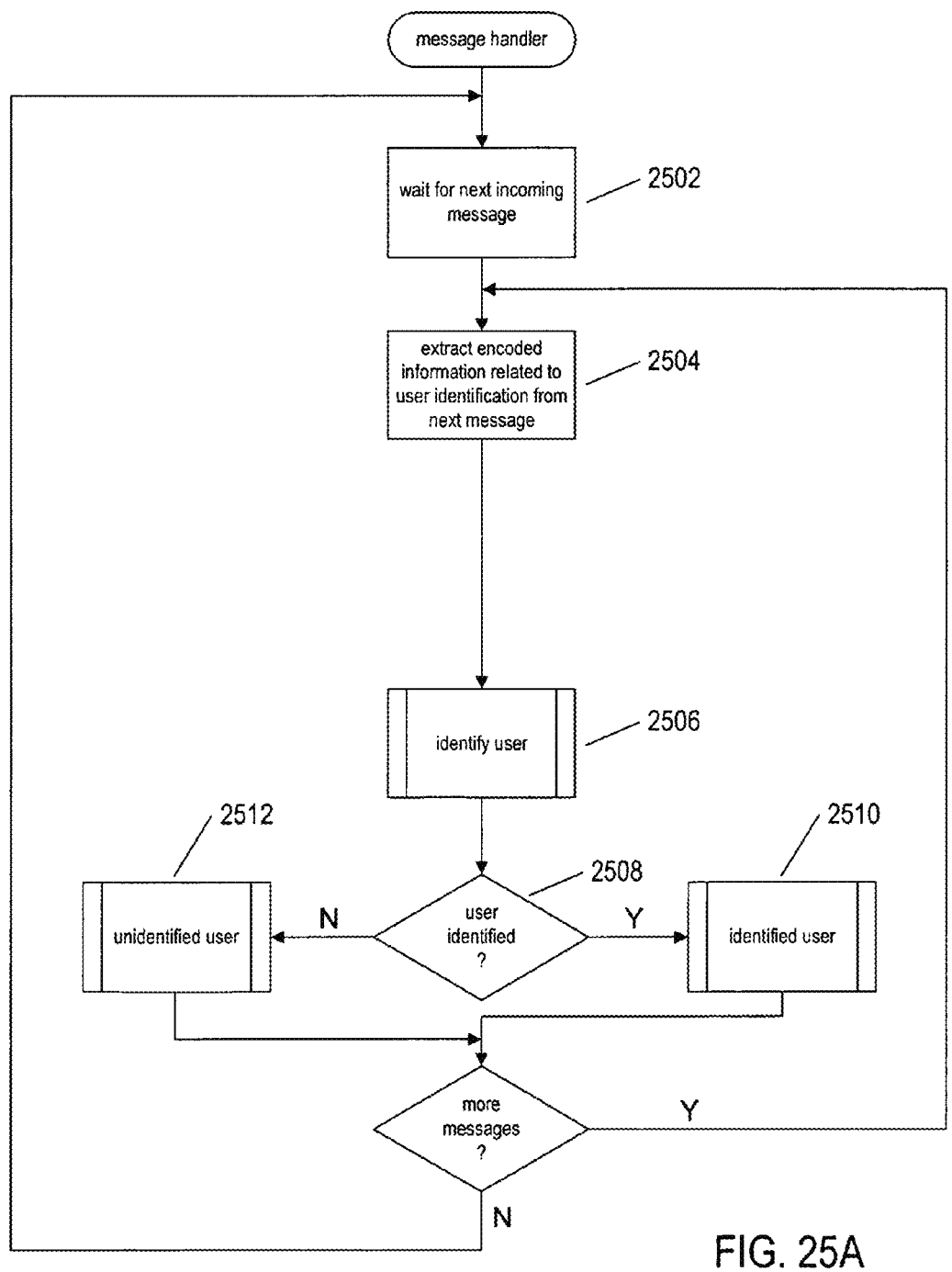
FIGS. 25A-D provide control-flow diagrams that illustrate one implementation of incoming message handling by a testing service.

FIGS. 25A-D provide control-flow diagrams that illustrate one implementation of incoming message handling by a testing service. In FIG. 25A, the message-handling process or processes wait for a next incoming message from the data-collection subsystem, in step 2502. When a next event message arrives, the information encoded within the message that can be used to identify the user who precipitated the event that was detected by instrumentation is extracted, in step 2504. As discussed above, this information may include various types of identifiers, device and location information, and a great deal of additional statue information retrieved from a computational context within which the instrumentation executed. Then, in step 2506, a routine "identify user" is called to identify the user corresponding to the currently considered message. When the user is identified by this routine, as determined in step 2508, a routine "identified user" is called in step 2510. Otherwise, a routine "unidentified user" is called in step 2512. The message handler then either continues processing additional, queued incoming messages or again waits for more messages to arrive.

Figure 25B:
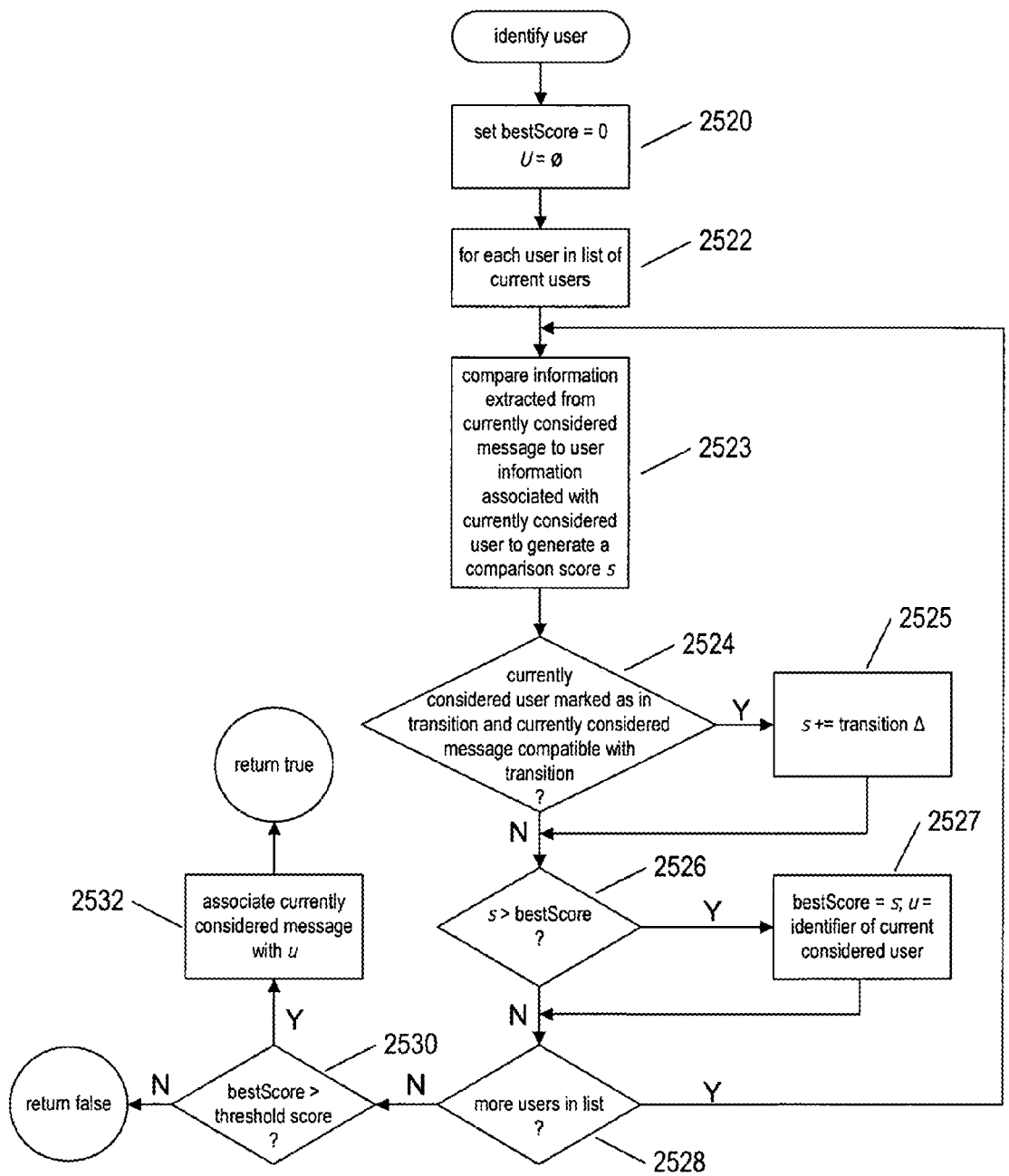

FIG. 25B illustrates the routine "identify user" called in step 2506 of FIG. 25A. In step 2520, a local variable bestScore is set to 0 and a local variable u is set to a null value. In a for-loop of steps 2522-2528, each user in a list of current users is considered. In step 2523, the user-related information extracted from the currently considered message is compared to user-related information associated with the currently considered user from the list of current users, with the comparison generating a numerical score s. The larger the value of s, the greater the likelihood that the currently considered user is the user associated with the currently considered message. Various different types of user-related information may be weighted differently, to reflect the importance or predictive power of the information. In step 2524, when the currently considered user has been marked as "in transition," as a result of a transition-event message, and the currently considered message is compatible with a first subsequent message from a new computational context associated with the currently considered user, a transition delta is added to the computed score s to reflect the increased probability that the currently considered user is the user associated with the currently considered message, in step 2525. When the score s is greater, in value, than the value stored in the local variable bestScore, as determined in step 2526, then the local variable bestScore is updated to store the score s and the local variable u is set to the user identifier of the currently considered user, in step 2527. When there are no more current users to consider, as determined in step 2528, then, in step 2530, the value stored in the local variable bestScore is compared to a threshold score. When the value stored in the local variable bestScore is less than or equal to threshold score, then the routine "identify user" returns false, to indicate that the user associated with the currently considered message was not identified. Otherwise, in step 2532, the user identifier stored in the local variable u is associated with the currently considered message and the routine "identify user" returns true. In step 2532, if the current user u was marked as "in transition," that marking is removed.

In certain implementations, the for-loop of steps 2522-2528 may be short circuited when a sufficiently large computed score s is observed.

Figure 25C:
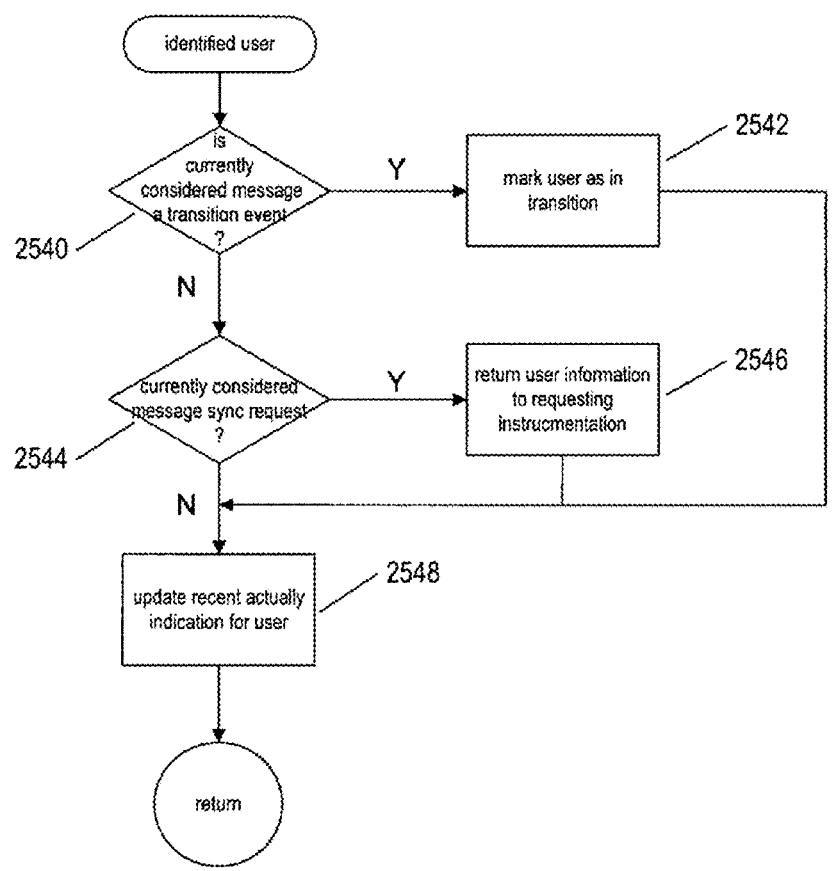

FIG. 25C illustrates the routine "identified user" called in step 2510 of FIG. 25A. When the currently considered message is a transition event, as determined in step 2540, then, in step 2542, the user associated with the message is marked as "in transition." Otherwise, when currently considered message is a sync request, or, in other words, request for user information, as determined in step 2544, then, in step 2546, the user information is returned to the requesting instrumentation. Finally, in step 2548, an indication of recent activity for the user associated with the currently considered message is updated, to indicate that the user continues to be active.

Figure 25D:
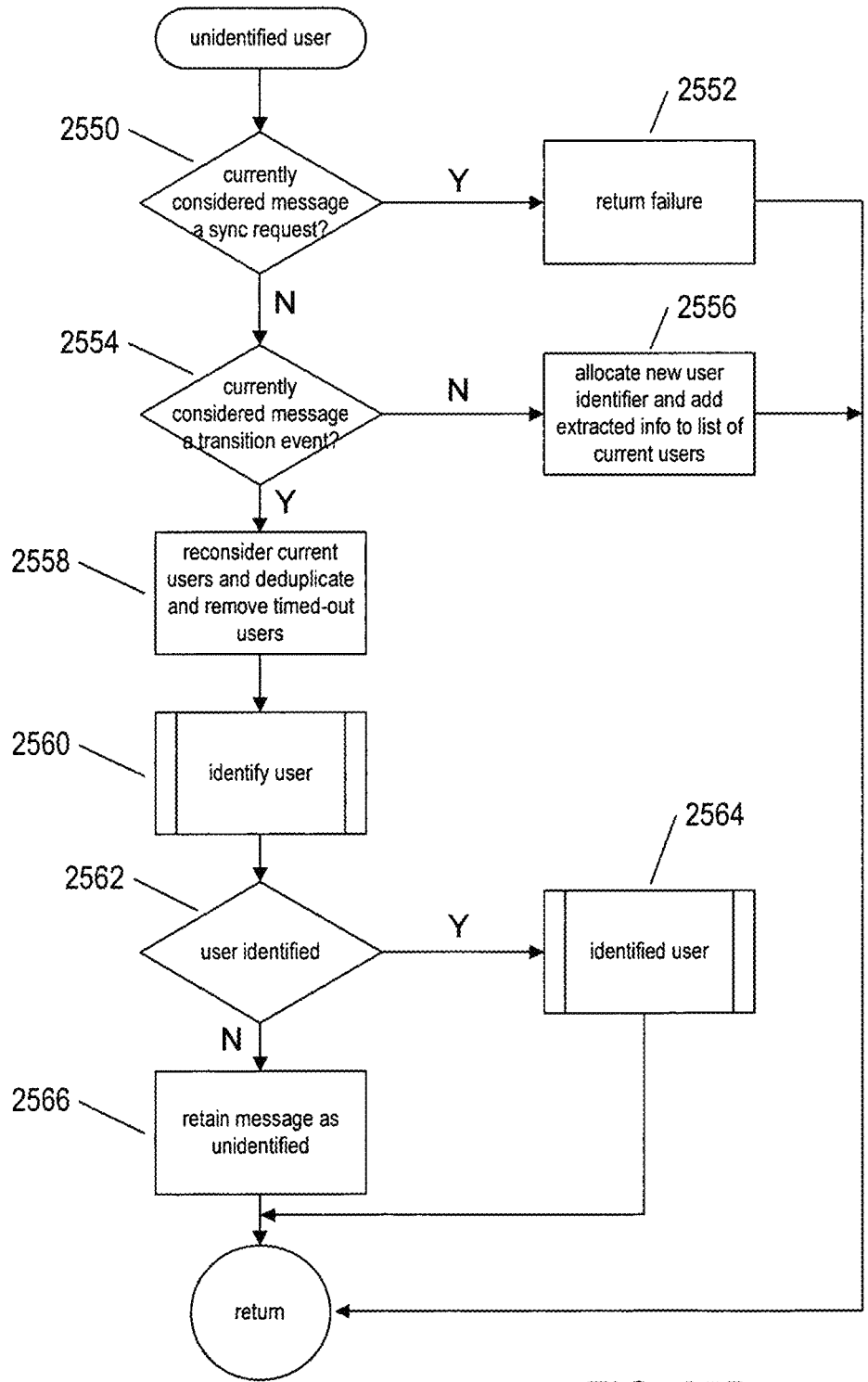

FIG. 25D illustrates the routine "unidentified user" called in step 2512 of FIG. 25A. When currently considered message is a sync request, or, in other words, request for user information, as determined in step 2550, then, in step 2552, a failure indication is returned to the requesting instrumentation. Otherwise, when the currently considered message is not a transition event, as determined in step 2554, then, in step 2556, a new user identifier is allocated and associated with the currently considered message and the new user identifier and user-related information is added to the list of current users. Otherwise, in step 2558, the list of current users is reconsidered, in light of the transition event, with user-related information updated, multiple user identifiers identifying a single user deduplicated, timed-out users and unidentified messages removed, and other maintenance and verification steps taken to ensure that the list of current users reflects all available information. Then, in step 2560, the routine "identify user" is again called to attempt to identify the user of the currently considered message. If an identification can now be made, as determined in step 2562, the routine "identified user" is called in step 2564. Otherwise, the currently considered message is retained as an unidentified message, in step 2566.

The processed event messages are used, by various types of subsequently executed analysis procedures, to generate statistics and results for clients of the testing service. The processed event messages are later deleted, after they are no longer needed by the testing service.

Although the present invention has been described in terms of particular embodiments, it is not intended that the invention be limited to these embodiments. Modifications within the spirit of the invention will be apparent to those skilled in the art. For example, any of many different design and implementation parameters may be varied to produce a variety of alternative implementations of the above described instrumentation features and testing-service procedures, including modular design, programming language, operating system, control structures, data structures, and other such details. While the currently disclosed methods have been discussed in the context of website testing, the same methods can be used to stitch together user threads in many other types of systems, including real-time data-collection systems and almost any service system that includes a data-collection subsystem that receives and processes messages from embedded instrumentation.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system comprising:
   one or more processors;
   one or more data-storage devices;
   a data-collection subsystem that receives and processes messages sent from instrumentation contained in remote web-page encodings, remote applications, and other remote instrumented entities which sends transition event messages to the system prior to execution of instructions or system calls that result in a change of computational context; and
   computer instructions, stored in one or more of the one or more data-storage devices, that, when executed by one or more of the one or more processors, control the system to process a next message received and processed by the data-collection subsystem by:
      receiving the processed message from the data-collection subsystem;
      when the processed message is sent by instrumentation in a computational context from which another message of a current user thread was sent, using message user-related information contained within the processed message, including computational-context-associated user-related information, to determine a user associated with the message;
      when the processed message is sent by instrumentation in a computational context different from one or more computational contexts from which other messages of a current user thread were sent, using message user-related information contained within the processed message other than computational-context-associated user-related information, to determine a user associated with the message; and
      associated the determined user with the processed message.

2. The system of claim 1 wherein the system uses transition event messages to facilitate identification of users associated with messages.

3. A method carried out in a testing-service, analysis-service, or other service system having one or more processors, one or more data-storage devices, and a data-collection subsystem that receives and processes messages sent from instrumentation contained in remote web-page encodings, remote applications, and other remote instrumented entities, the method comprising:
   for each next processed message received from the data-collection subsystem,
      extracting user-related information from the processed message;
      attempting to identify a user associated with the processed message so that the user can be identified even when computational-context-associated user-related information is not available either in the user-related information extracted from the processed message or in user-related information associated with already identified users by
         for each user in a list of current users,
            comparing user-related information associated with the user to the user-related information extracted from the processed message to generate a score reflective of the probability that the user is the user associated with the processed message, and when the score indicates a higher probability than previously considered users in the list of current users, selecting the user as the user associated with the processed message;

when the score generated with respect to the selected user is greater than a threshold score,
identifying the selected user as the user associated with the processed message; and when the user associated with the processed message is identified, associating a user identifier for the identified user with the processed message.

4. The method of claim 3
wherein instrumentation contained in remote web-page encodings, remote applications, and other remote instrumented entities sends transition event messages to the service system prior to execution of instructions or system calls that result in a change of computational context;

wherein, when the user associated with a processed transition event message received by the service system from the data-collection subsystem is identified, marking the user as "in transition;" and wherein, during comparison of user-related information associated with a currently considered user to the user-related information extracted from the processed message to generate a score reflective of the probability that the currently considered user is the user associated with the processed message, when the currently considered user is marked as "in transition" and the processed message is compatible with a first message sent from a new or resumed computational context, the score is changed to reflect a higher probability that the currently considered user is the user associated with the processed message.

* * * * *